United States Patent
Gunasekara et al.

(10) Patent No.: US 10,368,255 B2
(45) Date of Patent: Jul. 30, 2019

(54) METHODS AND APPARATUS FOR CLIENT-BASED DYNAMIC CONTROL OF CONNECTIONS TO CO-EXISTING RADIO ACCESS NETWORKS

(71) Applicant: CHARTER COMMUNICATIONS OPERATING, LLC, St. Louis, MO (US)

(72) Inventors: Don Gunasekara, Reston, VA (US); Venkata Ramana Divvi, Littleton, CO (US); Ahmed Bencheikh, Lorton, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/659,021

(22) Filed: Jul. 25, 2017

(65) Prior Publication Data

US 2019/0037418 A1  Jan. 31, 2019

(51) Int. Cl.
*H04W 24/02* (2009.01)
*H04B 17/309* (2015.01)
(Continued)

(52) U.S. Cl.
CPC .......... *H04W 24/02* (2013.01); *H04B 7/0617* (2013.01); *H04B 17/309* (2015.01); *H04B 7/0413* (2013.01); *H04W 84/12* (2013.01)

(58) Field of Classification Search
CPC .... H04W 24/02; H04B 17/309; H04B 7/0617
See application file for complete search history.

(56) References Cited

U.S. PATENT DOCUMENTS 5,313,454 A  5/1994 Bustini et al.
5,369,707 A  11/1994 Follendore, III
(Continued)

FOREIGN PATENT DOCUMENTS

EP  1139198 A2  10/2001
EP  2113860 A1  11/2009
(Continued)

OTHER PUBLICATIONS

Deering et al., Internet Protocol, Version 6 (Ipv6) Specification, IETF RFC 2460 (Dec. 1998).
(Continued)

*Primary Examiner* — Ronald B Abelson
(74) *Attorney, Agent, or Firm* — Gazdzinski & Associates, PC

(57) ABSTRACT

Methods and apparatus for monitoring and controlling access to coexisting first and second networks, such as within a venue. In one embodiment, the first network is a managed network that includes wireless access points (APs) in data communication with a backend controller, which communicates with a client process on a user device. The client process uses indigenous radio technology of the user device to scan for coexisting networks, and report results to the controller. In one variant, the controller dynamically adjusts transmit characteristics of the AP(s) to manage interference between the coexisting networks. In another variant, the controller causes the energy detect threshold of the user device to be lowered so that it may detect WLAN signals when a coexisting RAT (for example, LTE-U or LTE-LAA) occupies the same channel and/or frequency. In another variant, the client process autonomously adjusts user device operation based on the scan.

20 Claims, 23 Drawing Sheets

(51) Int. Cl.
*H04B 7/06* (2006.01)
*H04W 84/12* (2009.01)
*H04B 7/0413* (2017.01)

(56) References Cited

U.S. PATENT DOCUMENTS

| | | | |
|---|---|---|---|
| 5,528,284 A | 6/1996 | Iwami et al. |
| 5,577,209 A | 11/1996 | Boyle et al. |
| 5,708,961 A | 1/1998 | Hylton et al. |
| 5,715,403 A | 2/1998 | Stefik |
| 5,774,170 A | 6/1998 | Hite et al. |
| 5,787,172 A | 7/1998 | Arnold |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,897,635 A | 4/1999 | Torres et al. |
| 5,926,205 A | 7/1999 | Krause et al. |
| 5,935,206 A | 8/1999 | Dixon et al. |
| 5,982,412 A | 11/1999 | Nulty |
| 6,002,393 A | 12/1999 | Hite et al. |
| 6,009,103 A | 12/1999 | Woundy |
| 6,092,178 A | 7/2000 | Jindal et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,169,728 B1 | 1/2001 | Perreault et al. |
| 6,181,697 B1 | 1/2001 | Nurenberg et al. |
| 6,211,901 B1 | 4/2001 | Imajima et al. |
| 6,212,636 B1 | 4/2001 | Boyle et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,553 B1 | 5/2001 | Son et al. |
| 6,249,680 B1 | 6/2001 | Wax et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,353,626 B1 | 3/2002 | Sunay et al. |
| 6,378,130 B1 | 4/2002 | Adams |
| 6,434,141 B1 | 8/2002 | Oz et al. |
| 6,456,716 B1 | 9/2002 | Arnold |
| 6,463,585 B1 | 10/2002 | Hendricks et al. |
| 6,498,783 B1 | 12/2002 | Lin |
| 6,519,062 B1 | 2/2003 | Yoo |
| 6,523,696 B1 | 2/2003 | Saito et al. |
| 6,590,865 B1 | 7/2003 | Ibaraki et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,687,735 B1 | 2/2004 | Logston et al. |
| 6,694,145 B2 | 2/2004 | Riikonen et al. |
| 6,711,148 B1 | 3/2004 | Hills |
| 6,718,551 B1 | 4/2004 | Swix et al. |
| 6,738,978 B1 | 5/2004 | Hendricks et al. |
| 6,742,116 B1 | 5/2004 | Matsui et al. |
| 6,760,768 B2 | 7/2004 | Holden et al. |
| 6,763,391 B1 | 7/2004 | Ludtke |
| 6,782,550 B1 | 8/2004 | Cao |
| 6,785,810 B1 | 8/2004 | Lirov et al. |
| 6,788,676 B2 | 9/2004 | Partanen et al. |
| 6,799,047 B1 | 9/2004 | Bahl et al. |
| 6,807,573 B2 | 10/2004 | Saito et al. |
| 6,813,505 B2 | 11/2004 | Walley et al. |
| 6,842,783 B1 | 1/2005 | Boivie et al. |
| 6,859,535 B1 | 2/2005 | Tatebayashi et al. |
| 6,891,841 B2 | 5/2005 | Leatherbury et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | Demello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,072,950 B2 | 7/2006 | Toft |
| 7,073,199 B1 | 7/2006 | Raley |
| 7,075,945 B2 | 7/2006 | Arsenault et al. |
| 7,086,077 B2 | 8/2006 | Giammaressi |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,143,431 B1 | 11/2006 | Eager et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,242,960 B2 | 7/2007 | Van Rooyen et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,308,415 B2 | 12/2007 | Kimbrel et al. |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,334,044 B1 | 2/2008 | Allen |
| 7,340,759 B1 | 3/2008 | Rodriguez |
| 7,346,688 B2 | 3/2008 | Allen et al. |
| 7,353,543 B2 | 4/2008 | Ohmori et al. |
| 7,363,371 B2 | 4/2008 | Kirby et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,409,546 B2 | 8/2008 | Platt |
| 7,457,520 B2 | 11/2008 | Rossetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |

(56) References Cited

U.S. PATENT DOCUMENTS

| | | |
|---|---|---|
| 7,567,565 B2 | 7/2009 | La |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,860,507 B2 | 12/2010 | Kalika et al. |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,041,785 B2 | 10/2011 | Mazur et al. |
| 8,084,792 B2 | 12/2011 | Lehmann et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La et al. |
| 8,306,634 B2 | 11/2012 | Nguyen et al. |
| 8,332,370 B2 | 12/2012 | Gattegno et al. |
| 8,341,242 B2 | 12/2012 | Dillon et al. |
| 8,442,265 B1 | 5/2013 | Bosworth et al. |
| 8,583,484 B1 | 11/2013 | Chalawsky et al. |
| 8,713,623 B2 | 4/2014 | Brooks |
| 8,842,615 B1 * | 9/2014 | Kalbag ............ H04W 72/0486 |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,115,997 B2 | 8/2015 | Poduri et al. |
| 9,215,423 B2 | 12/2015 | Kimble et al. |
| 9,300,919 B2 | 3/2016 | Cholas et al. |
| 9,609,617 B2 | 3/2017 | Arslan et al. |
| 9,648,466 B2 | 5/2017 | Aström et al. |
| 9,906,838 B2 | 2/2018 | Cronk et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0055978 A1 | 5/2002 | Joon-Bo et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087976 A1 | 7/2002 | Kaplan et al. |
| 2002/0123928 A1 | 9/2002 | Eldering et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0002862 A1 | 1/2003 | Rodriguez et al. |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0021421 A1 | 1/2003 | Yokota et al. |
| 2003/0041336 A1 | 2/2003 | Del et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0069965 A1 | 4/2003 | Ma et al. |
| 2003/0071117 A1 | 4/2003 | Meade |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0099212 A1 | 5/2003 | Anjum et al. |
| 2003/0114162 A1 | 6/2003 | Chheda et al. |
| 2003/0115267 A1 | 6/2003 | Hinton et al. |
| 2003/0139980 A1 | 7/2003 | Hamilton |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019691 A1 | 1/2004 | Daymond et al. |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0106403 A1 | 6/2004 | Mori et al. |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |
| 2004/0146006 A1 | 7/2004 | Jackson |
| 2004/0181800 A1 | 9/2004 | Rakib et al. |
| 2004/0187159 A1 | 9/2004 | Gaydos et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0240478 A1 | 12/2004 | Goren et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0007278 A1 | 1/2005 | Anson et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0065888 A1 | 3/2005 | Benaloh |

(56) References Cited

U.S. PATENT DOCUMENTS

| | | |
|---|---|---|
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0097006 A1 | 5/2005 | Nyako |
| 2005/0108763 A1 | 5/2005 | Baran et al. |
| 2005/0111844 A1 | 5/2005 | Compton et al. |
| 2005/0114686 A1 | 5/2005 | Ball et al. |
| 2005/0114900 A1 | 5/2005 | Ladd et al. |
| 2005/0125832 A1 | 6/2005 | Jost et al. |
| 2005/0138357 A1 | 6/2005 | Swenson et al. |
| 2005/0168323 A1 | 8/2005 | Lenoir et al. |
| 2005/0169468 A1 | 8/2005 | Fahrny et al. |
| 2005/0172127 A1 | 8/2005 | Hartung et al. |
| 2005/0176444 A1 | 8/2005 | Tanaka |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0268107 A1 | 12/2005 | Harris et al. |
| 2005/0271133 A1 | 12/2005 | Waxman |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0154674 A1 | 7/2006 | Landschaft et al. |
| 2006/0161635 A1 | 7/2006 | Lamkin et al. |
| 2006/0165090 A1 | 7/2006 | Kalliola et al. |
| 2006/0165197 A1 | 7/2006 | Morita et al. |
| 2006/0168219 A1 | 7/2006 | Ahluwalia et al. |
| 2006/0171390 A1 | 8/2006 | La |
| 2006/0171423 A1 | 8/2006 | Helms et al. |
| 2006/0179138 A1 | 8/2006 | Van et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0259927 A1 | 11/2006 | Acharya et al. |
| 2006/0277569 A1 | 12/2006 | Smith |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0079381 A1 | 4/2007 | Hartung et al. |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0113243 A1 | 5/2007 | Brey |
| 2007/0115900 A1 | 5/2007 | Liang et al. |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0195727 A1 | 8/2007 | Kinder et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0233857 A1 | 10/2007 | Cheng et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0266395 A1 | 11/2007 | Lee et al. |
| 2007/0276925 A1 | 11/2007 | La et al. |
| 2007/0276926 A1 | 11/2007 | Lajoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0037493 A1 | 2/2008 | Morton |
| 2008/0046542 A1* | 2/2008 | Sano ................... G06F 15/16 |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0101460 A1 | 5/2008 | Rodriguez |
| 2008/0103976 A1 | 5/2008 | Read et al. |
| 2008/0103977 A1 | 5/2008 | Khosravy et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0148362 A1 | 6/2008 | Gilder et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0182591 A1 | 7/2008 | Krikorian |
| 2008/0183705 A1 | 7/2008 | Shivaji-Rao et al. |
| 2008/0188253 A1 | 8/2008 | Chong et al. |
| 2008/0192820 A1 | 8/2008 | Brooks et al. |
| 2008/0212945 A1 | 9/2008 | Khedouri et al. |
| 2008/0222684 A1 | 9/2008 | Mukraj et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0013210 A1 | 1/2009 | McIntosh et al. |
| 2009/0025027 A1 | 1/2009 | Craner |
| 2009/0025075 A1 | 1/2009 | Chow et al. |

(56) References Cited

U.S. PATENT DOCUMENTS

| | | |
|---|---|---|
| 2009/0028182 A1 | 1/2009 | Brooks et al. |
| 2009/0031371 A1 | 1/2009 | Munsell et al. |
| 2009/0064251 A1 | 3/2009 | Savoor et al. |
| 2009/0083813 A1 | 3/2009 | Dolce et al. |
| 2009/0094648 A1 | 4/2009 | Patel et al. |
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0116587 A1 | 5/2009 | Kwasinski et al. |
| 2009/0119751 A1 | 5/2009 | Koga |
| 2009/0125374 A1 | 5/2009 | Deaton et al. |
| 2009/0151006 A1 | 6/2009 | Saeki et al. |
| 2009/0170479 A1 | 7/2009 | Jarenskog |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0244290 A1 | 10/2009 | McKelvey et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0292922 A1 | 11/2009 | Park |
| 2009/0293101 A1 | 11/2009 | Carter et al. |
| 2010/0014496 A1 | 1/2010 | Kalika et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0070867 A1 | 3/2010 | Lemmers |
| 2010/0081416 A1 | 4/2010 | Cohen |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0122288 A1 | 5/2010 | Minter et al. |
| 2010/0131973 A1 | 5/2010 | Dillon et al. |
| 2010/0138900 A1 | 6/2010 | Peterka et al. |
| 2010/0150027 A1 | 6/2010 | Atwal et al. |
| 2010/0151816 A1 | 6/2010 | Besehanic et al. |
| 2010/0159951 A1 | 6/2010 | Shkedi |
| 2010/0167743 A1 | 7/2010 | Palanki et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0309051 A1 | 12/2010 | Moshfeghi |
| 2010/0312826 A1 | 12/2010 | Sarosi et al. |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0034179 A1 | 2/2011 | David et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0098076 A1 | 4/2011 | Kim et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0138064 A1 | 6/2011 | Rieger et al. |
| 2011/0163888 A1 | 7/2011 | Goedde |
| 2011/0164753 A1 | 7/2011 | Dubhashi et al. |
| 2011/0167440 A1 | 7/2011 | Greenfield |
| 2011/0169977 A1 | 7/2011 | Masuda |
| 2011/0197070 A1 | 8/2011 | Mizrah |
| 2011/0206136 A1 | 8/2011 | Bekedam et al. |
| 2011/0213688 A1 | 9/2011 | Santos et al. |
| 2011/0219229 A1 | 9/2011 | Cholas et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0252236 A1 | 10/2011 | De et al. |
| 2011/0252243 A1 | 10/2011 | Brouwer et al. |
| 2011/0286437 A1 | 11/2011 | Austin et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079531 A1 | 3/2012 | Hasek et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0203822 A1 | 8/2012 | Floyd et al. |
| 2012/0222081 A1 | 8/2012 | Schaefer et al. |
| 2012/0278654 A1 | 11/2012 | Shen et al. |
| 2012/0291062 A1 | 11/2012 | Pearson et al. |
| 2012/0302259 A1 | 11/2012 | Busch |
| 2012/0330759 A1 | 12/2012 | Aggarwal et al. |
| 2013/0016648 A1 | 1/2013 | Koskela et al. |
| 2013/0017794 A1 | 1/2013 | Kloper et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0132789 A1 | 5/2013 | Watford et al. |
| 2013/0145152 A1 | 6/2013 | Maino et al. |
| 2013/0176885 A1* | 7/2013 | Lee ............ H04W 36/30 |
| 2013/0235774 A1 | 9/2013 | Jo et al. |
| 2013/0254787 A1 | 9/2013 | Cox et al. |
| 2013/0260820 A1 | 10/2013 | Schmandt et al. |
| 2013/0308622 A1 | 11/2013 | Uhlik |
| 2013/0317892 A1 | 11/2013 | Heerboth et al. |
| 2013/0347089 A1 | 12/2013 | Bailey et al. |
| 2014/0010219 A1 | 1/2014 | Dor et al. |
| 2014/0046624 A1 | 2/2014 | Miettinen |
| 2014/0066098 A1 | 3/2014 | Stern et al. |
| 2014/0106779 A1 | 4/2014 | Arslan et al. |
| 2014/0177611 A1 | 6/2014 | Corrales |
| 2014/0213256 A1 | 7/2014 | Meylan et al. |
| 2014/0215506 A1 | 7/2014 | Kalmes et al. |
| 2014/0242991 A1 | 8/2014 | Yanover et al. |
| 2014/0274110 A1 | 9/2014 | Mehta et al. |
| 2014/0280901 A1 | 9/2014 | Balachandran et al. |
| 2014/0281489 A1 | 9/2014 | Peterka et al. |
| 2014/0282721 A1 | 9/2014 | Kuncl et al. |
| 2014/0283137 A1 | 9/2014 | Rebaud et al. |
| 2014/0288980 A1 | 9/2014 | Lee et al. |
| 2014/0309868 A1 | 10/2014 | Ricci |
| 2014/0328257 A1 | 11/2014 | Kamlani |
| 2014/0359649 A1 | 12/2014 | Cronk et al. |
| 2015/0036514 A1 | 2/2015 | Zhu et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1 | 4/2015 | Butchko et al. |
| 2015/0106501 A1 | 4/2015 | Malets et al. |
| 2015/0106846 A1 | 4/2015 | Chen et al. |
| 2015/0146537 A1 | 5/2015 | Panaitopol et al. |
| 2015/0156129 A1 | 6/2015 | Tsuruoka et al. |
| 2015/0189377 A1 | 7/2015 | Wheatley et al. |
| 2015/0215367 A1 | 7/2015 | Hayes et al. |
| 2015/0288617 A1 | 10/2015 | Dasher et al. |
| 2015/0288732 A1 | 10/2015 | Phillips et al. |
| 2015/0305082 A1 | 10/2015 | Elliott et al. |
| 2015/0365833 A1 | 12/2015 | Stafford et al. |
| 2016/0019103 A1 | 1/2016 | Basra |
| 2016/0066234 A1 | 3/2016 | Cho et al. |
| 2016/0127185 A1 | 5/2016 | McAllister |
| 2016/0242071 A1 | 8/2016 | Chen et al. |
| 2016/0261986 A1 | 9/2016 | Nord et al. |
| 2016/0301525 A1 | 10/2016 | Canard et al. |
| 2016/0315672 A1 | 10/2016 | Patwardhan |
| 2016/0316334 A1 | 10/2016 | Lection |
| 2017/0099327 A1 | 4/2017 | Negalaguli et al. |

(56) References Cited

U.S. PATENT DOCUMENTS

| | | | |
|---|---|---|---|
| 2017/0164378 | A1 | 6/2017 | Gunasekara |
| 2017/0164416 | A1 | 6/2017 | Yeddala et al. |
| 2017/0208632 | A1 | 7/2017 | Gunasekara et al. |
| 2017/0223536 | A1 | 8/2017 | Gupta et al. |
| 2017/0257750 | A1 | 9/2017 | Gunasekara et al. |
| 2017/0265084 | A1 | 9/2017 | Clegg |
| 2017/0303138 | A1 | 10/2017 | Barmettler |
| 2017/0366983 | A1 | 12/2017 | Gunasekara et al. |
| 2018/0132060 | A1 | 5/2018 | Dhulipalla et al. |

FOREIGN PATENT DOCUMENTS

| | | | |
|---|---|---|---|
| GB | 2381709 | A | 5/2003 |
| JP | H08263440 | A | 10/1996 |
| JP | 2000156676 | A | 6/2000 |
| JP | 2000332746 | A | 11/2000 |
| JP | 2001243707 | A | 9/2001 |
| JP | 2001274786 | A | 10/2001 |
| JP | 2001274788 | A | 10/2001 |
| JP | 2001285821 | A | 10/2001 |
| JP | 2002163396 | A | 6/2002 |
| JP | 2002352094 | A | 12/2002 |
| JP | 2003058657 | A | 2/2003 |
| JP | 2003162600 | A | 6/2003 |
| JP | 2003233690 | A | 8/2003 |
| JP | 2003248508 | A | 9/2003 |
| JP | 2003296484 | A | 10/2003 |
| JP | 2003348508 | A | 12/2003 |
| JP | 2004030111 | A | 1/2004 |
| JP | 2004072721 | A | 3/2004 |
| JP | 2004120736 | A | 4/2004 |
| JP | 2004120738 | A | 4/2004 |
| JP | 2004303111 | A | 10/2004 |
| JP | 2005506627 | A | 3/2005 |
| JP | 2005519365 | A | 6/2005 |
| JP | 2005519501 | A | 6/2005 |
| JP | 2005339093 | A | 12/2005 |
| JP | 2006185473 | A | 7/2006 |
| JP | 2006311267 | A | 11/2006 |
| JP | 2007020144 | A | 1/2007 |
| JP | 2008005047 | A | 1/2008 |
| JP | 2008015936 | A | 1/2008 |
| JP | 2008021293 | A | 1/2008 |
| JP | 2008507905 | A | 3/2008 |
| JP | 2008167018 | A | 7/2008 |
| JP | 2008186272 | A | 8/2008 |
| JP | 2008206039 | A | 9/2008 |
| JP | 2009071786 | A | 4/2009 |
| JP | 2009515238 | A | 4/2009 |
| JP | 2009176060 | A | 8/2009 |
| JP | 2009211632 | A | 9/2009 |
| JP | 2010502109 | A | 1/2010 |
| JP | 2010079902 | A | 4/2010 |
| JP | 2012505436 | A | 3/2012 |
| JP | 2012523614 | A | 10/2012 |
| WO | WO-0103410 | A1 | 1/2001 |
| WO | WO-0110125 | A1 | 2/2001 |
| WO | WO-0137479 | A1 | 5/2001 |
| WO | WO-0169842 | A1 | 9/2001 |
| WO | WO-0177778 | A2 | 10/2001 |
| WO | WO-0213032 | A1 | 2/2002 |
| WO | WO-0221841 | A1 | 3/2002 |
| WO | WO-0242966 | A1 | 5/2002 |
| WO | WO-02080556 | A1 | 10/2002 |
| WO | WO-03038704 | A1 | 5/2003 |
| WO | WO-03087799 | A1 | 10/2003 |
| WO | WO-03093944 | A2 | 11/2003 |
| WO | WO-2004027622 | A2 | 4/2004 |
| WO | WO-2005015422 | A1 | 2/2005 |
| WO | WO-2006020141 | A2 | 2/2006 |
| WO | WO-2008080556 | A1 | 7/2008 |
| WO | WO-2009020476 | A2 | 2/2009 |
| WO | WO-2012021245 | A1 | 2/2012 |

OTHER PUBLICATIONS

Internet Protocol DARPA Internet Program Protocol Specification, IETF RFC 791 (Sep. 1981).
5C Digital Transmission Content Protection White Paper, Hitachi, Ltd., et al., dated Jul. 14, 1998, 15 pages.
Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/security/saml/v2.0/saml-core-2.0-os.pdf).
Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).
Cisco Intelligent Network Architecture for Digital Video—SCTE Cable-Tec Expo 2004 information page, Orange County Convention Center, Jun. 2004, 24 pages.
DCAS Authorized Service Domain, Version 1.2, dated Nov. 4, 2008, 58 pages.
DCAS Licensed Specification Abstracts, CableLabs Confidential Information, Jan. 12, 2006, 4 pages.
DVB (Digital Video Broadcasting), DVB Document A045 Rev. 3, Jul. 2004, "Head-end Implementation of SimulCrypt," 289 pages.
DVB (Digital Video Broadcasting); DVB SimulCrypt; Part 1: "Head-end architecture and synchronization" Technical Specification—ETSI TS 101 197 V1.2.1 (Feb. 2002), 40 pages.
Federal Information Processing Standards Publication, US FIPS Pub 197, Nov. 26, 2001, "Advanced Encryption Standards (AES)," 47 pages.
Gomez, Conserving Transmission Power in Wireless Ad Hoc Networks, 2001, Network Protocols.
Griffith, et al.,Resource Planning and Bandwidth Allocation in Hybrid Fiber-Coax Residential Networks, National Institute of Standards and Technology (NIST), 10 pages, no date.
Gupta V., et al., "Bit-Stuffing in 802.11 Beacon Frame: Embedding Non-Standard Custom Information," International Journal of Computer Applications, Feb. 2013, vol. 63 (2), pp. 6-12.
High-bandwidth Digital Content Protection System, Revision 1.091, dated Apr. 22, 2003, Digital Content Protection LLC Draft, 78 pages.
Kanouff, Communications Technology: Next-Generation Bandwidth Management—The Evolution of the Anything-to-Anywhere Network, 8 pages, Apr. 1, 2004.
Marusic, et al., "Share it!—Content Transfer in Home-to-Home Networks." IEEE MELECON 2004, May 12-15, 2004, Dubrovnik, Croatia.
Media Server; 1 Device Template Version 1.01 Jun. 25, 2002.
Miao , et al., "Distributed interference-aware energy-efficient power optimization," IEEE Transactions on Wireless Communications, Apr. 2011, vol. 10 (4), pp. 1323-1333.
Motorola DOCSIS Cable Module DCM 2000 specifications, 4 pages, copyright 2001.
OpenCable Application Platform Specification, OCAP 2.0 Profile, OC-SP-OCAP2.0-I01-020419, Apr. 19, 2002.
OpenCable Application Platform Specifications, OCAP Extensions, OC-SP-OCAP-HNEXT-I03-080418, 2005-2008.
OpenCable Host Device, Core Functional Requirements, OC-SP-HOST-CFR-I13-030707, Jul. 7, 2003.
OpenCable, HOST-POD Interface Specification, OC-SP-HOSTPOD-IF-I13-030707, Jul. 7, 2003.
OpenCable Specification, Home Networking Protocol 2.0, OC-SP-HNP2.0-I01-08418, 2007.
OpenCable Specifications, Home Networking Security Specification, OC-SP-HN-SEC-DO1-081027, draft (Oct. 27, 2008).
OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).
OpenVision Session Resource Manager features and information, 2 pages, no date, (http://www.imake.com/hopenvision).
Primergy BX300 Switch Blade user's manual, Fujitsu Corp., Sep. 30, 2002, first edition, pp. 1 to 20.

(56) References Cited

OTHER PUBLICATIONS

Real System Media Commerce Suite (Technical White Paper), at http://docs.real.com/docs/drm/DRM.sub-WP1.pdf, 12 pages, Nov. 2001.
Van Moffaert, A., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.
Zhang, et al., "A Flexible Content Protection System for Media-On-Demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0-7695-1857-2.

\* cited by examiner

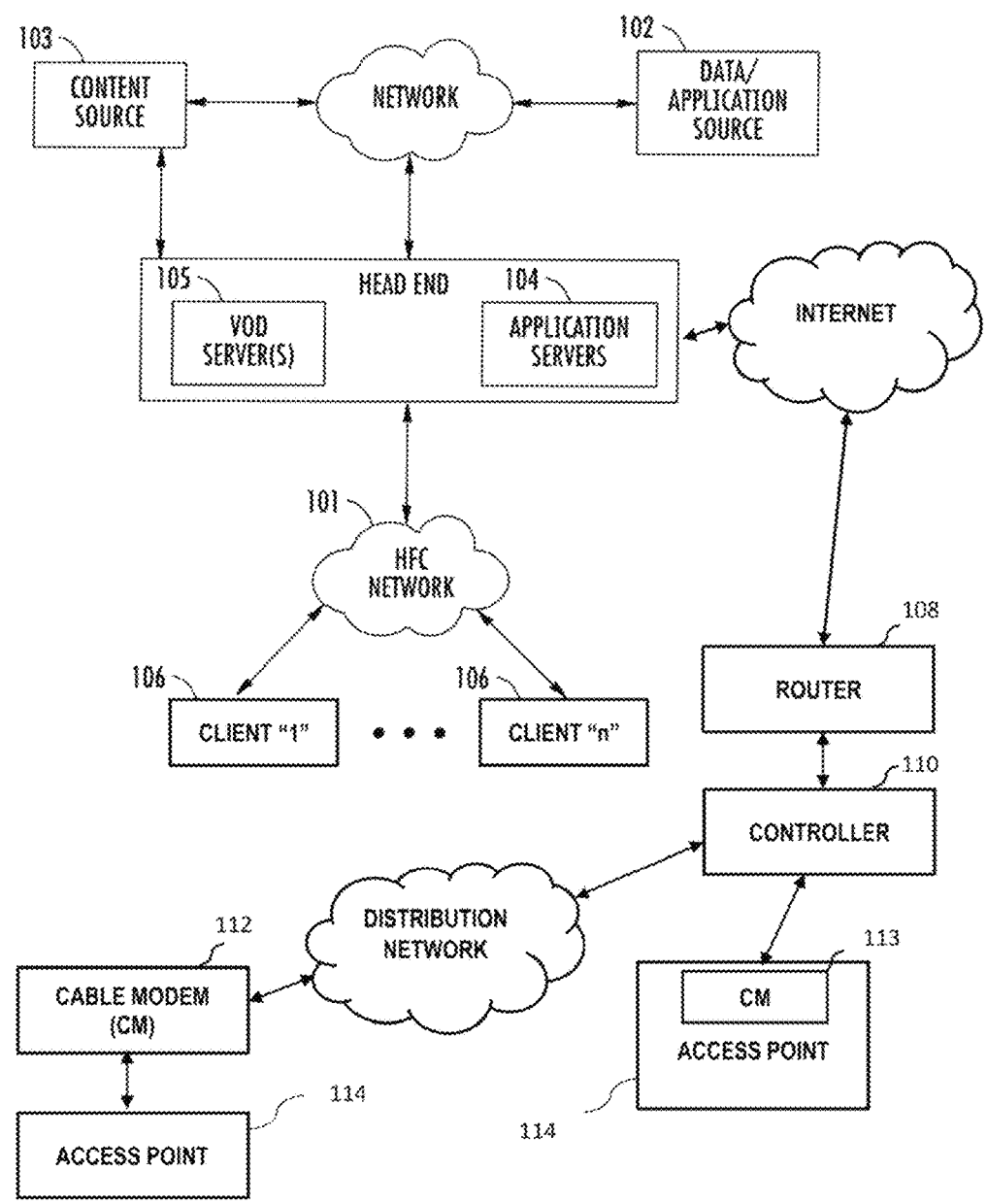

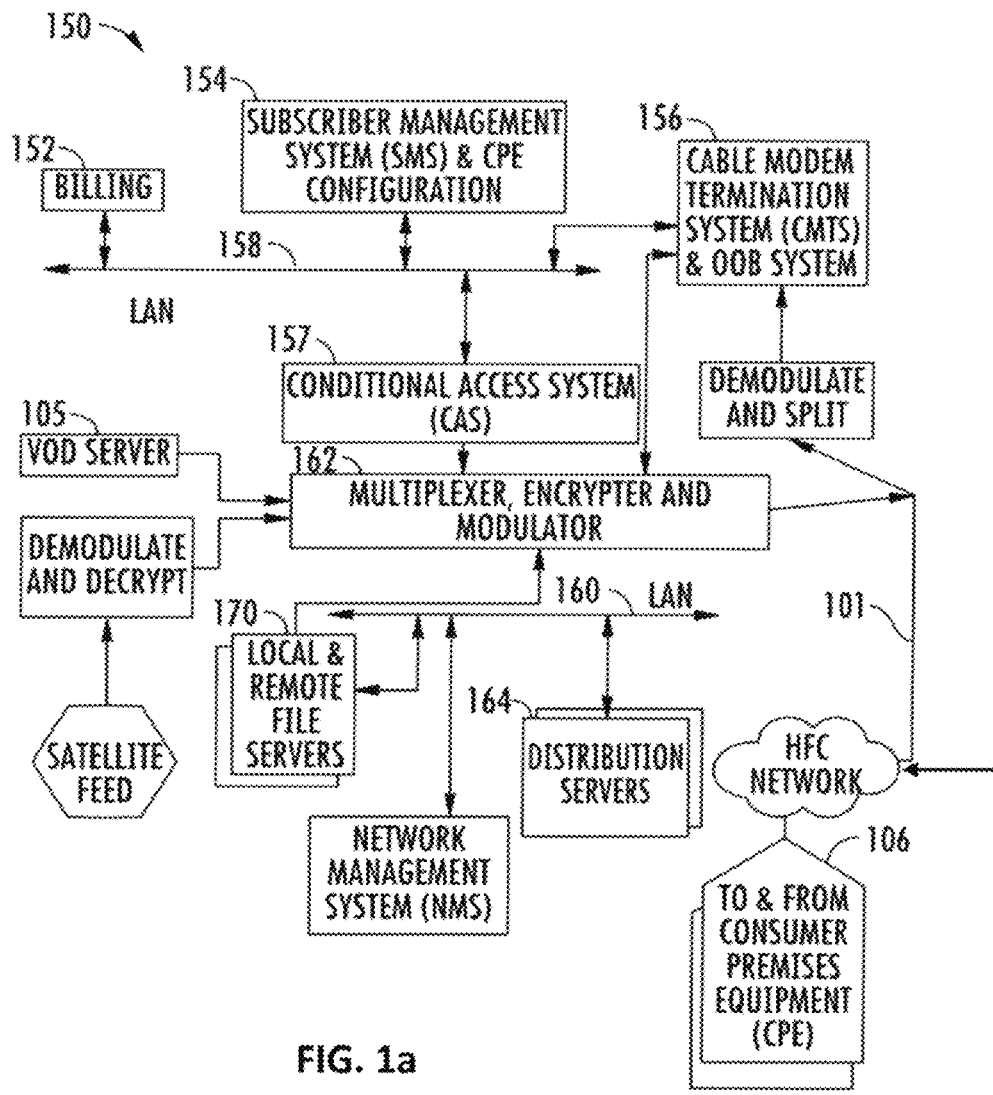
FIG. 1a
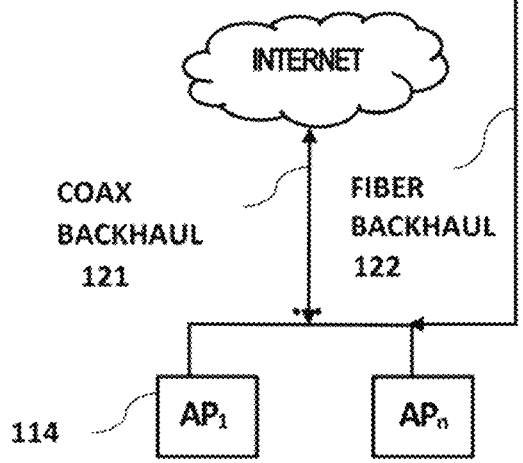

METHODS AND APPARATUS FOR CLIENT-BASED DYNAMIC CONTROL OF CONNECTIONS TO CO-EXISTING RADIO ACCESS NETWORKS

RELATED APPLICATIONS

The present application is generally related to the subject matter of co-owned and co-pending U.S. patent application Ser. No. 15/615,686 filed Jun. 6, 2017 and entitled "METHODS AND APPARATUS FOR DYNAMIC CONTROL OF CONNECTIONS TO CO-EXISTING RADIO ACCESS NETWORKS"; U.S. patent application Ser. No. 15/612,630 filed Jun. 2, 2017 and entitled "APPARATUS AND METHODS FOR PROVIDING WIRELESS SERVICE IN A VENUE"; U.S. patent application Ser. No. 15/183,159 filed Jun. 15, 2016 and entitled "APPARATUS AND METHODS FOR MONITORING AND DIAGNOSING A WIRELESS NETWORK"; U.S. patent application Ser. No. 15/063,314 filed Mar. 7, 2016 and entitled "APPARATUS AND METHODS FOR DYNAMIC OPEN-ACCESS NETWORKS"; U.S. patent application Ser. No. 15/002,232 filed Jan. 20, 2016 and entitled "APPARATUS AND METHOD FOR WIRELESS NETWORK SERVICES IN MOVING VEHICLES"; U.S. patent application Ser. No. 14/959,948 filed Dec. 4, 2015 and entitled "APPARATUS AND METHOD FOR WIRELESS NETWORK EXTENSIBILITY AND ENHANCEMENT"; and U.S. patent application Ser. No. 14/959,885 filed Dec. 4, 2015 and entitled "APPARATUS AND METHODS FOR SELECTIVE DATA NETWORK ACCESS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically controlling and optimizing connections to coexisting radio access networks ("RANs"), such as those providing connectivity via Wi-Fi, LTE-U (Long Term Evolution in unlicensed spectrum) and/or LTE-LAA (Long Term Evolution, Licensed Assisted Access) technologies.

2. Description of Related Technology

A multitude of wireless networking technologies, also known as Radio Access Technologies ("RATs"), provide the underlying means of connection for radio-based communication networks to user devices. User client devices currently in use (e.g., smartphone, tablet, phablet, laptop, smartwatch, or other wireless-enabled devices, mobile or otherwise) generally support one or more RATs that enable the devices to connect to one another, or to networks (e.g., the Internet, intranets, or extranets). In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

One such technology that enables a user to engage in wireless communication (e.g., via services provided through the cable network operator) is Wi-Fi® (IEEE Std. 802.11), which has become a ubiquitously accepted standard for wireless networking in consumer electronics. Wi-Fi allows client devices to gain convenient high-speed access to networks (e.g., wireless local area networks (WLANs)) via one or more access points.

Commercially, Wi-Fi is able to provide services to a group of users within a venue or premises such as within a trusted home or business environment, or outside, e.g., cafes, hotels, business centers, restaurants, and other public areas. A typical Wi-Fi network setup may include the user's client device in wireless communication with an AP (and/or a modem connected to the AP) that are in communication with the backend, where the client device must be within a certain range that allows the client device to detect the signal from the AP and conduct communication with the AP.

Another wireless technology in widespread use is Long-Term Evolution standard (also colloquially referred to as "LTE," "4G," "LTE Advanced," among others). An LTE network is powered by an Evolved Packet Core ("EPC"), an Internet Protocol (IP)-based network architecture and eNodeB—Evolved NodeB or E-UTRAN node which part of the Radio Access Network (RAN), capable of providing high-speed wireless data communication services to many wireless-enabled devices of users with a wide coverage area.

Currently, most consumer devices include multi-RAT capability; e.g.; the capability to access multiple different RATs, whether simultaneously, or in a "fail over" manner (such as via a wireless connection manager process running on the device). For example, a smartphone may be enabled for LTE data access, but when unavailable, utilize one or more Wi-Fi technologies (e.g., 802.11g/n/ac) for data communications.

The capabilities of different RATs (such as LTE and Wi-Fi) can be very different, including regarding establishment of wireless service to a given client device. For example, there is a disparity between the signal strength threshold for initializing a connection via Wi-Fi vs. LTE (including LTE-U and LTE-LAA). As a brief aside, LTE-U enables data communication via LTE in an unlicensed spectrum (e.g., 5 GHz) to provide additional radio spectrum for data transmission (e.g., to compensate for overflow traffic). LTE-LAA uses carrier aggregation to combine LTE in unlicensed spectrum (e.g., 5 GHz) with the licensed band.

Typical levels of signal strength required for LTE-U or LTE-LAA service are approximately −80 to −84 dBm. In comparison, Wi-Fi can be detected by a client device based on a signal strength of approximately −72 to −80 dBm, i.e., a higher (i.e., less sensitive) detection threshold. Moreover, the mechanisms for connecting to various types of RATs may vary in their protocol, including what is colloquially referred to as "politeness." For instance, a Wi-Fi connection protocol may be structured to be unobtrusive when in the presence of other RATs such that the other RATs will preferentially connect before Wi-Fi. This is particularly true where the RF signal strength levels for the various RATs are generally of similar magnitude (i.e., such that no particular RAT "stands out").

When a client device is in an environment where coexisting LTE and Wi-Fi services are available for connection to a network (e.g., public venues), the client device may automatically and/or persistently prioritize a connection to LTE providers despite the presence of nearby existing Wi-Fi equipment (e.g., an AP providing network connectivity via Wi-Fi). Specifically, if LTE and Wi-Fi services are available on the same operating frequency band (e.g., 5 GHz), the client device may connect via LTE by virtue of its relatively aggressive connection mechanism, even when it is not the intention of the user. For instance, the user may be under a service contract with one or more LTE carriers that may charge access fees or count LTE "data" consumption against a limited quota, and hence desire to use Wi-Fi (and its corresponding unlimited data) when at all possible. Other instances where Wi-Fi is required or heavily preferred may include, inter alia, (i) for conservation of battery power at low reserves, (ii) when consuming data services over a comparatively long period of time (e.g., voice-over-IP (VoIP) calls, video chats, or large data transfers), and/or (iii) for access to services particular to a service provider of which the user is a subscriber (including for use of a software application specifically designed for use by the service provider). The user may also prefer a consistent connection to avoid discontinuities associated with handovers between LTE nodes (cell towers, small cells, eNBs (evolved NodeBs), base stations, etc.). Moreover, when LTE or other RAT connectivity is prioritized by the user's mobile devices, some service providers (e.g., cable network operators) cannot provide services to their existing subscribers or capture new ad hoc users as effectively within public venues as compared to use of Wi-Fi.

Therefore, solutions are needed to, inter alia, allow Wi-Fi or other WLAN RAT service providers to compete effectively against LTE or other more "aggressive" RATs in such coexistence environments. Specifically, what are needed are means for dynamically controlling access to co-existing RATs such that user and/or service provider preferences and functionality are optimized.

SUMMARY

The present disclosure addresses the foregoing needs by providing, inter alia, methods and apparatus for dynamically controlling connections to coexisting radio access networks, including the implementation of situation- and/or location-specific connection rules.

In one aspect of the present disclosure, a method for enabling wireless connectivity to at least one client device is provided. In one embodiment, the method includes: detecting a first type of wireless signal, the detecting comprising receiving data from a first radio frequency (RF) receiver apparatus of the at least one mobile client device; modifying one or more parameters associated with an interface apparatus utilizing a second type of wireless signal and based at least in part on the data from the first RF receiver apparatus; and transmitting data relating to the modified one or more parameters to the interface apparatus, the transmitted data enabling the interface apparatus to adjust one or more operational characteristics thereof with respect to the second type of wireless signal.

In one variant, the interface apparatus includes a wireless LAN (WLAN) access point; the first type of wireless signal includes a cellular data standard-compliant signal; and the modifying of the one or more parameters associated with the second type of radio signal includes modifying one or more of: (i) a frequency band used by the second type of wireless signal, and (ii) a transmit power of second type of wireless signal used by the interface apparatus.

In another variant, the interface apparatus includes a wireless LAN (WLAN) access point operating in an unlicensed frequency band; the first type of wireless signal includes a cellular data standard-compliant signal operating in the unlicensed frequency band; and the modifying of the one or more parameters associated with the second type of radio signal includes modifying a beamforming scheme utilized used by the interface apparatus, the modifying of the beamforming scheme comprising adjustment of one or more spatial parameters associated with a multiple input multiple output (MIMO) spatial diversity capability of the interface apparatus.

In a further variant, the second type of wireless signal includes signals compliant with a Wi-Fi (IEEE-802.11) standard; and the first type of wireless signal includes signals compliant with a Long Term Evolution (LTE)-based standard, the LTE standard comprising at least one of (i) LTE-U (Long Term Evolution in unlicensed spectrum), and/or (ii) LTE-LAA (Long Term Evolution, Licensed Assisted Access). In one implementation, the detecting a first type of wireless signal, the detecting comprising receiving data from a first radio frequency (RF) receiver apparatus includes detecting one or more of an Reference Signal Received Power (RSRP) or Reference Signal Received Quality (RSRQ) value, and the modifying one or more parameters associated with an interface apparatus utilizing a second type of wireless signal and based at least in part on the data from the first RF receiver apparatus includes calculating a Signal to Interference Noise Ratio (SINR) value, and determining a transmit power associated with the second type of wireless signal based at least on the SINR.

In another aspect of the disclosure, a method for enhancing wireless connectivity for a mobile client device is disclosed. In one embodiment, the method includes: receiving data from a first radio frequency (RF) receiver apparatus of the mobile client device; evaluating, using a computerized process operative to run on the mobile client device, at least a portion of the received data to determine the presence of a first type of wireless signal; and modifying one or more parameters associated with a wireless interface of the mobile device, the wireless interface utilizing a second type of wireless signal.

In one variant, the modifying is based at least in part on the data from the first RF receiver apparatus and configured to cause the mobile client device to preferentially utilize the wireless interface and the second type of wireless signal for data communications over the first type of wireless signal. The first radio frequency receiver apparatus includes e.g., a Long-Term Evolution (LTE) based interface, and the wireless interface includes a Wi-Fi based interface; and the evaluating at least a portion of the received data to determine the presence of a first type of wireless signal includes decoding of one or more LTE public channels without establishing a connection to an LTE eNodeB. In one implementation, the decoding of one or more LTE public channels without establishing a connection to an LTE eNodeB includes decode of at least one of a physical downlink control channel (PDCCH) or physical downlink shared channel (PDSCH); the evaluating includes using one or more of an Reference Signal Received Power (RSRP) or Reference Signal Received Quality (RSRQ) value to calculate a signal strength associated with the eNodeB, and the modifying one or more parameters associated with a wireless interface includes reducing an energy detection (ED) threshold associated with the Wi-Fi based interface.

In another implementation, the decoding of one or more LTE public channels without establishing a connection to an LTE eNodeB includes decode of at least one of a physical downlink control channel (PDCCH) or physical downlink shared channel (PDSCH); the evaluating includes using one or more of an Reference Signal Received Power (RSRP) or Reference Signal Received Quality (RSRQ) value to calculate a signal strength associated with the eNodeB, and the modifying one or more parameters associated with a wireless interface includes increasing an transmit power associated with the Wi-Fi based interface.

In a further aspect, computer readable apparatus comprising a storage medium is disclosed. In one embodiment, the storage medium includes at least one computer program having a plurality of instructions, the plurality of instructions configured to, when executed on a processing apparatus of a mobile user device: utilize a first radio frequency apparatus of the mobile user device to obtain data relating to first wireless signals present at a location of the mobile user device; and cause transmission of at least a portion of the obtained data to a network entity, the transmitted at least a portion of the obtained data configured to enable the network entity to adjust operation of at least one parameter relating to a second radio frequency apparatus of the mobile user device, the first and second radio frequency apparatus operating at least in part within a same frequency band.

In one variant, the at least one computer program includes an application computer program operative to run on the processing apparatus of the mobile user device, the application computer program comprising at least one connection management function, the connection management function configured to perform the utilization of the first radio frequency apparatus of the mobile user device to obtain the data relating to first wireless signals present at a location of the mobile user device at least: (i) in response to detection of a degradation in performance of the second radio frequency apparatus during use; and (ii) based on a data communication received from the network entity configured to cause the utilization.

In another variant, the at least one computer program includes at least one connection management function, the connection management function configured to perform the utilization of the first radio frequency apparatus of the mobile user device to obtain the data relating to first wireless signals present at a location of the mobile user device at least: (i) in response to detection of a degradation in performance of the second radio frequency apparatus during use; and (ii) based on a data communication received from the network entity configured to cause the utilization.

In yet a further variant, the transmission of at least a portion of the obtained data to a network entity includes the at least one computer program accessing an application programming interface (API) associated with a network server, the API configured to cause the network server to return a prescribed message format to the at least one computer program, the prescribed message format comprising configuration data for at least the second radio frequency apparatus.

In a further aspect of the disclosure, a method of preferentially causing wireless LAN (WLAN) access for a multi-mode mobile client device is disclosed. In one embodiment, the mobile client device has both a WLAN interface and an Long Term Evolution (LTE) cellular data interface, and a connection management process configured to select one of the WLAN interface and the LTE cellular data interface, and the method includes: obtaining, via a radio frequency apparatus of the mobile client device, data enabling the mobile client device to adjust one or more parameters associated with the WLAN interface, the adjustment to compensate for detection of operation of LTE radio access technology within an area within which the mobile client device is currently located; determining, using at least the connection management process, that the LTE cellular data interface is operating at a level of performance greater than that of the WLAN interface; based at least on the determining, adjusting the one or more parameters associated with the WLAN interface based at least on the obtained data; thereafter evaluating, using at least the connection management process, at least one aspect of the performance of the WLAN interface: and based at least on the evaluating, selecting the WLAN interface for data communications.

In one variant, the operation of the LTE radio access technology includes use of one of an LTE-U or LTE-LAA interface.

In a further aspect, a mobile user device is disclosed. In one embodiment, the user device includes first and second wireless interfaces configured to utilize respective first and second RATs, and a connection manager (CM) entity operative to run on the user device and control access by the first and second wireless interfaces to their respective RATs. In one implementation, the CM entity operates substantially autonomously of any external entities. In another implementation, the CM entity is configured to communicate with a network-side management entity, such as for control and/or enhancement of operation of one of the RATs when that RAT is preferentially desired over the other RAT.

In yet another implementation, the mobile device CM entity operates semi-autonomously from the network-side management entity.

In another embodiment, the mobile device is further in communication with a network-side provisioning entity, the latter which can, inter alia, configure and update the CM entity on the mobile device.

In another aspect of the present disclosure, a controller apparatus is provided. In one embodiment, the controller apparatus is configured for use within a managed content delivery network, and to manage wireless connectivity to a wireless-enabled device, and includes: a processor apparatus; and a storage apparatus in data communication with the processor apparatus and having a non-transitory computer-readable storage medium, the storage medium comprising at least one computer program having a plurality of instructions stored thereon. In one variant, the plurality of instructions are configured to, when executed by the processor apparatus, cause the controller apparatus to: receive data relating to a detection by one or more mobile devices of a concurrent deployment of a first radio protocol and a second radio protocol within at least a prescribed area; obtain data representative of a configuration of an wireless access point (AP) located within the prescribed area, the data comprising data descriptive of a plurality of parameters associated with a wireless interface of the wireless AP utilizing the first radio protocol; modify the data representative of the configuration, the modification comprising an update of at least one of the plurality of parameters; and transmit the modified data representative of the configuration to the wireless AP, the modified data enabling the wireless AP to modify at least one operational characteristic associated with the wireless interface based on the updated at least one parameter.

In a further aspect of the present disclosure, business methods for enabling an alternative type of wireless connectivity to one or more user devices are provided.

In a further aspect of the present disclosure, business methods for collecting data usage information via wireless connectivity provided to one or more user devices are provided.

These and other aspects shall become apparent when considered in light of the disclosure provided herein.

BRIEF DESCRIPTION OF THE DRAWINGS

FIG. 1 is a functional block diagram illustrating an exemplary hybrid fiber network configuration useful with various aspects of the present disclosure.

FIG. 1a is a functional block diagram illustrating one exemplary network headend configuration useful with various aspects of the present disclosure.

Figure 1B:
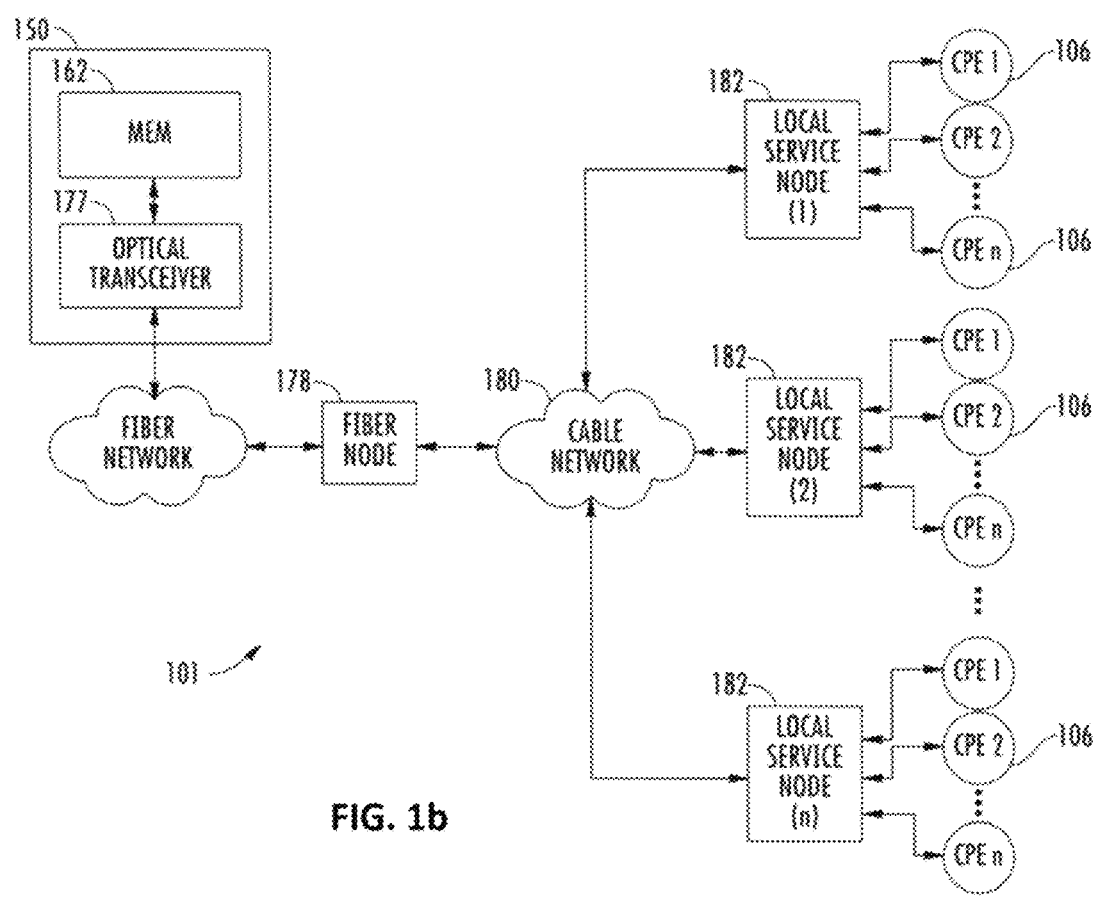
FIG. 1b is a functional block diagram illustrating one exemplary local service node configuration useful with various aspects of the present disclosure.

All figures © Copyright 2017 Charter Communications, Inc. All rights reserved.

DETAILED DESCRIPTION

Reference is now made to the drawings wherein like numerals refer to like parts throughout.

As used herein, the term "access point" refers generally and without limitation to a network node which enables communication between a user or client device and another entity within a network, such as for example a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable).

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

Overview

A connection management mechanism for a network access technology may be inadequate in the presence of another competing network access technology that employs a more aggressive connection mechanism, especially within the context of a public venue or consumer premises environment. The present disclosure provides, inter alia, an "intelligent" client device which can operate either autonomously, semi-autonomously, or non-autonomously of a network controller and associated architecture, so as to enable connectivity to a given network (radio access technology or "RAT") while coexisting with another competing or even interfering network access technology.

In one exemplary embodiment of the present disclosure, a wireless local area network (WLAN) associated with a managed content delivery network is configured to provide an "aggressive" or preferential network connectivity (e.g., to the Internet or intranets) to client devices (e.g., smartphones, laptops, tablets, or smartwatches) via one or more wireless access points. The wireless access points may include for instance Wi-Fi access points (APs) within a given venue or premises, the Wi-Fi APs being configured to provide enhanced Wi-Fi connectivity to client devices within range of the APs, while coexisting with another network access technology such as LTE-U or LTE-LAA (the latter providing service via cellular towers, small cells, etc.) nearby or within the same venue.

Wi-Fi protocols typically do not allow an AP or other device to encroach on a channel when there may be another network attempting to use the channel. The present disclosure describes methods, apparatus and systems for prioritizing accesses between networks via a change in connection mechanisms of one of the networks. In one implementation, operation of WLAN access points and/or client devices are modified in order to provide a desired connection "profile" and procedure for one of the network access technologies (e.g., the Wi-Fi WLAN) so as to achieve a desired result, the latter which may be e.g., a more aggressive WLAN connection protocol in certain prescribed circumstances.

In one exemplary configuration, a radio frequency apparatus of a client device is used to detect signals from one or more competitive radio access technologies (RATs) such as LTE-U and LTE-LAA, occupying the same frequency band and/or channel(s) as the target or preferred interface (e.g., Wi-Fi). The detection of signals is managed by an on-board connection manager entity (CME) residing in the client device/UE; i.e., an application program ("app") or middleware resident on the client/UE. The CME is configured, depending on mode, to operate either autonomously, semi-autonomously, or non-autonomously of its corresponding network "coexistence" controller (CC), the latter which manages the Wi-Fi APs (such as those within a prescribed area or venue). The CC is in data communication with a backend connection provisioning server (PS), as well as a database that stores configuration files associated with known APs. The PS sends (e.g., "pushes") to the controller (CC), or the controller may retrieve or pull from the PS or database(s), configuration data associated with a WLAN AP that is serving client devices and that may be excluded from providing such service by virtue of a more aggressive connection mechanism by another RAT, e.g., LTE-U or LTE-LAA. The PS can also communicate directly with the client device, including for new installation of the CME, updates, or operational configuration changes (such as e.g., flag-setting within the CME logic to indicate the presence of one or more competitive RATs, thereby invoking the CME-based protocols).

In one implementation, the CC modifies one or more connectivity parameters or characteristics for the AP of the affected RAT (e.g., Wi-Fi), such as transmit power (e.g., increase signal strength), energy detection (ED) threshold (e.g., decrease to −80 dBm), frequency or channel used (e.g., switch from 5 GHz to another frequency), beamform settings, physical configuration of antennas, modulation scheme, handover criteria, etc. The CC then sends the modified transmit parameters (contained in a data structure such as a configuration file) to the AP, thereby causing the modified parameters to be implemented at the AP. Modified parameters may later be disabled or overridden with original or yet other configurations. When in communication, the CC may also push changes or modified parameters to the CME on the client when the CC detects other Rats competing for the same channel that the client (and its associated AP) are utilizing, such as to lower its ED threshold, thereby making the preferred (e.g., Wi-Fi) RAT more "attractive" as a connectivity option. The CC can, in one embodiment, also force the client device (via the CME) into operation using the preferred RAT.

The solutions provided by the exemplary embodiments advantageously selectively sidestep the typical back-off mechanism for cautious protocols (e.g., those of Wi-Fi), and allow service providers (such as MSO networks) and their users or subscribers in the area or venue of interest to, inter alia, utilize the services with sufficient availability and bandwidth, obtain convenient access to subscribed media content, and save battery power (e.g., by obviating the need to constantly seek connections or switching networks).

A service provider may also capture new ad hoc users by offering a more level or accessible opportunity to utilize its services among competing RATs.

Detailed Description of Exemplary Embodiments

Exemplary embodiments of the apparatus and methods of the present disclosure are now described in detail. While these exemplary embodiments are described in the context of the previously mentioned WLANs associated with a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be recognized that while described in the exemplary context of providing wireless services to e.g., a venue or prescribed area, the methodologies and apparatus described herein may be readily utilized for providing wireless service in other context; e.g., wherever managed Wi-Fi coexists with deployed LTE-U/LTE-LAA.

It will also be appreciated that while described generally in the context of a network providing service to a customer or consumer or end user (i.e., within a prescribed venue, or other type of premises), the present disclosure may be readily adapted to other types of environments including, e.g., outdoors, commercial/retail, or enterprise domain (e.g., businesses), and government/military applications. Myriad other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network—

FIG. 1 illustrates a typical service provider network configuration useful with the features of the WLAN wireless network(s) described herein. This service provider network 100 is used in one embodiment of the disclosure to provide backbone and Internet access from the service provider's wireless access points (e.g., Wi-Fi APs or base stations operated or maintained by the service provider or its customers/subscribers), one or more cable modems (CMs) in data communication therewith, or even third party access points accessible to the service provider via, e.g., an interposed network such as the Internet (e.g., with appropriate permissions from the access point owner/operator/user).

As opposed to an unmanaged network, the managed service-provider network of FIG. 1 advantageously allows, inter alia, control and management of a given user's access (such user which may be a network subscriber, or merely an incidental/opportunistic user of the service) via the wireless access point(s), including imposition and/or reconfiguration of various access "rules" or other configurations applied to the wireless access points. For example, the service provider network 100 allows components at the venue of interest (e.g., Wi-Fi APs and any supporting infrastructure such as routers, switches, etc.) to be remotely reconfigured by the network MSO, based on e.g., prevailing operational conditions in the network, changes in user population and/or makeup of users at the venue, business models (e.g., to maximize profitability or provide other benefits such as enhanced user experience, as described infra), etc.

In certain embodiments, the service provider network also advantageously permits the aggregation and/or analysis of subscriber- or account-specific data (including inter alia, particular mobile devices associated with such subscriber or accounts) as part of the provision of services to users under the exemplary delivery models described herein. As but one example, device specific IDs (e.g., MAC address or the like) can be cross-correlated to MSO subscriber data maintained at e.g., the network headend(s) so as to permit or at least facilitate, among other things, (i) user authentication; (ii) correlation of aspects of the event or venue to particular subscriber demographics, such as for delivery of targeted advertising; and (iii) determination of subscription level, and/or subscriber privileges and access to content/features. Moreover, device profiles for particular user devices can be maintained by the MSO, such that the MSO (or its automated proxy processes) can model the user device for wireless capabilities.

The wireless access points (see discussion of FIG. 1a infra) disposed at the service location(s) (e.g., venue(s) of interest) can be coupled to the bearer managed network (FIG. 1) via, e.g., a cable modem termination system (CMTS) and associated local DOCSIS cable modem (CM), a wireless bearer medium (e.g., an 802.16 WiMAX system), a fiber-based system such as FiOS or similar, a third-party medium which the managed network operator has access to (which may include any of the foregoing), or yet other means.

Advantageously, the service provider network 100 also allows components at the service location (e.g., Wi-Fi APs and any supporting infrastructure such as routers, switches, etc.) to be remotely reconfigured by the network MSO, based on, e.g., prevailing operational conditions in the network, changes in user population and/or makeup of users at the service location, business models (e.g., to maximize profitability), etc. In certain embodiments, the service provider network also advantageously permits the aggregation and/or analysis of subscriber- or account-specific data (including inter alia, particular mobile devices associated with such subscriber or accounts) as part of the provision of services to users under the exemplary delivery models described herein.

The various components of the exemplary embodiment of the network 100 include (i) one or more data and application origination sources 102; (ii) one or more content sources 103, (iii) one or more application distribution servers 104; (iv) one or more video-on-demand (VOD) servers 105, (v) client devices 106, (vi) one or more routers 108, (vii) one or more wireless access point controllers 110 (may be placed more locally as shown or in the headend or "core" portion of network), (viii) one or more cable modems 112, and/or (ix) one or more access points 114 (which may or may not include embedded cable modems 113 as shown). The application server(s) 104, VOD servers 105 and client device(s) 106 are connected via a bearer (e.g., HFC) network 101. A simple architecture comprising one of each of certain components 102, 103, 104, 105, 108, 110 is shown in FIG. 1 for simplicity, although it will be recognized that comparable architectures with multiple origination sources, distribution servers, VOD servers, controllers, and/or client devices (as well as different network topologies) may be utilized consistent with the present disclosure. For example, the headend architecture of FIG. 1a (described in greater detail below), or others, may be used.

It is also noted that cable network architecture is typically a "tree-and-branch" structure, and hence multiple tiered APs may be linked to each other or cascaded via such structure.

FIG. 1a shows one exemplary embodiment of a headend architecture. As shown in FIG. 1a, the headend architecture 150 comprises typical headend components and services including billing module 152, subscriber management system (SMS) and client configuration management module 154, cable modem termination system (CMTS) and 00B system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend is adapted to acquire the information for the carried channels from various sources. Typically, the channels being delivered from the headend 150 to the client devices 106 ("downstream") are multiplexed together in the headend, as previously described and sent to neighborhood hubs (as shown in the exemplary scheme of FIG. 1b) via a variety of interposed network components.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end. It will be appreciated that the CPE 106 shown in FIG. 1b may in fact comprise CMTS or other devices such as the embedded cable modem AP 206, or wireless APs 202, 204, 206, 208 disposed within one or more venues, as described subsequently herein with respect to FIGS. 2-2a.

Figure 1C:
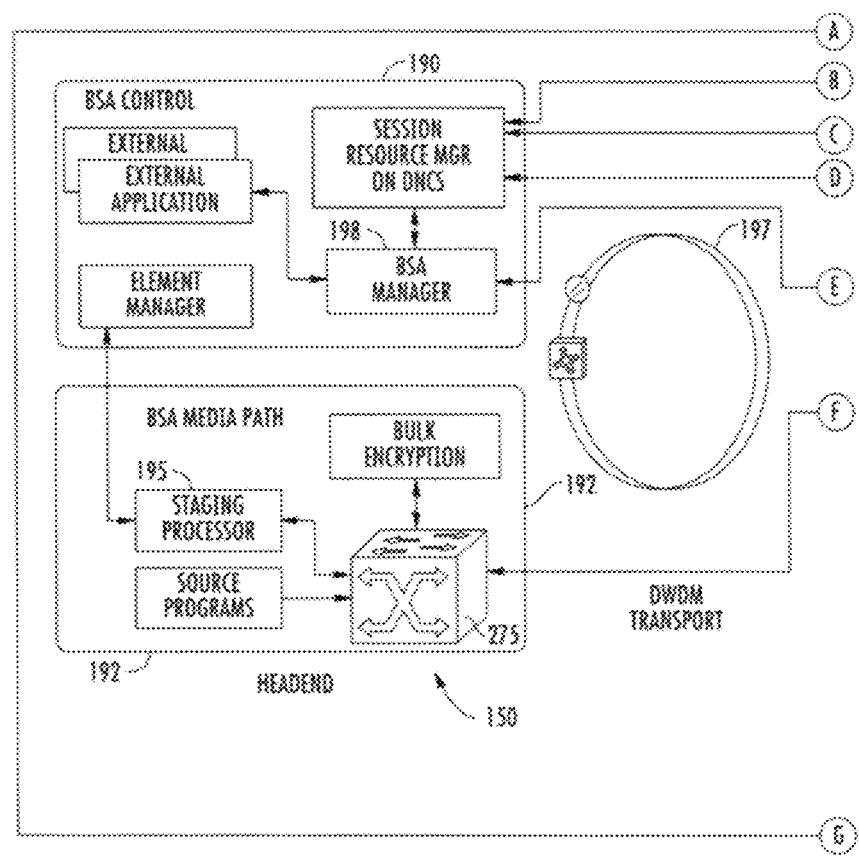
FIG. 1c is a functional block diagram illustrating one exemplary broadcast switched architecture (BSA) network useful with various aspects of the present disclosure.
Figure 1C:
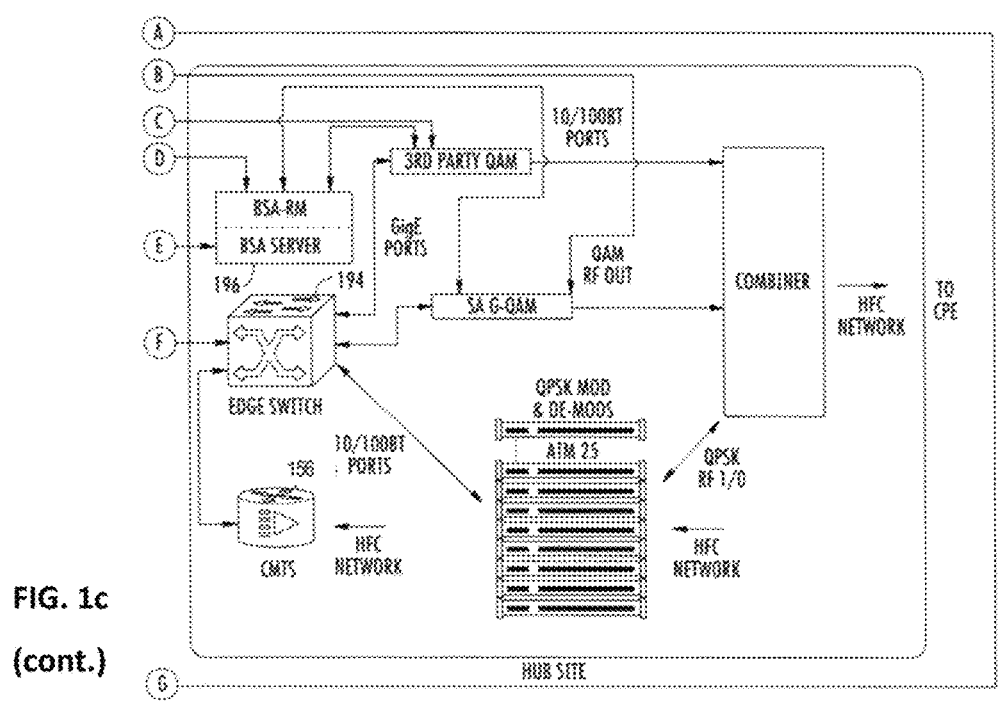

FIG. 1c illustrates an exemplary "switched" network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. Broadcast switched architecture (BSA) media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using Internet Protocol (IP), although other protocols and transport mechanisms of the type well known in the digital communication art may be substituted. One exemplary delivery paradigm comprises delivering MPEG-based video content, with the video transported to user client devices (including IP-based STBs or IP-enabled consumer devices) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists, i.e., delivery of video content both over traditional downstream QAMs to the tuner of the user's STB or other receiver device for viewing on the television, and also as packetized IP data over the DOCSIS QAMs to the user's client device or other IP-enabled device via the user's cable modem. Delivery in such packetized modes may be unicast, multicast, or broadcast.

Referring again to FIG. 1c, the IP packets associated with Internet services are received by the edge switch 194, and in one embodiment forwarded to the cable modem termination system (CMTS) 199. The CMTS examines the packets, and forwards packets intended for the local network to the edge switch 194. Other packets are discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

The edge switch 194 forwards the packets received from the CMTS 199 to the QAM modulator, which transmits the packets on one or more physical (QAM-modulated RF) channels to the client devices. The IP packets are typically transmitted on RF channels (e.g., DOCSIS QAMs) that are different that the RF channels used for the broadcast video and audio programming, although this is not a requirement. The client devices 106 are each configured to monitor the particular assigned RF channel (such as via a port or socket ID/address, or other such mechanism) for IP packets intended for the subscriber premises/address that they serve. For example, in one embodiment, a business customer premises obtains its Internet access (such as for a connected Wi-Fi AP) via a DOCSIS cable modem or other device capable of utilizing the cable "drop" to the premises (e.g., a premises gateway, etc.).

Figure 1D:
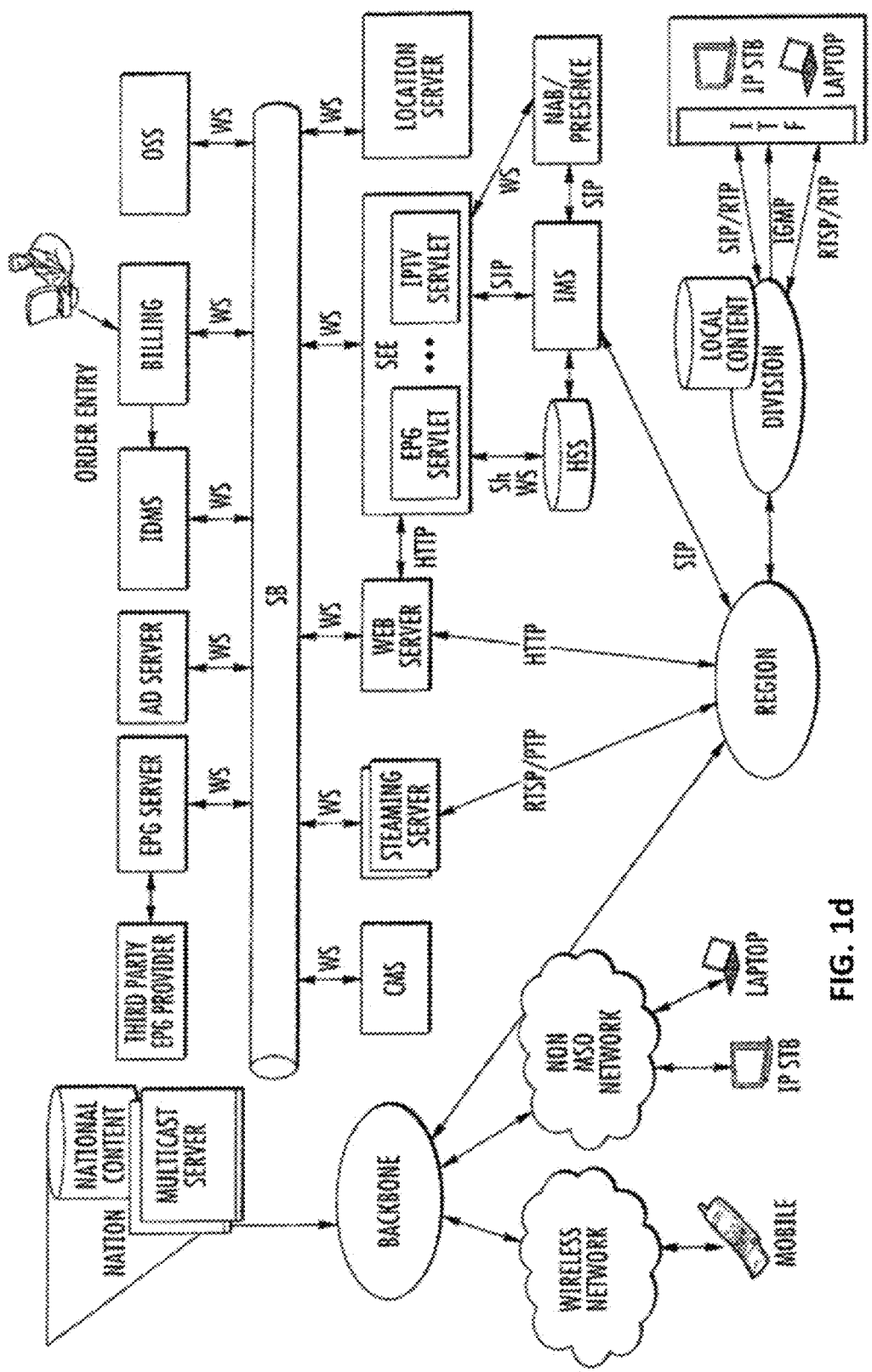
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., Internet data, IPTV content, etc.). FIG. 1d illustrates one exemplary implementation of such a network, in the context of a 3GPP IMS (IP Multimedia Subsystem) network with common control plane and service delivery platform (SDP), as described in co-owned and co-pending U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title, incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

It will be appreciated that the foregoing MSO or managed network can advantageously be leveraged for easy installation of the various APs (and/or any lower-level "children APs" as described in co-owned and co-pending U.S. patent application Ser. No. 15/002,232 entitled "APPARATUS AND METHOD FOR WIRELESS NETWORK SERVICES IN MOVING VEHICLES" and filed Jan. 20, 2016, incorporated supra) within a geographic region. Consider, for example, a MSO network that is already pervasive throughout a given area (i.e., the MSO has numerous customers, both business and residential and otherwise); in such networks, the MSO already has significant infrastructure deployed, at a very high level of granularity. Hence, if an AP needs to be placed at a given location in order to effect the coverage/operation for the Wi-Fi network described herein (e.g., for an impromptu concert or event held at a location not associated with any particular venue structure), the MSO can easily "tap off" the existing infrastructure in that area to enable the ad hoc AP placement. This may take the form of e.g., placement of an AP coincident with a given customer's extant equipment, and/or placement of new equipment that taps off a local service node.

It is also contemplated that the service provider may utilize or "piggyback" off the existing infrastructure or infrastructure of other service providers, utilities, etc. For instance, a third party service provider may have a high-bandwidth backhaul "drop" near a location or venue desired by the MSO; the MSO can then lease, pay, rent, etc. that third party for temporary use of the drop (e.g., for the duration of the event). Similarly, traffic signal poles, lighting, bridges, tunnels, etc. all contain a wide variety of cabling, conduits, and other infrastructure which the (host) MSO could make use of so as to obviate having to perform a new installation (and all of the attendant costs and delays thereof).

Network addressing in such "composite" or "parent/child" scenarios may assign each node of a network with an address that is unique to that network; the address can be used to communicate (directly via peer-to-peer communications, or indirectly via a series of "hops") with the corresponding device. In more complex networks, multiple layers of indirection may be used to assist in address exhaustion (e.g., one address is logically divided into another range of network addresses). Common examples of network routing protocols include: Internet Protocol (IP), Internetwork Packet Exchange (IPX), and OSI-based network technologies (e.g., Asynchronous Transfer Mode (ATM), Synchronous Optical Networking (SONET), Synchronous Digital Hierarchy (SDH), and Frame Relay.

Even with the myriad equipment implementations allowing an end user to access WLAN services (e.g., via APs, modems, intermediate entities, towers), some telecommunications providers have set up LTE services that are broadly available, including significant coverage in most areas of the developed world. In certain cases, this setup, in combination with LTE's comparatively aggressive connection mechanism that is dependent on a relatively lower signal detection threshold, causes client devices to transmit data over LTE rather than Wi-Fi in the same frequency band (e.g., 5 GHz), particularly in public venues without a trusted AP (e.g., a known home or office modem). This results in the aforementioned problems with respect to LTE prioritization; i.e., even when WLAN services are available and more desirable for a particular use case, the user equipment is "forced" into using LTE data, thereby potentially invoking additional costs, battery consumption, and other undesired effects.

Hence, given the desire for constant access to the Internet by consumers, current mechanisms for arbitrating between RATs (e.g., Wi-Fi and LTE-U/LTE-LAA) present challenges to the MSO (or dedicated portions thereof, such as AP controller, CMTS, etc.) to optimize its services to client devices. The present disclosure addresses these challenges by selectively controlling access to those RATs based at least in part on functionality obtained from a backend entity (e.g., a controller apparatus), as described in greater detail below.

Wireless Services Architecture—

Figure 2:
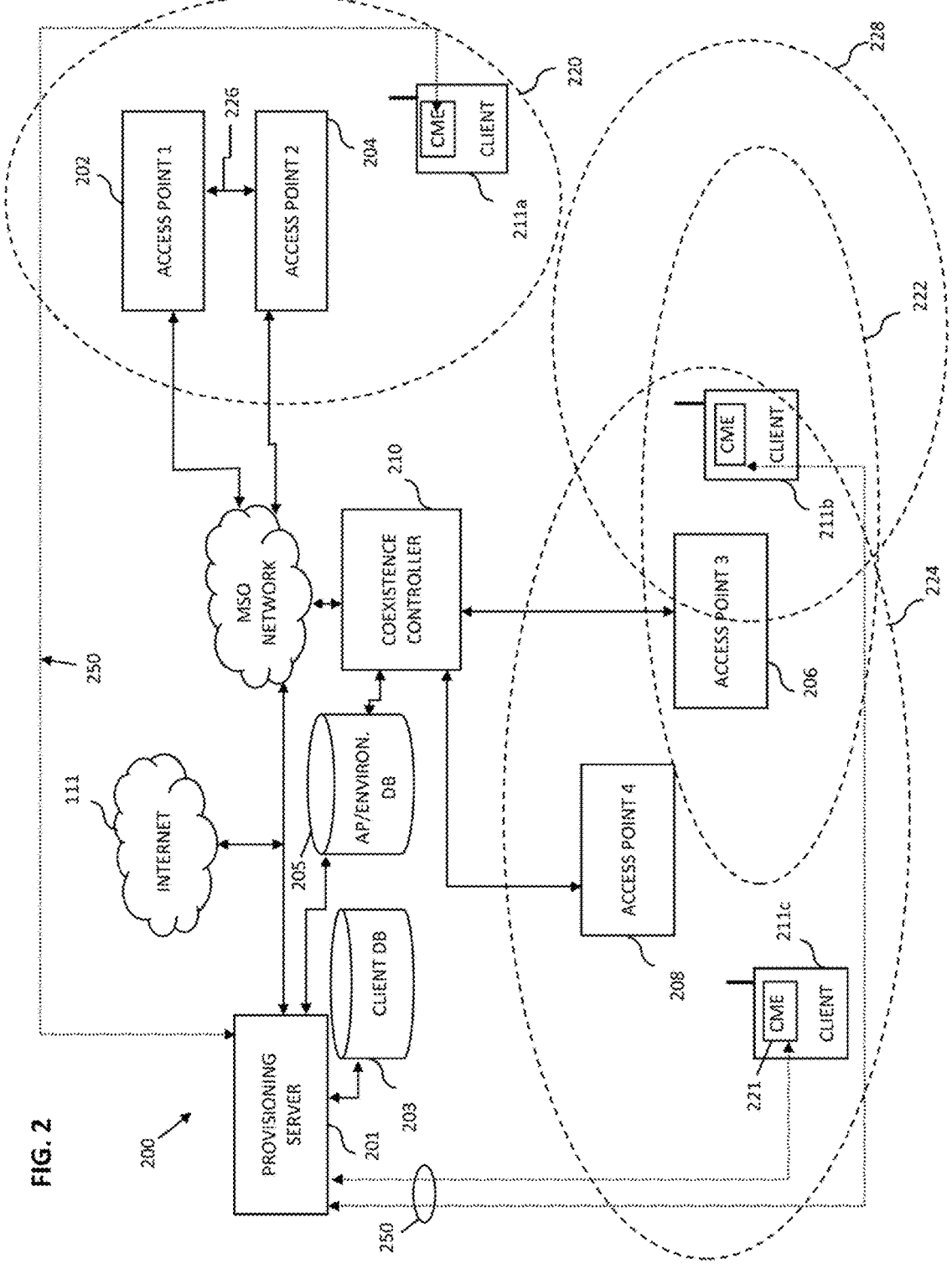
FIG. 2 is a functional block diagram of an exemplary embodiment of a wireless network infrastructure useful with various embodiments of the present disclosure.

FIG. 2 illustrates an exemplary embodiment of a network architecture 200 useful in implementing the wireless RAT co-existence methods of the present disclosure. As used in the present context, the term "users" may include without limitation end users (e.g., individuals, whether subscribers of the MSO network or not), venue operators, third party service providers, or even entities within the MSO itself (e.g., a particular department, system or processing entity).

As shown, the architecture generally includes a networked (i.e., "cloud" based) provisioning server 201 (locally resident with a co-existence controller 210, or remotely at the backend or headend of the system), one or more access points 202, 204, 206, 208 in data communication with the coexistence controller (CC) 210 (e.g., via existing network architectures including any wired or wireless connection), as well as any number of client devices 211a, 211b, 211c (smartphones, laptops, tablets, watches, vehicles, etc.) which may or may not be within range of an AP that is served by the coexistence controller 210. The client devices may also have different capabilities (e.g., as "nodes" of the network themselves, as described in greater detail infra).

A client device database 203 is also provided, wherein the client management provisioning server 201 can access and store data relating to, inter alia: (i) individual client devices, such as MAC address or other specific identifying information, (ii) any associated subscriber accounts or records, (iii) the WLAN configuration of the client, (e.g., supported Wi-Fi variants, MCS, MIMO capability, etc.), and (iv) the multi-RAT provisioning status of the particular client (e.g., whether the client has had the CME 221 installed, status of "pushed" configuration data to the installed CME, etc.).

As described in greater detail elsewhere herein, the CME-equipped clients 211a, 211b, 211c are configured to help the coexistence controller (CC) 210 characterize the radio frequency spectrum and environment in which the APs operate, so as to enable selective client (and/or AP) configuration changes to enhance WLAN prioritization over competing RATs.

An AP environment profile database 205 is also included in the architecture of FIG. 2, and is in communication with the CC 210 via e.g., a wired or wireless data interface. The AP DB 205 in the illustrated embodiment retains data relating to, among other things: (i) AP identification (e.g., MAC), (ii) AP location, (iii) association with parent or child nodes or networks (if any), (iv) association of an AP and one or more scanners, and (v) AP WLAN configuration and capabilities data.

In certain embodiments, each AP 202, 204, 206, 208 is located within and/or services one or more areas within one or more venues (e.g., a building, room, or plaza for commercial, corporate, academic purposes, and/or any other space suitable for Wi-Fi access). Each AP is configured to provide wireless network coverage within its coverage or connectivity range 220, 222, 224. For example, a venue may have a wireless modem installed within the entrance thereof for prospective customers to connect to, including those in the parking lot via inter alia, their Wi-Fi enabled vehicles or personal devices of operators thereof.

In one implementation, the system and methods of the present disclosure include determining a desired or optimal installation configuration for one or more wireless interface devices (e.g., APs) within a premises or venue, such as for example using the methods and apparatus described in co-owned and co-pending U.S. patent application Ser. No. 14/534,067 filed Nov. 5, 2014 and entitled "METHODS AND APPARATUS FOR DETERMINING AN OPTIMIZED WIRELESS INTERFACE INSTALLATION CONFIGURATION". As disclosed therein, a network entity collects information relating to the type of services required, and generates a customer profile. The customer profile is then used to determine a number and type of wireless interface devices required. In one variant, a device chart is generated, which lists a plurality of combinations of categories of service and a respective plurality of device combinations needed to provide optimal (or at least to the desired level of) service thereto. The device chart is consulted to arrive at an appropriate installation work order, which is submitted for premises installation.

As discussed elsewhere herein, client devices may or may not be within the range serviced by AP(s). Additionally, some client devices may be within the range, and thus serviced by, only one AP (e.g., a client device 211c located is within the range 224 of only access point 208), whereas some other client devices may be within range of two or more APs within a designated area (e.g., client device 211b in may be serviced by one or both of two AP's 206, 208 as the APs' respective ranges 222, 224 overlap). In one variant, APs 202, 204 may be in communication (e.g., via direct connection by way of e.g., Gigabit Ethernet or other wired connection, or even over Wi-Fi (e.g., Wi-Fi Direct), as indicated by overlapping connectivity ranges and connection 226). In one such implementation, a sub-network is created by utilizing the techniques to extend and enhance existing networks described in co-owned and co-pending U.S. patent application Ser. No. 14/959,948 entitled "APPARATUS AND METHOD FOR WIRELESS NETWORK EXTENSIBILITY AND ENHANCEMENT" and filed Dec. 4, 2015, incorporated by reference in its entirety. The client device 211a may be serviced by AP 204, and thereby receive information stored at either or both APs 202, 204 even if AP 204 is out of range. The client device 211a may also be serviced in a peer-to-peer sub-network, such as by receiving beacons and/or connecting (e.g., tethering or acting as a relay) with another client device (not shown) serviced by AP 204.

In the exemplary embodiment, one or more APs 202, 204 are indirectly controlled by the controller 210 (i.e., via infrastructure of the MSO network), while one or more APs 206, 208 are connected to (and controlled at least in part by)

the AP co-existence controller 210 directly. Various combinations of the foregoing direct and indirect control may be implemented within the architecture 200 of FIG. 2 as desired.

In some embodiments, APs of different types, such as directly controlled APs 206, 208 (i.e., children APs) and non-directly controlled APs 202, 204 may transmit data (e.g., notifications derived from the coexistence controller 210) to/from a client device 211$a$, 211$b$, 211$c$ within their connectivity range as is described in e.g., co-pending and co-owned U.S. patent application Ser. No. 15/002,232, and that described in U.S. patent application Ser. No. 14/959,948, incorporated supra. The client devices 211$a$, 211$b$, 211$c$ can be in range of an non-local or parent AP 204, 202 as well as a local or child AP 206, 208.

In an exemplary implementation, the client devices each include a connection manager entity (CME), e.g., in the form of an application computer program or middleware) 221 operative to run on the client and, inter alia, enable the host client device to (i) obtain data regarding the prevailing local RF environment in which it is situated (e.g., a venue), and (ii) alter its WLAN configuration in order to enable more "competitive" or selective WLAN services in a multi-RAT environment, as described in greater detail below.

In one or more embodiments, the APs may also provide various information via an open-access network such as a wireless local area network (WLAN), such as that described in co-owned and co-pending U.S. patent application Ser. No. 15/063,314 filed Mar. 7, 2016 and entitled "APPARATUS AND METHODS FOR DYNAMIC OPEN-ACCESS NETWORKS", incorporated by reference in its entirety. In one embodiment, the information provided is contextually relevant to locations of respective users or devices receiving the information. As but one example, the information provided may relate to the availability of WLAN performance enhancement via use of an API; i.e., advertising to the client (via its indigenous protocol stack or communications capabilities), the ability to obtain better WLAN performance within inter alia, the venue or service area by accessing the designated API by which the provisioning server 201 can authenticate the client device and install the CME application or module 221).

In one implementation, the information is provisioned by a network entity (for example, from a service provider network operator) and provided to one or more access points (APs) of the service provider network. The information is bit-stuffed into Wi-Fi beacon frames or other data structures that are broadcast by the APs to nearby client devices. A receiving client device extracts the information using a protocol embodied in the OS or extant software of the client, and may also initiate a dedicated wireless connection with the AP for e.g., transmission of the CME 221 as a download, or a URL or other network address where the client can obtain the CME 221 from the provisioning server 201.

Alternatively, if the CME 221 has already been installed on the given client device, the installed CME 221 can be used to extract data from the "stuffed" beacons relating to other functions of interest to the user.

Turning now to the coexistence controller 210, in one or more embodiments, controller 210 is configured to dynamically monitor RF conditions and performance information in the hosting environment via use of the APs 202, 204, 206, 208 and/or the RF environment scan functionality of the CME-equipped client(s) 211$a$, 211$b$, 211$c$.

It is further appreciated that while shown as separate components in FIG. 2, the CC 210, PS 201 and databases 203, 205 are effectively implemented as logical or functional modules, and hence both their logical and physical structure may be unified or distributed, in whole or part, depending on the particular desired attributes of the installation. For instance, all of the foregoing components can be embodied as a single entity/subsystem (e.g., on a common server or cloud system), and further act as one network element (e.g., utilize common network interfaces, common hardware and OS, etc.). Hence, the illustrated embodiments are purely illustrative.

FIG. 2$a$ illustrates an exemplary cable network architecture for providing WLAN services within, e.g., a venue or other premises, which extends from user client devices within the venue to, inter alia, data centers. In the exemplary embodiment, the architecture 230 is divided into four main logical groups: an access network 232, a regional data center 234, a national data center 236, and a service platform 238. The access network 232 includes one or more APs (e.g., wireless APs 204, 206, 208) disposed within the venue, and end users connected thereto via client devices 211. The regional data center 234 assists in providing services to the end users 241 by receiving, transmitting, and processing data between the access network 232 and the backbone 242 of the cable network. In one embodiment, the regional data center 234 is a local infrastructure that includes controllers (e.g., AP controllers), switches, policy servers and network address translators (NATs) in communication with the backbone 242. The regional data center 234 may be, for example, an intermediate data center on premises disposed away from the local APs and user premises (venue), and disposed within a larger infrastructure.

In the exemplary embodiment, the backbone 242 of the network enables data communication and services between the regional data center 234 and the national data center 236 via backhaul, and/or connection to the (public) Internet 111. In one implementation, the national data center 236 provides further top-level provisioning services to the regional data center 234 (e.g., load balancing, support of Trivial File Transfer Protocols (TFTP), Lightweight Directory Access Protocols (LDAP), and Dynamic Host Configuration Protocols (DHCP)), as well as providing the same to other data centers and/or access networks which may be part of the network operator's (e.g., MSO's) national-level architecture. The national data center 236 also houses in one embodiment more advanced backend apparatus (e.g., CMTS 199, AP controllers, Layer 3 switches, and servers for the provisioning services). In one embodiment, a separate service platform 238 may provide auxiliary services to the end users within the venue and subscribed to the MSO network provider, including access to mail exchange servers, remote storage, etc. Thus, it can be appreciated that myriad network nodes and entities, as well as connections there between, enable client devices (and ultimately end users via the client devices 211) to maintain end-to-end connectivity across the network.

Extant WLAN and Multi-RAT Implementation Scenarios—

Figure 3:
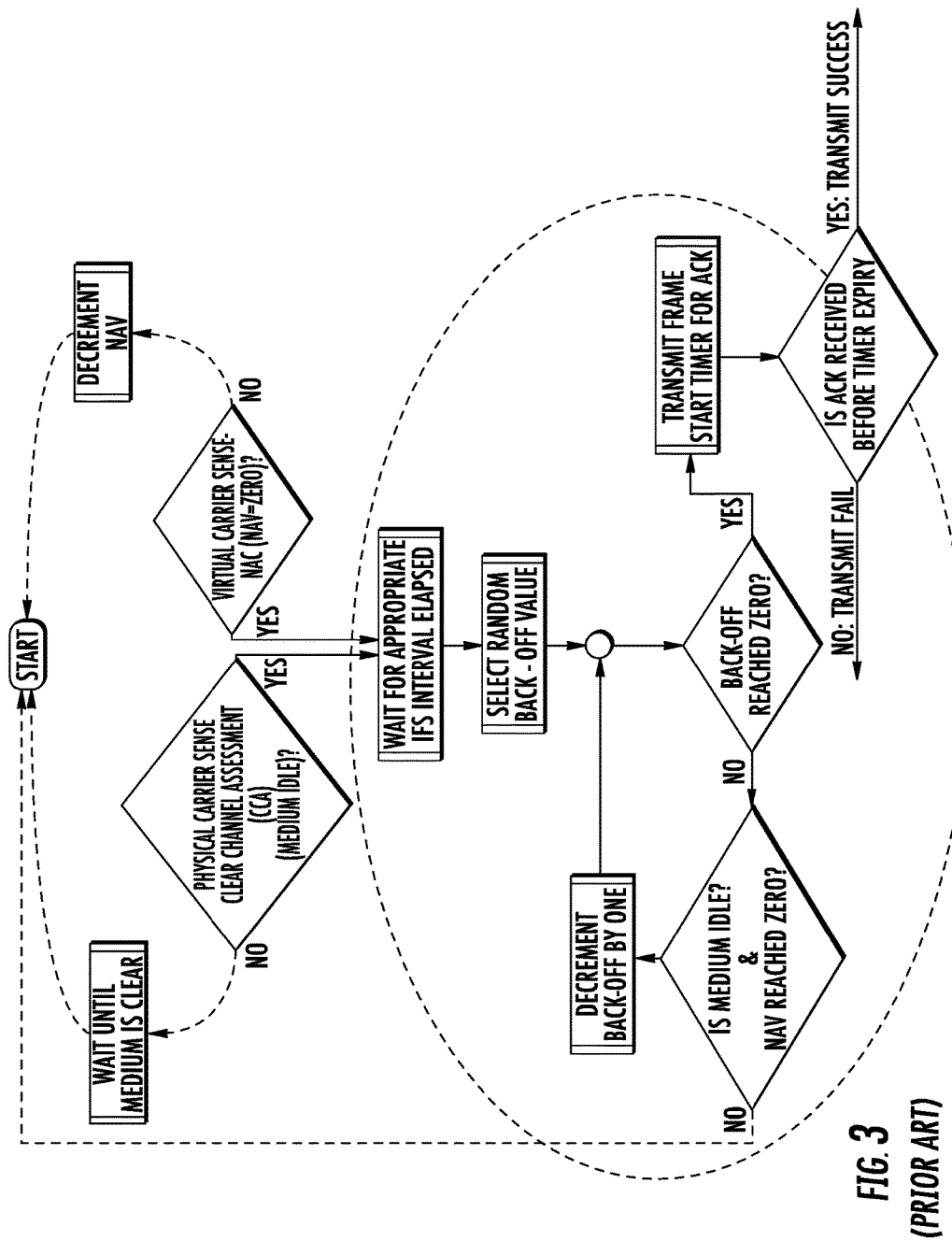
FIG. 3 is a graphical representation of a typical implementation of a prior art Wi-Fi back-off mechanism.

FIG. 3 illustrates a Wi-Fi back-off mechanism for collision avoidance as is typically implemented in prior art WLAN (e.g., Wi-Fi) technology applications. More directly, a Wi-Fi carrier-sense multiple access with collision avoidance ("CSMA/CA") network access mechanism is shown. In particular, when a first network node or station receives a packet to be sent to another node or station, Wi-Fi (according to, e.g., the prevailing 802.11 standard under which the system operates) initiates physical carrier sensing and virtual carrier sensing mechanisms to determine whether the medium (e.g., a channel and/or frequency used by the Wi-Fi transceiver) is busy or occupied by other transmissions. Hence, two (2) mechanisms are specified to determine if the Wi-Fi channel is busy; physical and virtual carrier sensing.

Physical carrier sensing may be performed for instance by a physical layer (PHY) that includes a clear channel assessment (CCA) function. CCA may include carrier sense (CS) and energy detection (ED) functions. CS allows the first node (intending to send the packet) to determine a period of time during which the medium will be busy. ED may detect wireless signals other than those originated or relating to Wi-Fi compliant devices based on a detection threshold above that of Wi-Fi. Using one or more of these functions, the CCA may assess whether the medium is idle; if not, the physical layer logical process waits until the medium is clear.

Virtual carrier sensing may involve setting a network allocation vector (NAV), whose functions include a counter. The counter may indicate how long the node is to consider the medium busy. In other words, the node may make a "best guess" as to how long the medium will be busy before it may transmit the packet. When the NAV is zero, the medium is assumed to be idle, i.e., there are no other nodes attempting to transmit a packet. When NAV is not zero, it indicates that the medium is busy, e.g., the node is transmitting a packet. In some cases, virtual carrier sensing may limit the need for physical carrier sensing, such as to save power. For instance, the node station may go to sleep until NAV reaches zero, after which it wakes up to check whether the medium is busy or idle.

In addition to the conditions set by physical carrier sensing and virtual carrier sensing, the Wi-Fi CSMA/CA may impose further checks by a node to ensure that the channel on which the packet is to be sent is clear. That is, an "extra polite" wait duration is imposed to determine whether the medium is idle. If the channel is not clear, and transmission attempted, there is a "collision" with the signal of another node, and the first node waits a certain period of time (i.e., a back-off value or back-off factor) before re-attempting access of the medium. The period of time may be chosen to be e.g., a random time period, or a progressively increasing backoff period based on subsequent collisions. After the conditions for retry are met (e.g., NAV is zero), the node checks to see if the medium is idle at the time of the check. If not, another back-off value is set. In different implementations, this value may be set to be a smaller value, a larger value, the same value, another random value, or according to yet another scheme. FIG. 3 illustrates an exemplary decreasing back-off value scheme.

The foregoing process repeats until the channel is clear and the "extra polite" back-off conditions have been met, at which point the packet is ready for transmission. The packet is sent to the other receiving node, and a timer may be set for an ACK signal. If the ACK is received before the time expires, the transmission of the packet was successful. If not, transmission failed.

In contrast, LTE-U collision avoidance mechanisms are less cautious, and may dominate access to a channel in a situation where LTE-U coexists with Wi-Fi wireless access points (APs) (and/or other LTE-U nodes), e.g., via cell towers, small cells, femto cells, base stations, eNBs (evolved NodeBs). In theory, the LTE-U node should attempt to choose a free or idle channel (i.e., not in use) in which no other LTE-U node or Wi-Fi AP is operating; if a free channel is not found, the LTE-U node should apply duty cycle procedures that allow the node to share a channel with Wi-Fi and other LTE-U signals. In some circumstances, duty cycling parameters may be adapted to usage of other signals, e.g., in response to Wi-Fi usage.

However, in practice, a potential issue with such a coexistence scheme is that equipment vendors may not follow the "friendly" mechanisms as outlined above, causing LTE-U to benefit more; e.g., create more connections that are stronger and more persistent (and which favor macro-network operators) compared to Wi-Fi. For instance, LTE-U equipment may allow a non-standard duty cycle that favors LTE-U over neighboring wireless technologies such as Wi-Fi (which uses the aforementioned "extra polite" back-off mechanism as described supra). This may result in degraded performance and user experience with wireless services provided by Wi-Fi APs in the same venue or area, including low data throughput (rate) and high latency, as well as frequent "dropping" of Wi-Fi connections between the client and the AP.

Similarly, LTE-LAA in theory should follow a standard listen-before-talk (LBT) procedure that is similar to Wi-Fi's conservative design (i.e., one in which an access point is to hold off transmissions until the medium is clear and/or signal strength falls below a threshold, in addition to an extra back-off time period). However, in practice, LTE-LAA equipment vendors may also deviate from LBT algorithms, and use back-off windows that deviate from more cautious settings. In one example, LTE-LAA equipment (e.g., a small cell) may perform a non-zero back-off period. As such, if a Wi-Fi access point coexists (i.e., is deployed in the same general venue) with such a "modified" LTE-LAA small cell, a wireless device is more likely to obtain better access via LTE-LAA rather than Wi-Fi on the same frequency (e.g., 5 GHz), because transmission will occur immediately on LTE-LAA.

Other ways that LTE-U or LTE-LAA may dominate a shared channel on an unlicensed frequency spectrum include following an exponentially decreasing back-off (or a fixed back-off time window) that provides an advantage over a random back-off period employed by Wi-Fi's LBT procedure.

Hence, it can be readily seen that the "extra polite" collision-avoidance mechanism for Wi-Fi provides ample opportunity for other RATs using the same frequency spectrum (such as LTE-U and LTE-LAA) to occupy one or more channels that could have been used to transmit data via a Wi-Fi connection. Moreover, as previously mentioned, the signal detection threshold for Wi-Fi may be higher than that of other RATs, leading to a scenario in which the other RATs may more easily occupy the channels. See, for example, FIG. 3b as discussed infra.

Figure 3A:
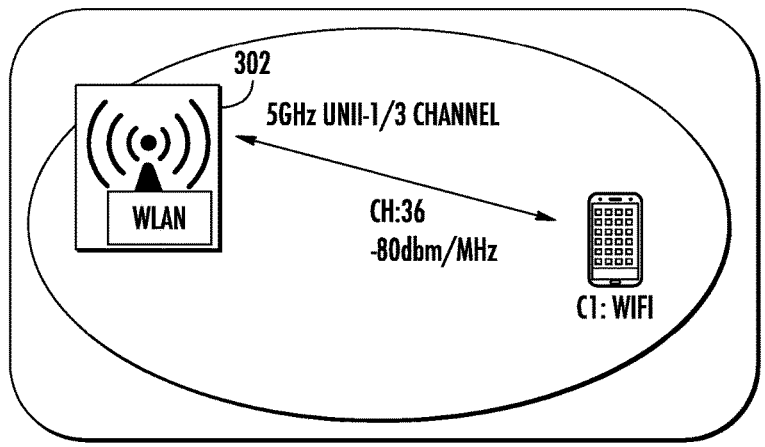
FIG. 3a is a graphical representation of a typical prior art network scenario in which only Wi-Fi connectivity is available.

FIG. 3a illustrates a typical network scenario in which only Wi-Fi connectivity is available. In this embodiment, a wireless-enabled client device (e.g., a Wi-Fi-compliant smartphone) at a venue is connected to a wireless access point 302 that provides wireless network service. In this use case, the client device is using channel 36, which is operating in a 5 GHz frequency band with a signal strength of −80 dBm. Where only Wi-Fi is available, the user may access the Internet and/or other networks as long as the client device is within the cell edge of the network; i.e., within a distance from the from the nearest AP (e.g., access point 302) at which the client device senses a minimal signal power level, i.e., approximately −80 dBm (decibel-milliwatts) or higher. A signal strength of approximately −85 dBm may be considered the minimum signal strength at which basic connectivity is possible. For consistently reliable packet delivery, however, a signal strength of −70 dBm or higher is ideal, which may be achieved by, e.g., moving the wireless device closer to the AP, or increasing the transmit power of the AP. Hence, the client device C1 as shown in FIG. 3a has achieved basic connectivity to the network with a minimal signal level, and may continue to receive Wi-Fi service unless the signal drops below approximately −80 dBm.

Figure 3B:
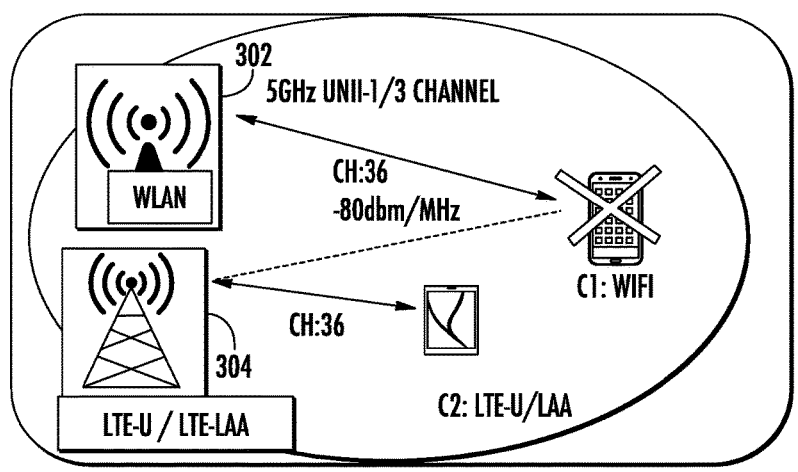
FIG. 3b is a graphical representation of a typical prior art coexistence scenario in which Wi-Fi connectivity and LTE-U or LTE-LAA connectivity are available.

FIG. 3b illustrates a coexistence scenario in which Wi-Fi connectivity and LTE-U and/or LTE-LAA connectivity are available. In contrast to the scenario illustrated in FIG. 3a, performance of client device such as C1 may be negatively impacted due to the presence of other RATs, such as LTE-U and/or LTE-LAA deployed within range of the client device. For example, in the presence of a competing RAT, the connection to Wi-Fi may frequently disconnect, experience low data throughput rates, experience high latency, or fail to connect altogether. Any established Wi-Fi connections may see severe performance degradation and be rendered unusable for typical activities (e.g., Web browsing, voice-over-IP (VoIP) calls, video chats, file transfers, media streaming, content consumption). Notably, the negative impact on Wi-Fi connectivity is possible even under relatively good signal conditions (i.e., where Wi-Fi signal strength exceeds −80 dBm) because of the "polite" Wi-Fi back-off mechanisms as described with respect to FIG. 2 supra, unfriendly connection mechanisms by the other RATs (e.g., aggressive energy detection (ED) levels, open-ended connection algorithms that may be exploited by individual equipment vendors looking to push the connection to a particular RAT) and/or other contributive factors (e.g., hard-coded software settings within operating systems of client devices).

To illustrate, the scenario in FIG. 3b shows a venue with two (2) RATs deployed, specifically Wi-Fi (providing access to a network via, e.g., a WAP 302 operated by a cable network operator) as well as LTE-U and/or LTE-LAA (providing access to a network via, e.g., a cellular tower 304 operated by a mobile network operator). The Wi-Fi AP 302 seeks to provide service to wireless-enabled client device C1 via Wi-Fi. The LTE cell tower 304 seeks to provide service to another wireless-enabled client device C2.

Although client device C1 sees a nearly minimal signal strength of −80 dBm from Wi-Fi AP 302, a user of C1 may seek to connect to the network via Wi-Fi for various reasons, including e.g.: (i) to perform activities that require consistent bandwidth usage (e.g., VoIP calls, video chats), (ii) reduce the quota or charges against LTE "data" usage, (iii) avoid any packet delays or jitters during handovers between LTE nodes (e.g., moving between coverage areas of small cells or towers), (iv) save battery power while at or going to a venue without ready access to a power outlet, and/or (v) gain access to services particular to a service provider of which the user is a subscriber (e.g., content or media exclusive to the service provider, access to email services, online or remote "cloud" storage, convenient access to billing information and/or payment options reviewable by customers, access to support and troubleshooting help, or interface for shopping for additional hardware or features).

Conversely, a cable network operator or other MSO may seek to preferentially provide Wi-Fi access to its customers at a venue, and/or serve secondary content (e.g., contextually appropriate banner or other advertisements, sponsored video content and/or other means of monetization). Stated simply, the MSO or its customers (e.g., third parties such as advertisers, content providers, etc.) may obtain a better ROI or more "impressions" when Wi-Fi is selectively used over say LTE-U or LTE-LAA.

Furthermore, it is noted that a low Wi-Fi signal strength does not necessarily correlate to a low connection speed; assuming the Wi-Fi connection between an access point and a client device is stabilized, it may be possible to perform comparatively high-speed browsing, file transfers, or other operations.

Hence, there are various circumstances or reasons that a client device or its user (and/or a service provider) might prefer use of Wi-Fi.

However, the presence of the second RAT (provided by LTE cell tower 304) may cause a signal collision on the same channel 36 on the same frequency band (e.g., 5.0 GHz) used by the Wi-Fi AP 302. The collision may be due to various factors. The LTE tower 304 may be operating a more aggressive connection mechanism. Alternatively (or in addition), the LTE tower 304 may be operating at a transmit power or threshold similar to that typically used for Wi-Fi, or where the signal strength of LTE exceeds that of Wi-Fi, such as −73 dBm (which is higher than the typical minimal Wi-Fi connectivity threshold). The higher transmit power may be by virtue of, inter alia, having a relatively larger geographic coverage, and capabilities to provide connectivity to thousands of users per tower (in the case of e.g., LTE/LTE-A), although the transmit power ranges for LTE-U and LTE-LAA are generally comparable in magnitude as Wi-Fi on same spectrum, and hence coverage area may be same—except e.g., in cases where specialized antennas used. Thus, in a coexistence scenario such as the one described with respect to FIG. 3b, one or more of the aforementioned factors may cause the connection management function of the client device C1 (e.g., an O/S based connection manager class within the Java-based Android O/S such as "Context.getSystemService(Context.CONNECTIVITY_SERVICE)") to treat LTE as more "accessible" (or even as the only viable option), thereby causing the client device C1 to prioritize LTE and connect to the LTE service.

Figure 2A:
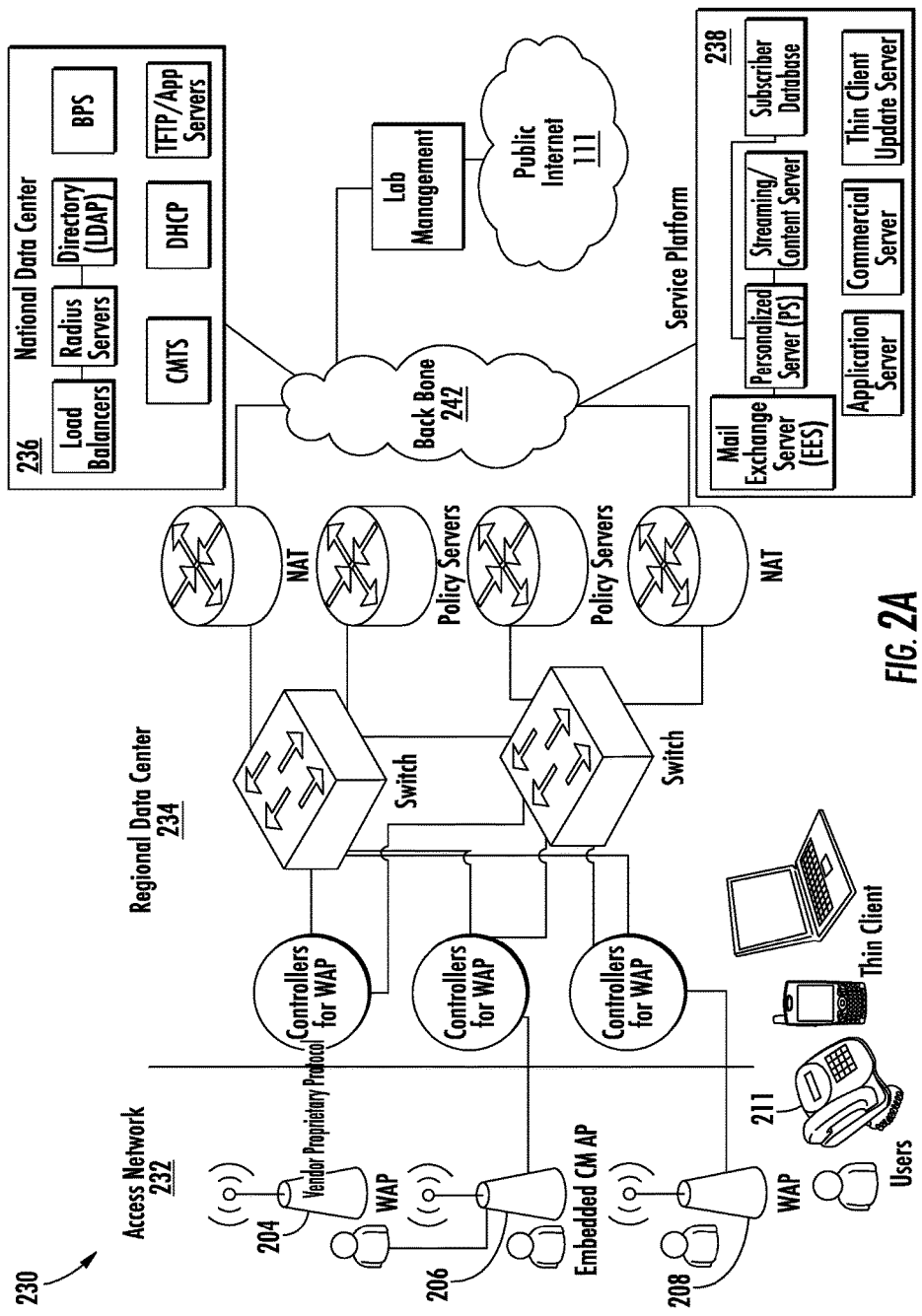
FIG. 2a is a functional block diagram of an exemplary embodiment of the infrastructure of FIG. 2, in the context of cable network architecture providing WLAN services to a customer premises such as an enterprise or venue.

Hence, the present disclosure sets forth various embodiments of methods and apparatus to enable a RAT-aware networked system such as that of FIGS. 2-2a to, inter alia, apply a dynamic change in connection mechanisms of access points and/or client devices, in order to provide a more selective and controlled connectivity procedure for one or more coexisting RATs.

Figure 4:
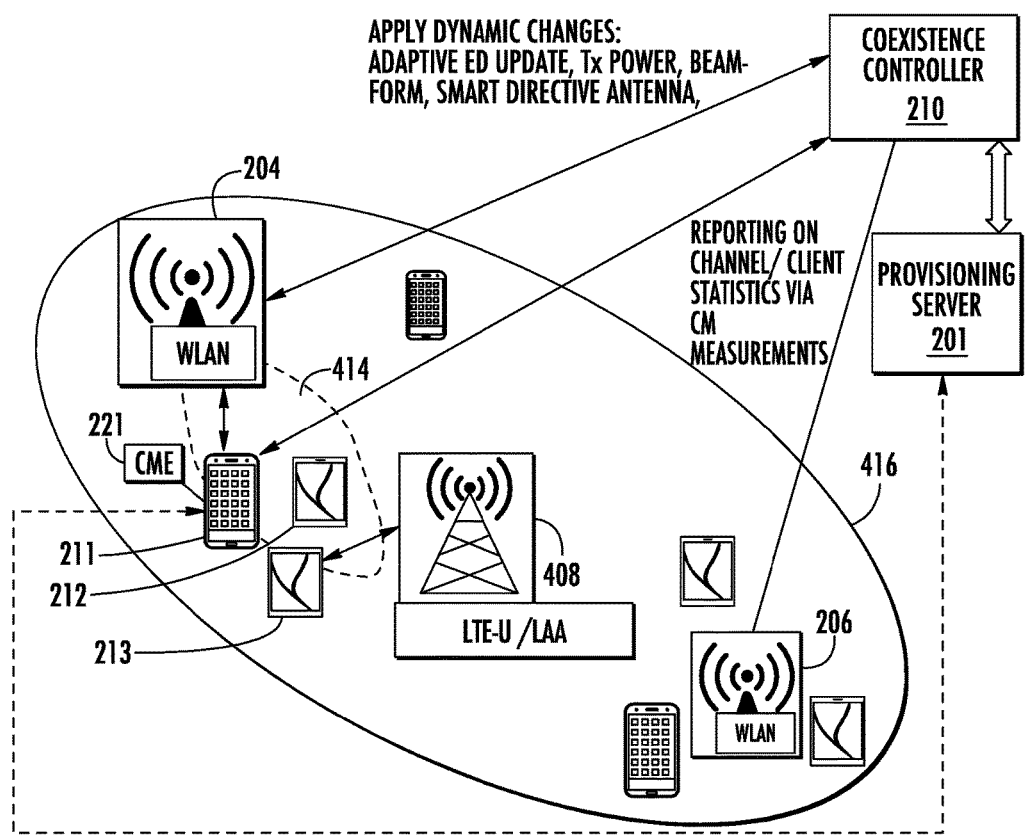
FIG. 4 is a high-level graphical representation of the operation of the exemplary network architecture of FIG. 2, in which the Wi-Fi connection is controlled within a venue or environment deploying coexisting Wi-Fi and LTE-U or LTE-LAA services.

FIG. 4 is a high-level logical diagram illustrating operation of the network architecture 200 of FIGS. 2-2a to selectively control Wi-Fi connection within a venue or environment deploying coexisting Wi-Fi and LTE-U or LTE-LAA services. More specifically, in illustrated example, the coexistence controller 210 communicates with: (i) the CM entity (CME) 221 on the CME-enabled client(s) 211 which is/are used to monitor the local or venue service area 416 (including the coverage areas of the APs 204, 206 and the coverage area of the LTE cell station 408) to characterize the RF environment of the service area 416; and (ii) the in-venue APs 204, 206, to apply dynamic changes as needed to one or more of the APs. Other non-CME enabled client devices 212, 213 may also be operating within the area.

As shown in FIG. 4, Wi-Fi may coexist with LTE-U or LTE-LAA serviced by, e.g., at least one LTE cell tower 408.

In the exemplary embodiment, the CME-equipped client 211 includes a background scanner functionality (see FIGS. 8-8a and supporting discussion), which comprises an RF sensor configured to operate in the frequency bands of interest, although as described in greater detail below, the present disclosure contemplates both (i) use of a physically separate dedicated scanner (not shown) along with one or more APs; and/or (ii) use of an AP as a scanner in certain operating modes) in one or more alternate configurations. The RF sensor of the client 211 may be dedicated (e.g., a separate module or IC/chipset configured to perform the scanning functions described herein without any ancillary communication or data functions), or may simply be an extant wireless receiver or interface within the client with suitable capabilities, such as e.g., the client's LTE/LTE-A interface (commonly found on most modern smartphones).

Figure 4A:
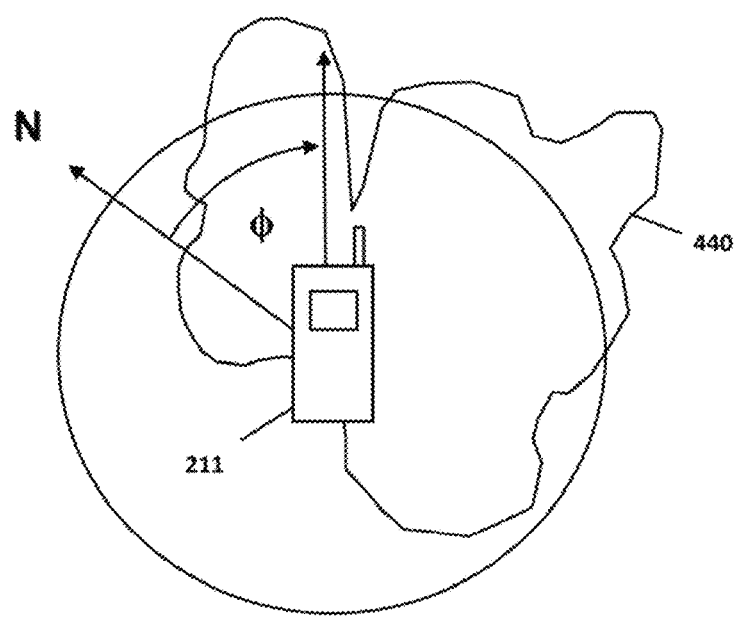
FIG. 4a is a graphical representation of an exemplary azimuth-referenced heat map generated by a CME-equipped client device according to one embodiment of the present disclosure.

The scanner apparatus of the client 211 is configured to scan and detect signals that are propagating within the venue (e.g., Wi-Fi signals, LTE signals, and/or other radio signals in the frequency band(s) of interest) that may potentially be used by wireless client devices (e.g., smartphones, laptops, tablets, "roaming" devices, and other mobile user devices in the venue)—in effect acting as a RAT detector. The scanner apparatus may include one or more dedicated antennas and/or transceivers, although it may in certain embodiments be as simple as an RF receiver and single (non-MIMO) antenna. Moreover, where the scanner function is employed via an extant wireless interface (e.g., an LTE/LTE-A, Wi-Fi, or even Bluetooth interface), the indigenous antennae used by such interface can be utilized for background signal detection. Distinct from Wi-Fi APs 204 and 206, the background scanner of the client may in one embodiment report network conditions within the venue to the CC 210; e.g., number and types of RATs deployed in the venue, signal levels, channel information, congestion levels, and signal noise. When configured with MIMO or MISO capability (or multiple spatially diverse antenna and receiver chains such as a phased array), the scanner apparatus of the CME-equipped client 211 may also provide data to enable spatial resolution of the detected RF signals; e.g., a map of RSSI or the like as a function of absolute or relative azimuth ($\phi$)—in effect an angular "heat map" 440 for one or more prescribed frequency bands (e.g., 2.4 GHz) such as that of FIG. 4a, when the movement/orientation of the host client device 211 is maintained constant for a period of time (e.g., where the user is seated within the venue and their client device 211 is e.g., in their jacket pocket or handbag, substantially motionless. In one exemplary embodiment, the host client device 211 includes both: (i) an accelerometer, and (ii) an electronic compass function, such that the CME 221 can call relevant APIs for these two functions to determine both a) when the client device 211 is motionless, and b) the physical orientation of the device (e.g., relative to magnetic North or some other frame of reference). Additionally, the indigenous GPS/A-GPS receiver of the host device 211 (now ubiquitous on personal electronic devices) can be accessed by the CME 221 via e.g., an API call, so as to determine the 2-D (e.g., Lat/Lon) location of the client 211, thereby fixing its position and orientation in space for the duration of time that it is immobile (as indicated by the accelerometer data).

Moreover, where two or more CME-equipped clients 211 are used as scanners at different locations within the same venue or region of interest, 2-D or even 3-D spatial resolution and mapping is possible, such as can be conducted by the CC 210 or even a backend MSO server process running a suitable algorithm to process the obtained RF data from the scanning clients 211.

In one embodiment, the range covered by the CME-equipped clients 211 utilized as background scanners may be based on a designated physical or virtual boundary; e.g., the CC 210 may have a list of known access points and LTE nodes within the premises of a stadium, shopping mall, airport, etc. The CC 210 may thus strategically utilize the clients 211 with which it is in communication (i.e., CC 210 to CME 221) that are also positioned within the venue so as to be able to sense signals originating from various nodes, e.g., placed in a location having relative proximity to each of the known APs and nodes, or disposed away from potential signal-blocking structures such as metallic barriers and fences.

In one implementation, the CC 210 obtains GPS or other location-related data (which, depending on the desired level of precision may even be as coarse as association with a known AP) for a client device 211, and the CC 210 algorithmically evaluates the proximity of the client location to a desired location for evaluation, the latter being for example a known location of a Wi-Fi AP, or an LTE eNB, or at a particular location within a venue. Depending on the suitability of the client device location, the CC 210 may "enlist" the CME 221 of that client 211 to utilize its indigenous scan capability at that location. Hence, the CC 210 may opportunistically identify client devices that are CME-equipped (such as via data from the provisioning server 201 indicating that the particular client device has previously downloaded the CME 221, or via the client's registration within the venue Wi-Fi system indicating it is associated with an MSO subscriber, the subscriber's identity then being used to access the MSO subscriber database to determine whether the particular client device ID (e.g., MAC or other unique identifier for that subscriber) is CME-equipped), and make use of them on a transient basis for inter alia, background scan data collection.

For example, consider a scenario in which the client device 211 is used as a background scanner within a service area 414 (FIG. 4) that is within the effective range of the Wi-Fi AP 204. Such a placement allows a service provider (e.g., MSO) to detect whether another RAT (e.g., LTE) coexists in an area where competitive "shaping" procedures should be implemented, hence giving users a greater range of options in terms of connectivity and activities suitable for available connections. In other words, the CC 210 opportunistically selects the client 211 so as to be able to detect both Wi-Fi and LTE within range of a Wi-Fi access point, and hence the scanning client device 211 obtains data representative of what the client device (and others) will experience within that area 414.

In addition (or alternatively) to the aforementioned opportunistic selection, the CC 210 may solicit RF scan data from the client based on a request from the CME 221 (i.e., the CME 221 sending a datagram addressed to the CC 210 indicating that its WLAN performance is poor), or based on passive detection of poor link performance (i.e., without an explicit request for link improvement, but as detected by one of the APs, or the CC 210 monitoring client-to-AP link performance).

In one variant, client devices are selected for scan function reporting when near the edge of the venue 416, which is a location likely to experience a scenario in which a one signal (e.g., Wi-Fi) may be overwhelmed by another (e.g., LTE) and would require control of detection thresholds, transmit power, etc. as described herein. Alternatively, clients are selected so that signals within one or more representative areas relative to the planned users can be detected; i.e., only areas where users might actually be, or be able to utilize their client devices. For example, in one such case, an airport may have numerous areas which are not accessible to users, such as runways, taxiways, maintenance hangers, baggage processing areas, etc. Whether users might find their WLAN competing with an LTE signal is immaterial in these locations (and in fact, due to possible conflict with aircraft or other facility RF systems, it may be desirable to maintain the RF signal in certain bands as low as possible in such areas).

In another variant, the scan function of the enlisted client(s) 211 can be configured to detect only the type of signals which are known to be (routinely) present within the venue area 416; e.g., to scan for Wi-Fi and LTE only.

As will be further described herein, in order to maintain a persistent connection to Wi-Fi, the CC 210 may then modify transmit settings associated with the AP 204, 206 and/or cause one or more client devices to adjust a detection threshold (i.e., via data communication to the CME 221). As the CC 210 has knowledge of other active RAT(s) competing for the same channel, the CC (or PS) may command the APs and active clients on the channel to use aggressive backoff windows (instead of random selection), so as to avoid "stealing" of the channel by other RAT's.

In various implementations, data or collections of data (e.g., reports) may be sent periodically, at predetermined times (e.g., determined by the CC 210, CM provisioning server 201, or the CME-equipped client 211 itself), at random times, at times dynamically determined based on network conditions, or as needed (e.g., based on a "pull" received from the CC 210 or other entity). For example, if the CME-equipped client 211 does not detect a coexisting RAT (e.g., only detects Wi-Fi) on a given scan, then it may determine that there is no need for a frequent (or any) report to the CC 210. That is, the CME 221 may send no data or report, and schedule a confirmatory scan at a later time as determined automatically (e.g., algorithmically, or based on historical or statistical calculations) by logic within the CME 221 or the CC 210. If a subsequent scan detects no competing RAT, then the scan interval may be "backed off" or otherwise modified. Alternatively or in addition, the data or report from a given scan or set of scans may be scheduled for transmission at a future time, such as after aggregation of enough data for the CC 210 to conduct sufficient analysis.

In some implementations, the CC 210 may be in a localized controller that resides in the AP 204, 206, or even within the CME 221, or may have components or processes distributed in each (in effect forming a "virtual" controller). For example, in one architecture, a dedicated CC 210 may "hand off" control of one or more APs to communicative CME 221 that are also in communication with the target APs(s), such that the CME 221 acts as a proxy for the CC 210 (at least temporarily). Such may be the case for example when the dedicated CC 210 has lost communication with a given AP, is undergoing maintenance, has experienced a component failure, etc. In one implementation, each CME stack is configured to, upon loss of communication with the CC 210 (e.g., as detected via various heartbeat or keep-alive messages or the like, or affirmative communication from another entity such as the AP or provisioning server 201), control the AP and/or its own WLAN interface as described herein, such as to increase Tx power for the AP, change MCS, modify spatial diversity settings, reduce ED threshold, etc. In one such scenario, an AP with which the CME-equipped client 211 is in data communication detects that the dedicated CC 210 has failed or is no longer responding, and according to a prescribed failure protocol encoded into the AP logic, communicates with the CME 221 of the client 211, activating the dormant CC functionality resident in the CME 221 (e.g., by sending a "wake up" or similar message). Upon receiving the AP message, the CME 221 evaluates the status of its WLAN link with the AP (if not done so already, such as during prior operation of the link), and if prescribed performance criteria (e.g., data rate, BER/PER, RSSI, SINR, etc.) are not met, then the CME 221 invokes the CC radio resource management (RRM) protocol (e.g., as described below and with respect to FIGS. 5-5b herein), instructing the AP and/or its own WLAN interface to change one or more parameters in an attempt to improve WLAN link performance.

In other implementations, the CC 210 may be located within the venue but separate from the AP, or within an intermediate network entity, e.g., the aforementioned data center or other portion of the MSO infrastructure as shown in FIGS. 2-2a. Such a localized location for the CC 210 may in some cases improve communication with the CME 221; for example, there may be lower latency with respect to receiving frequent reports from the given CME 221 and corresponding acknowledgement from the local CC. Communication with Wi-Fi APs 204, 206) may also be similarly enhanced; e.g., for pushing updates or configuration change data to the APs.

When the CC 210 receives a scan report from the enlisted client(s) 211, the CC 210 (and/or other entities with the infrastructure such as the provisioning server 201 if so configured) is then able to perform, inter alia, RRM (radio resource management) procedures. In one implementation, such RRM procedures include algorithmic analysis of the data collected by the background scan(s) in order to characterize the RF environment within which the APs 204, 206 served by the CC 210 operate, and ultimately modify the configuration of the WLAN modem(s) thereof if needed. Such characterization may include assessment of data relating to any number of parameters, including specific measures of link quality such as, without limitation: received signal strength (RSS/RSSI), signal-to-noise ratio (SNR), carrier-to-noise ratio (CNR), signal-to-interference plus noise ratio (SINR), carrier-to-interference plus noise ratio (CINR), bit error rate (BER), block error rate (BLER), packet error rate (PER), etc., depending on the capabilities of the scan apparatus of the client device 211f. For example, where the scan apparatus of the client is more simplified and merely measures RF parametric data, it may not have sufficient capability to measure BER/BLER/PER, since it is transacting no client data. Alternatively, more capable scanner configurations (e.g., where the WLAN or LTE interface of the client device 211 is also used as the scanner) may be able to provide more comprehensive statistics.

Referring back to the exemplary embodiment as shown in FIG. 2, the CC 210 is configured to send instructions and/or data (e.g., configuration files) to Wi-Fi APs 202, 204, 206, 208 in the network based at least on reports received from the client devices used as scanner(s) 211a, 211b, 211c. Instructions or data may be delivered through existing infrastructure that provides data communication between APs and the backend, including wired and/or wireless means. For example, each CME-equipped client is configured to (i) receive data, including commands, from the coexistence controller 210 or other entity, and (ii) collect and upload monitoring statistics or other relevant data to the controller 210, each of (i) and (ii) which may occur via a wired or wireless link. For instance, the sensors may communicate with the CC 210 via a wireless link such as Wi-Fi, Bluetooth, or LTE, depending on the status/availability of the WLAN link. In one implementation, the CME 221 of each client is configured to first select Wi-Fi as the radio bearer for the communications with the CC 210, and if unavailable, progress through a prescribed hierarchy of available links. Note that the communications between the CC 210 and the client CME 221 (via an AP) are generally low-bandwidth in nature, only communicating e.g., scan data and commands necessary to effectuate enhancement of the WLAN link as described elsewhere herein (e.g., may be transmitted on the control plane, which requires very low bandwidth); hence, even a very poor quality Wi-Fi link between the client device 211 and the closest AP will generally be sufficient to cause enhancement of the link. In the event that the CC 210 and CME 221 must utilize another interface such as LTE, the CC 210 is merely another URL to the CME 221 (and vice versa); hence, the MSO need not maintain an LTE eNB or like at or near the venue. Rather, the LTE network of the subscriber's cellular data provider is utilized (and presumably has coverage of an area to include the venue and the client device 211).

Moreover, the "zero-IT" provisioning connection manager (CM) server 201, which is also in the backend and/or in another centralized managed location of the MSO network as shown in FIG. 2, may store a configuration file (e.g., an autoconfig file) associated with various clients, such as in the client database 203 (FIG. 2). It may also access the AP DB 205 regarding AP configuration data. In one embodiment, a configuration file for a client 211a, 211b, 211c may be retrieved by the CM provisioning server 201, modified per the data/reports and information received from the CC 210 (or even the CME-equipped client(s) directly), and pushed to the CME 221 of the clients respectively. In one variant, the CM provisioning server 201 analyzes the data of the reports before transferring a configuration file to the clients indicating which parameters are to be modified. In one embodiment, the logical communication between the protocol stack of the CME 221 and that of the provisioning server 201 software (shown as dotted lines 250 on FIG. 2) is physically effected via any relevant PHY or medium between the client and the provisioning server 201, including for example: (i) via the WLAN communications between the CC 210 and the clients (e.g., via a downlink from the CC to each client for installation); (ii) via an LTE or other cellular data link of the client (e.g., as sent by the MSO via SMS or other means, whereby the receiving client can access a URL via the LTE data interface); (iii) via a PAN interface of sufficient bandwidth (e.g., EDR Bluetooth or the like), or via yet other means. Note that the communications between the CC 210 and CME 221, and those between the PS 201 and the same CME 221, need not necessarily utilize the same bearer.

As an aside, downloadable applications or "apps" may be available to client devices of subscribers of an MSO or cable network (and/or the general public), where the app allows users to connect to or obtain MSO-provided services. Application program interfaces (APIs) may be included in an MSO-provided application, installed with other proprietary software that comes prepackaged with the client device, or natively available on the CC 210 or other controller apparatus. Such APIs may include common network protocols or programming languages configured to enable communication with other network entities as well as receipt and transmit signals that may be interpreted by a receiving device (e.g., client device).

In one implementation, the changes to the client WLAN interface transmitted via the configuration data (file) may include alteration of the client WLAN transmission and/or reception characteristics, such as transmit power level, energy detect (ED) threshold level, beamform parameters (e.g., modification of phase and/or amplitude of transmitter signal), use of one or more antennas, etc., thereby making Wi-Fi a more viable connection option, e.g., for these client devices, such as when on the edge of the Wi-Fi network where a minimal signal strength of approximately −80 dBm or lower may occur. For example, the settings on the client device may be modified by the configuration data transmitted to the CME 221 so as to make the client device more receptive to certain RATs, i.e., the client device may consider a weak Wi-Fi signal (e.g., at −80 dBm) a viable connection despite the existence of a coexisting network. Accordingly, the modified transmit characteristics allow client devices within range of the AP and/or users of the client devices to "see" a Wi-Fi AP that may not have been detectable otherwise in a coexistence scenario with LTE (e.g., a service set identifier (SSID) may now appear in a list of available networks).

Likewise, the APs 202, 204, 206, 208 may receive their relevant configuration data (e.g., modified configuration file) from the CC 210 directly via the respective AP backhaul(s), and apply changes to its transmission and/or reception characteristics, such as transmit power level, energy detect (ED) threshold level, beamform parameters (e.g., modification of phase and/or amplitude of transmitter signal), physical configuration of one or more antennas at the AP (e.g., angle of antennas, relative distance from each other), etc., thereby making the WLAN AP a more viable connection option for the client devices. The original configurations may be stored at the respective AP 202, 204, 206, 208, and/or retrieved from the AP DB 205 (FIG. 2), whether by the CC 210 or the provisioning server 201. In some embodiments, the applied updates to the configuration at each AP may persist for a prescribed period of time, or until a new update is applied to that AP.

Notably, in one variant, the AP DB 205 also is configured to contain data obtained by the CME-equipped clients 211 (and/or APs) functioning as scanners in order to characterize the particular venue or premises in terms of electromagnetic environment. For example, the DB 205 may include tabular or other data reflecting the strength of in-band (e.g., 2.4 or 5.0 GHz) emitters, their persistence, variation as a function of time, and even azimuthal or spatial variation. In this fashion, changes in the venue or premises environment may be detected (e.g., by comparing a venue profile taken currently with a historical one for that same venue), and correlated to e.g., events of interest being held within the venue. Moreover, such data can be useful in predicting the effects of configuration changes within the venue, whether due to AP placement, additional user devices, physical changes to the venue, etc. See, e.g., co-owned and co-pending U.S. patent application Ser. No. 15/612,630 filed Jun. 2, 2017 and entitled "APPARATUS AND METHODS FOR PROVIDING WIRELESS SERVICE IN A VENUE," incorporated herein by reference in its entirety, for exemplary uses of such data.

Exemplary Operation

Based on the foregoing architecture 200 of FIG. 2, an exemplary process for controlling multiple coexisting wireless networks according to the present disclosure will now be described in the context of FIG. 4.

In one exemplary scenario, both Wi-Fi and LTE (e.g., LTE-U and/or LTE-LAA) are deployed within a venue (e.g., airport, shopping mall, stadium, hospital, concert hall, or other commercial buildings). Wi-Fi is served by at least one Wi-Fi access point 202, 204, 206, 208 maintained by the service provider/network operator, which also operates CC 210 and CM provisioning server 201. The APs are able to reach client devices 211, 212, 213 e.g., those within range of a service area 414. LTE is served by a neighboring node 408 (e.g., a base station, small cell, etc.) in or proximate to the same venue. The LTE node 408 provides LTE-U and/or LTE-LAA connectivity to the venue. More directly, LTE-U and/or LTE-LAA may operate in the same frequency band as typical Wi-Fi connections (e.g., 5 GHz band or other unlicensed band), causing "collision" with regular Wi-Fi signals. As discussed supra, a given client device may prioritize a connection to the LTE node 408 depending on the hardware configuration or software setting of the cell tower and/or the client device itself. Nonetheless, client devices 211, 212, 213 are capable of wirelessly accessing a network via the AP(s) and the cell tower 408 on the same channel (pending resolution of the competition for the medium).

The CME-enabled client device 211, acting as a background scanner, detects the presence of LTE-U and/or LTE-LAA (collectively "LTE" for the purposes of this exemplary operation) operating in the same channel. When not utilizing its own WLAN link (e.g., while scanning), the client 211 may also detect the presence of other WLAN communications within the same bands. The CME 221 of the client 211 gathers scan data, and may also report statistics related to usage of one or more channels, number of client devices, number of RATs, types of RATs, congestion level and/or other relevant information. This information is transmitted to the CC 210, e.g., in one or more data messages or structures (e.g., report files), using the previously described communications bearer hierarchy.

To mitigate the effect of collision between the detected RATs (i.e., Wi-Fi and LTE), the CC 210 determines that the configuration of one or more Wi-Fi APs (e.g., AP 204 in FIG. 4) should be updated so as to meet a prescribed performance level; e.g., to match the LTE in connectivity parameters (such as back-off waiting period or lower back-off counter, LBT procedures, signal strength, RF parameters, etc.), thereby affording Wi-Fi a more competitive opportunity to connect with the client devices 211. By virtue of their presence within the service area 414 of the WLAN AP 204 as shown in FIG. 4, the non-CME clients 212, 213 may, when the AP configuration is modified, also experience an improvement in their WLAN link performance if being used; however, any modifications to the AP 204 and/or CME-equipped client 211 advantageously will not "drown out" any contemporaneous use by the non-CME clients 212, 213 of their LTE interface—rather, the techniques described herein merely "level the playing field" for the WLAN interface of CME-equipped device 211.

To update the configuration of the Wi-Fi AP 204, the CC 210 retrieves a configuration file (e.g., an "autoconfig" file) from the AP DB 205. The CC 210 adjusts the necessary parameters in the configuration file (e.g., connectivity parameters as described elsewhere herein) according to the report data received from the enlisted one or more CME-equipped clients 211 acting as RF scanners; notably, such adjustment or alteration can be conducted algorithmically; i.e., by a computerized logic operative on the CC 210. For instance, the exemplary logical flow implemented by the CC 210 in modifying an AP configuration as described with respect to FIGS. 5-5b herein can be used in selectively altering the AP configuration.

After modification, the CC 210 sends the adjusted configuration file to the Wi-Fi AP 204. As long as the adjusted configuration file is in effect at the AP, any client devices 211 (and other clients 212, 213) within the service range 414 may experience enhanced connectivity to the Wi-Fi, including a greater signal strength, more robust connection, uninterrupted connections, etc., even when competing with the LTE RAT.

Additionally, the network (e.g., the provisioning server 201, or even the CC 210 at direction of the provisioning server 201 and via the relevant AP 204) may push various settings by, e.g., interfacing with the CME 221 software application or middleware to allow the client device to, e.g., lower an ED (energy detect) threshold so as to prevent de-prioritization of Wi-Fi services by the client's connection manager process. For instance, the client device 211 may be instructed to lower its the ED threshold for Wi-Fi to −80 dBm (e.g., from −73 dBm), while keeping the threshold for LTE the same. This selective adjustment allows the client device (and/or its user, such as via UI presented by the connection manager) to consider either a Wi-Fi connection—e.g., consider an SSID for the AP 204 as "visible" or eligible for connection to the device—as well as to use "data" to connect to LTE (as opposed to LTE being the only option). This software-based adjustment may be especially viable for customers of the MSO or network service provider providing the Wi-Fi service, such customers who may already enjoy various features of the mobile application provided by the MSO/provider which are not accessible via the LTE data interface.

However, in the exemplary implementation, the client device is not in any way precluded from or incapable of connecting to the LTE network. By adjusting the connectivity parameters of the Wi-Fi AP (and/or the client itself), such client devices may not disfavor Wi-Fi by virtue of, e.g., being on the edge of the Wi-Fi network range (e.g., near the dotted line of service area 414), but also may utilize LTE or other RATs when the latter is clearly the better choice.

Methods—

Figure 5:
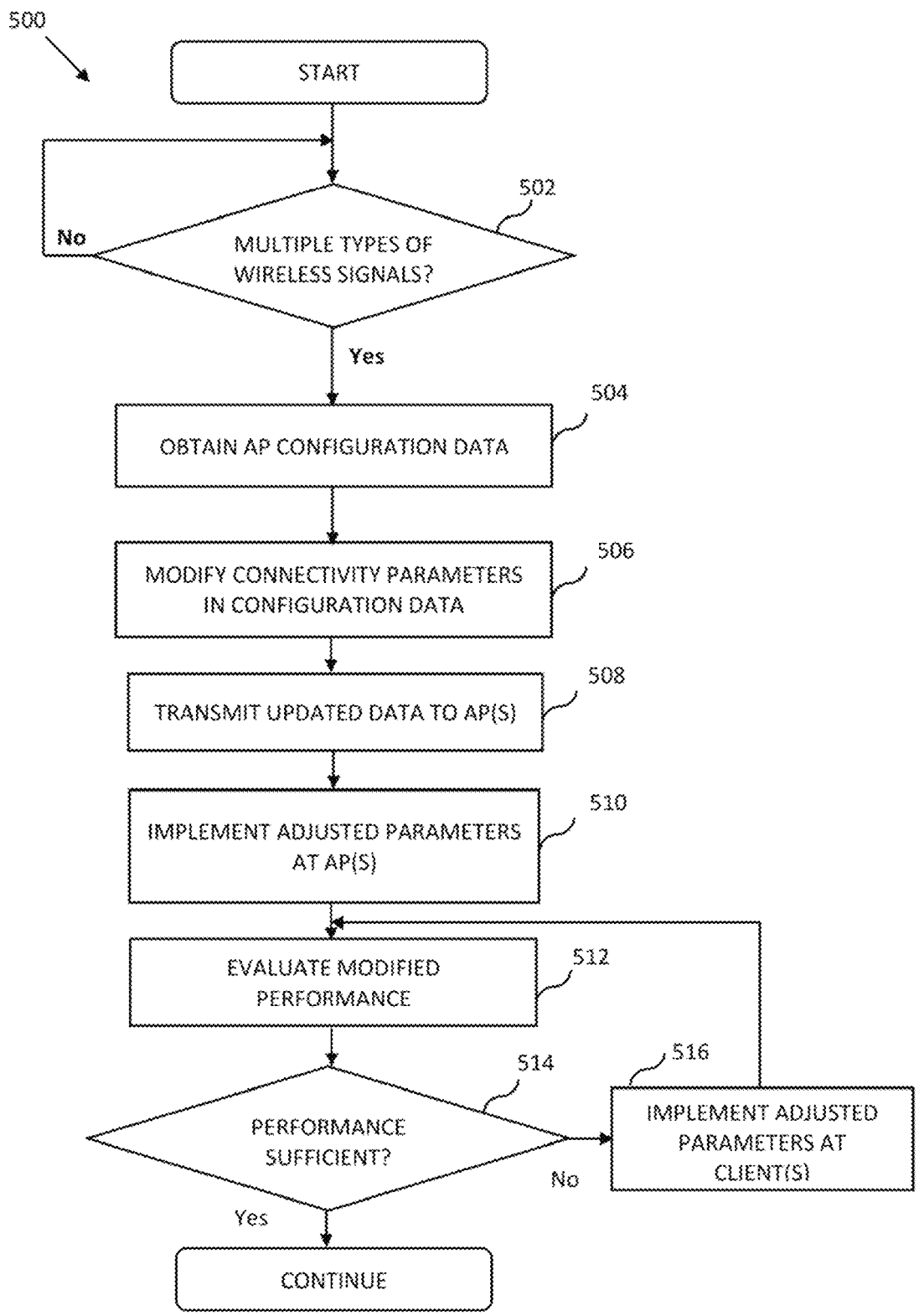
FIG. 5 is logical flow diagram of an exemplary generalized method for enabling connectivity via a wireless signal to at least one client device in a coexistence environment according to the present disclosure.
Figure 6A:
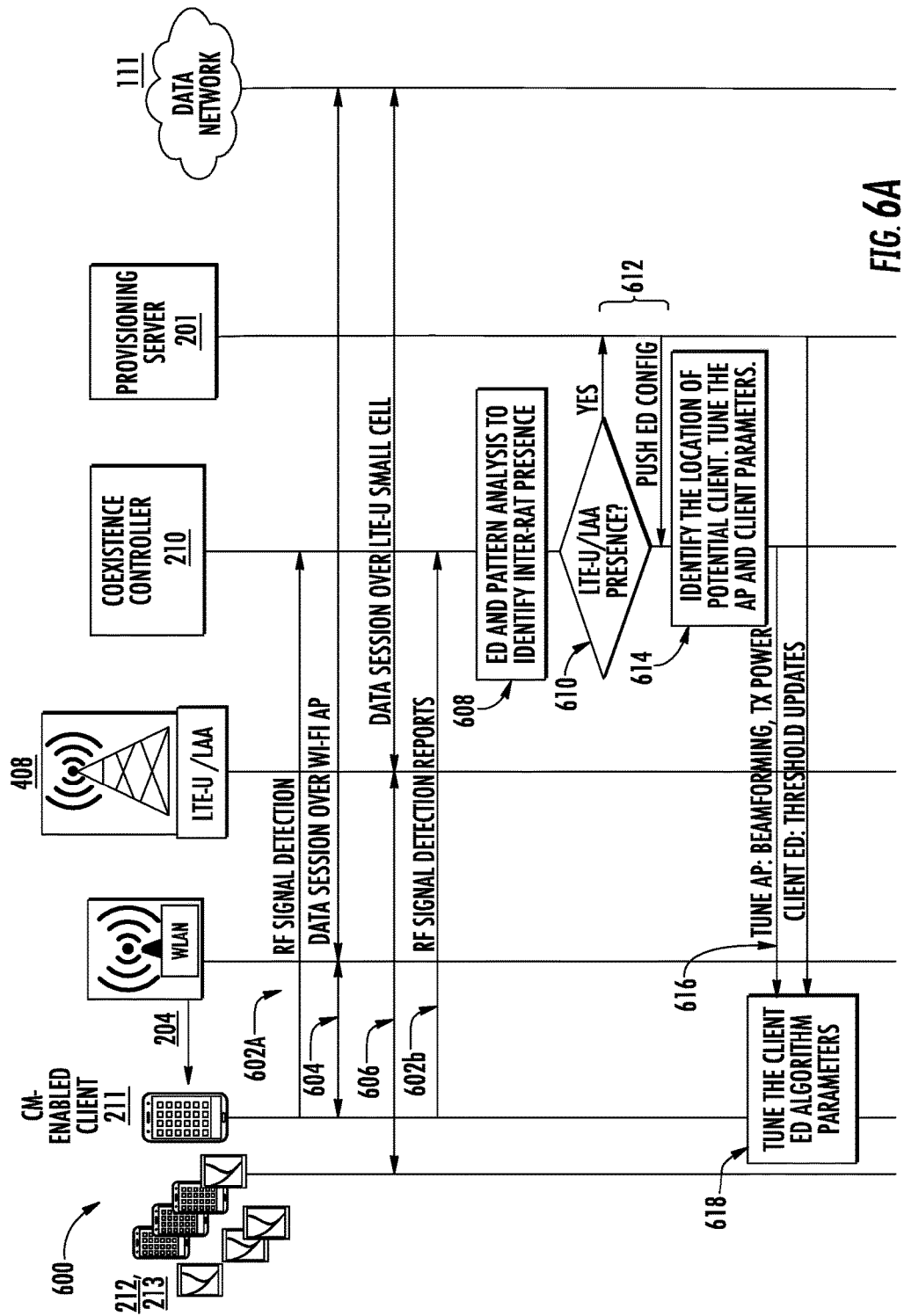
FIG. 6a is a ladder diagram illustrating an exemplary communication flow for configuring new Wi-Fi connectivity settings with an exemplary Coexistence Controller (CC) and Provisioning Server (PS) in accordance with one embodiment of the method of FIG. 5.
Figure 6B:
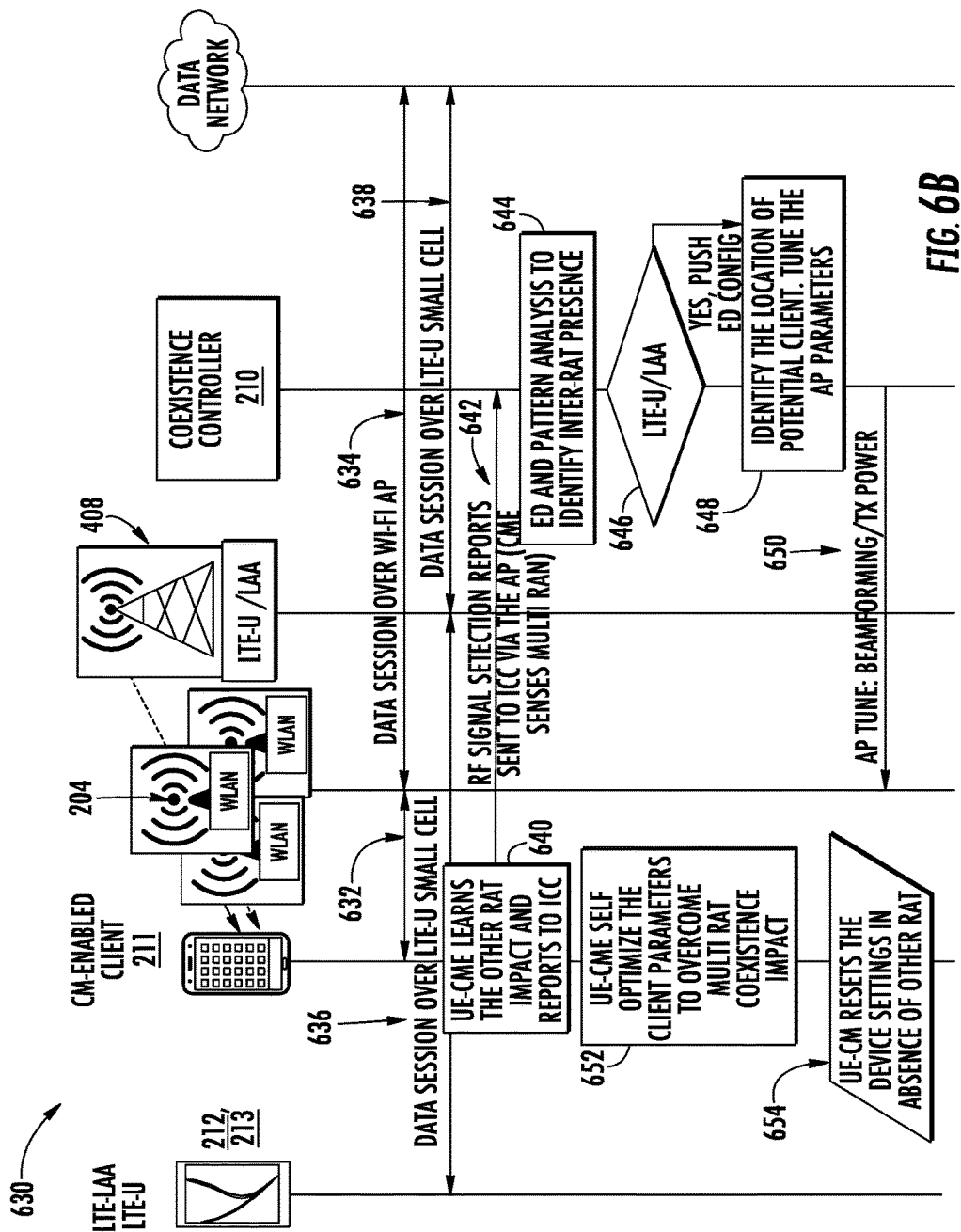
FIG. 6b is a ladder diagram illustrating an exemplary communication flow for configuring new Wi-Fi connectivity settings with an exemplary Coexistence Controller (CC) in accordance with another embodiment of the method of FIG. 5.

Various methods and embodiments thereof for controlling wireless networks according to the present disclosure are now described with respect to FIGS. 5-6b.

FIG. 5 illustrates an exemplary embodiment of a method 500 implemented by the system architecture (e.g., the system 200 as discussed above with respect to FIG. 2) to enable connectivity to a wireless network (e.g., Wi-Fi network) by a client device in a coexistence environment. The wireless network useful with method 500 is not limited to those embodied in FIGS. 2, 4 and 5 herein, and may be used with any wireless-enabled client device and any architecture utilizing data communication among nodes (especially those with multiple coexisting networks).

At step 502, the CC (e.g., CC 210 of FIG. 2) or other network entity determines whether multiple coexisting radio access technologies (RATs) are present within a venue served by the CC 210. In an exemplary embodiment, the CC may determine a coexistence scenario by receiving a report initiated from a CME-equipped client (e.g., the client 211 of FIG. 4) by wireless data connection, where the report indicates that the client 211, acting as a scanner, has detected a WLAN-competitive RAT operating in the same frequency band and/or channel(s) (e.g., LTE-U and/or LTE-LAA operating in the 5.0 GHz band).

As described in greater detail elsewhere herein, the CME 221 of the client 211 may merely collect data and forward it to another entity (e.g., the CC 210) for analysis, or conduct at least a portion of the analysis indigenously, using the processing power of the client's CPU and OS.

In its simplest form, the detection of one or more co-existing RATs may be accomplished merely by receiving RF signals in a prescribed frequency band of sufficient strength (e.g., >N dBm in a band centered at 5.0 GHz+/−5 MHz), such as via an integration function which determines the area under the energy curve in that band (and hence the "intensity" of the possible interfering signal, thereby differentiating it from say background or spurious noise). Stated differently, the presence of a sufficiently intense RF signal in the particular band can be considered de facto evidence of the presence of a prescribed RAT technology. Such measurements can also utilize a temporal or persistence aspect; e.g., integrated over time, or repetitive instances within a prescribed period of time, such as would indicate a definitive downlink (DL) signal from a base station (e.g., eNodeB) or other RAT component.

Alternatively, the CME logic (or that of another analytical entity, such as the CC 210 or server 201) can utilize more sophisticated techniques for RAT detection and identification. For example, it can be assumed that in an exemplary LTE-based installation, the DL (from base station to mobile) would be the primary interferer, based on its significantly higher radiated power as compared to the handset(s) on the UL. Hence, in one variant, the CC 210 (or other processing entity such as the server 201) can access the AP/environment database 205 (FIG. 2) to obtain historical data relating to exemplary LTE interference profiles; for example a Signal-to-Interference Noise Ratio (SINR) within a prescribed range (e.g., >23 dB to −2.5 dB), and/or a Reference Signal Received Power (RSRP) within a given range (e.g., −70 dBm to −120 dBm).

SINR is defined by Eqn. (1) below:

$$SINR = S/(I+N) \quad (1)$$

where:
- S is the power of measured usable signals, such as reference signals (RS) and physical downlink shared channels (PDSCHs);
- I is the average interference power; the power of measured signals or channel interference signals from e.g., other cells; and
- N is background noise, which can be correlated to measurement bandwidth and receiver noise coefficient(s).

In Eqn. (1), all quantities are generally measured over the same frequency bandwidth and normalized to one sub-carrier bandwidth. SINR is generally used as a measure of signal quality (and data throughput), but it is not defined in the 3GPP standards (and hence is not required to be reported to the network infrastructure; however, UE's (mobile devices in the LTE network) typically use SINR to calculate the CQI (Channel Quality Indicator) which they do report to the network.

RSRP is defined, per 3GPP, as the linear average over the power contributions (in W) of the resource elements (REs) that carry cell-specific reference signals within the considered measurement frequency bandwidth. The reference point for the RSRP determination is the antenna connector of the UE.

RSRP measurement, normally expressed in dBm, is utilized for ranking different candidate cells in accordance with their perceived signal strength.

Hence, by analogy, SINR and/or RSRP can be determined by the CME-equipped client(s) 211, obtaining RSRP measurements for any (one or more) interfering base stations within the scanner range. With SINR/RSRP values within the prescribed ranges, the presence of one or more LTE base stations can be at least assumed.

Alternatively (or in conjunction with the foregoing), Received Signal Strength Index (RSSI) and/or Reference Signal Received Quality (RSRQ) may be utilized for LTE interferer detection. RSRQ is another signal quality metric, considering also RSSI and the number of used Resource Blocks (N); specifically:

$$RSRQ = (N*RSRP)/RSSI \text{(measured over the same bandwidth)} \quad (2)$$

RSSI is a measure of the average total received power observed only in OFDM symbols containing reference symbols for antenna port 0 (e.g., OFDM symbol 0 and 4 in a slot) in the measurement bandwidth over N resource blocks.

It is noted that the total received power of the carrier RSSI includes the power from common channel serving and non-serving cells, adjacent channel interference, thermal noise, and other sources. Hence, it is less specific than the above-described metrics.

Hence, in one implementation, one or more of the foregoing parameters are measured by the scanning client(s) 211 in the region or venue of interest, within the target frequency band (e.g., in or around 5 GHz), and these values are compared to historical data within the database and reflective of an operating LTE system (such as for example at a prior time when an LTE base station was communicating with a prescribed or even indeterminate number of LTE UE's). As noted above, the historical data may also be represented as one or more parametric ranges, such that if the measured signals have values falling within the historical ranges, the presence of an LTE interferer is assumed.

While the foregoing techniques can generally reliably detect LTE interferers which may interfere with the WLAN client interface(s), the present disclosure contemplates yet further mechanisms which may be employed to definitively identify and/or characterize the interferer(s) as being LTE-based. Specifically, in one embodiment, the CME-equipped clients 211 include LTE receiver capability to receive and decode one or more "public" resource or broadcast channels transmitted by e.g., the interfering LTE base station(s). This may be in the form of an existing LTE interface (see FIG. 8b), or an LTE "emulator" module (see FIG. 8a), the CME or the interface/module having analytical logic. In operation, the LTE receiver module is configured to receive and decode one or more "public" resource or broadcast channels transmitted by e.g., the interfering LTE base station(s). As is known, LTE systems utilize OFDM on their DL (base to UE), and SC-FDMA on their UL (UE to base), and further employ a number of shared/control channels for a variety of control, signaling, and other functions. These channels exist in both DL and UL directions, and include the: (i) physical downlink control channel (PDCCH); (ii) physical uplink control channel (PUCCH); (iii) physical downlink shared channel (PDSCH); and (iv) physical uplink shared channel (PUSCH). These channels can be decoded by the receiver module (whether existing or added as an emulator) to definitely determine that a prescribed interferer in the frequency band(s) of interest is in fact LTE-based.

In operation, the LTE UE will report its CSI (channel state information, including CQI or channel quality index) via one of the UL channels; i.e., PUSCH or PUCCH, thereby characterizing the RF receiving environment for each reporting UE. The eNodeB takes the reported CSI information to develop a schedule for transmission to the UE(s) via the PDSCH, and DL resource allocation is made via the PDCCH. UL grants (for UE traffic operations such as when no PUSCH is available) are also made by the eNodeB via the PDCCH, based on requests sent via the PUCCH.

Table 1 below illustrates a hypothetical DL Link Budget (i.e., base to UE) for a data rate of 1 Mbps with dual-antenna receiver, in an exemplary frequency band (2.4 GHz):

TABLE 1

Data rate (Mbps) 1

Transmitter - eNode B

| | | |
|---|---|---|
| a | PDSCH power (dBm) | 46.0 |
| b | TX antenna gain (dBi) | 18.0 |
| c | Cable loss (dB) | 1.0 |
| d | EIRP (dBm) | 61.0 = a + b + c |

Receiver - UE

| | | |
|---|---|---|
| e | UE noise figure (dB) | 7.0 |
| f | Thermal noise (dBm) | −104.5 = k(Boltzmann) * T(290K) * B(360 kHz) |
| g | Receiver noise floor (dBm) | −97.5 = e + f |
| h | SINR (dB) | −10.0 (e.g., from scanner 214) |
| i | Receiver sensitivity (dBm) | −107.5 = g + h |
| j | Interference Margin (dB) | 3.0 |
| k | Control Channel Overhead (dB) | 1.0 |
| l | RX antenna gain (dBi) | 0.0 |
| m | Body Loss (dB) | 0.0 |
| | Maximum path loss | 164.5 dB(= d − i − j − k + l − m) |

In this case, roughly 165 dB of loss can be sustained in the link between the transmitter (eNodeB) and the receiver (UE). Actual representative values for the aforementioned reference and control channels are shown in Table 2:

TABLE 2

| Channel | MAPL (Link Budget) in dB; zero sector loading | MAPL (Link Budget) in dB; 50% sector loading |
|---|---|---|
| PDCCH | 158 | 155 |
| PUCCH | 158 | 155 |
| PDSCH | 156 | 151 |
| PUSCH | 148 | 145 |

Hence, in one embodiment, the aforementioned values (or similar) are stored in the environmental DB 205 (FIG. 2); when a suitable SINR/RSRP/RSRQ value is detected in the frequency band of interest by the CME-equipped client 211 as described above, this data is sent by the CME 221 of the client(s) 211 to the CC 210 for further analysis, including accessing the aforementioned LTE DL (and UL if appropriate) signals to attempt to decode the appropriate communications on the detected broadcast channel(s). Note that the decode operations can be conducted by the client(s)/CME(s) themselves prior to obtaining any resource allocations (and hence without registration to the LTE network), depending on their firmware configuration and how the receiver/emulator module is implemented within the particular installation. Note than although an extant LTE transceiver within the client may, if the user has a subscription, be presumed to be registered with the relevant cellular data service provider, decode of the public channels does not require such registration. Hence, under either configuration of FIG. 8*a* or 8*b*, the LTE receiver advantageously need not be able to register with the interfering network, or have any data on the identity of the network, its operator, etc.

In one variant, the CC 210 is configured to, based on the MAPL values of Table 2 above (which are e.g., stored in the DB 205), determine one or more adjustments to the WLAN AP(s). For example, in one implementation, the measured SINR value from the CME(s) 221 (as obtained by the client's LTE receiver) is used in an algorithm (such as reflected in Table 1) to, based on assumed values of thermal noise floor of the receiving scanner, scanner receiving antenna gain, zero body loss, etc., "back out" the requisite WLAN Tx power required to increase the power received at the receiving client device WLAN receiver chain to be, for instance, roughly comparable to the corresponding LTE signal (i.e., from the eNodeB), thereby ostensibly maintaining the WLAN interface "competitive" to the LTE interface. Advantageously, since a CME-equipped client 211 is used to perform its own scanning in the exemplary embodiment, the scan data it forwards to the CC 210 is wholly representative of what values that particular client 211 will see in terms of LTE-based interference (as opposed to obtaining RF environment data from a device not disposed at the same exact location). Stated differently, the client-generated RF environment data is "real world" and advantageously permits more precise calculation of path loss (and hence required corrective action by the AP/client WLAN receiver, such as increase in Tx power or reduced ED).

For example (see Table 3), if the PDSCH zero sector loading MAPL is 156 dB (Table 2), and the DL Inference Margin (IM) is on the order of ≤5 dB, and an assumed SINR of −8.0 dB, etc., then the PDSCH transmit power can be calculated as follows:

TABLE 3

Data rate (Mbps) 1

Transmitter - eNode B

| | | |
|---|---|---|
| a | PDSCH power (dBm) | 46.0 |
| b | TX antenna gain (dBi) | 18.0 |
| c | Cable loss (dB) | 1.0 |
| d | EIRP (dBm) | 61.0 = a + b + c |

Receiver - Scanner

| | | |
|---|---|---|
| e | UE noise figure (dB) | 7.0 |
| f | Thermal noise (dBm) | −104.5 = k(Boltzmann) * T(290K) * B(360 kHz) |
| g | Receiver noise floor (dBm) | −97.5 = e + f |
| h | SINR (dB) | −8.0 |
| i | Receiver sensitivity (dBm) | −105.5 = g + h |
| j | Interference Margin (dB) | 3.0 |
| k | Control Channel Overhead (dB) | 1.0 |
| l | RX antenna gain (dBi) | 0.0 |
| m | Body Loss (dB) | 0.0 |
| | Maximum path loss | 156 dB (= d − i − j − k + l − m) |

Tx eNodeB PDSCH power = 156 dB − 105.5 − 3.0 − 1.0 + 0.0 − 0.0 − 18.0 − 1.0 = 27.5 dB.

As will be recognized, more Tx power is not always better; specifically, there comes a point when a WLAN AP may, inter alia, interfere with other WLAN APs in the same venue, and/or the user (client) device receivers. Hence, exemplary embodiments of the present disclosure advantageously calculate a Tx power level for the affected APs utilizing the methodology above, and insert this configuration change, as opposed to merely increasing the Tx power by e.g., prescribed increments. Notwithstanding, the present disclosure also contemplates use of a "feedback loop," such as where the AP Tx is incrementally increased, and the effect on data rate or other performance metric evaluated to determine the efficacy of the increase (or other modification to e.g., the transmitter chain of the AP, and/or receiver chain of the client device). See also discussion of steps 590 and 592 of FIG. 5*b* provided infra.

It will also be appreciated that in the exemplary implementations, some assumptions regarding the source of LTE-based interference are made in order to simplify the protocol(s) employed by the CC 210 when performing the methods described herein. Specifically, as is known, transmitted RF power from a (presumed) point source falls of generally as $1/R^2$, where R=distance from the transmitter. In that eNodeB base stations are generally not electrically power constrained and must cover relatively large geographical areas to provide service to customers, the transmit power (e.g., EIRP) of the eNodeB is typically many times higher than a corresponding UE transmitter at the same range. Accordingly, it is assumed in the exemplary implementation that the eNodeB(s) will be the interferer(s) of concern, with the UEs adding only marginally to that effect. However, it is also recognized that the UE may, as part of its UL communications, radiate at a location immediately proximate to the AP of interest (or the client device 211 used to perform the RF environment scan), thereby making the UE an effective interferer due to its minimal $1/R^2$ losses in the small distance between itself and the AP/scanning client 211. Hence, in another implementation of the methodology, calculations similar to those for the LTE broadcast DL channels are performed for the UL channels, and used as part of the WLAN AP Tx power configuration. For example, it can be assumed a "worst case" scenario exists when the interfering UE is located directly proximate the WLAN client (e.g., a person standing next to the WLAN user is utilizing their LTE handset in the 5.0 GHz band). With an assumed MAPL of 148 dB for the PUSCH (Table 2), and knowing the measured SINR from the scanner 214, the maximum UE Tx UL power can be determined (using similar assumptions to those above), and the WLAN AP Tx adjustment set accordingly (i.e., to at least achieve parity with the greater of (i) the eNobeB Tx power, and (ii) the UE Tx power).

It is also recognized that UL/DL asymmetry typically exists; i.e., LTE UE users will be utilizing the DL much more than the UL (largely because LTE is a data service, and users of data services tend to download data more than upload/send it). Hence, the methodologies described herein can make use of this fact; e.g., whether by assumption, averaging (e.g., measurement at a number of different times, and presumptively most of which will be representative of DL activity), or active "avoidance" measures such as affirmatively determining when the UE/eNodeB are involved in a DL versus UL transaction).

The data generated by the scan function of the client 211 and CME 221 may include, inter alia, how many RATs are present, which RATs are present, which frequency bands or channels are occupied, number of client devices in the area, signal strengths, congestion levels, noise (e.g., signal-to-noise ratio), etc. Alternatively, the scan data may merely be unprocessed data that is then processed by the CC 210 (or its designated processing proxy such as the CM server 201) to identify the existence of the other RAT(s). It is also noted that the scanning client(s) 211 (and/or the system 200 generally) may be configured to, depending on which of the approaches described above are used in a particular implementation, differentiate between: (i) certain types of RATs (e.g., LTE, which is an OFDM-based system (downlink) and SC-FDMA on uplink and which uses multiple time and frequency assets such as multiple sub-carriers and time slots, versus say a CDMA/DSSS-based RAT such as WCDMA which utilizes spreading codes to distribute its energy across say a 5 MHz band); and (ii) between RAT and non-RAT sources within a given band (e.g., a cordless telephone or microwave oven and an LTE or CDMA system).

Moreover, such differentiation can be used as the basis for determining what particular contention management actions (if any) to take under a variety of different scenarios. For example, in one variant, failure to detect an OFDM or CDMA or FHSS type of waveform/modulation/spectral access scheme may by default be considered to be a spurious or non-contentious interferer, such as a microwave oven, leakage from nearby high-power electrical or other equipment, etc. Conversely, identification of a particular spectral access or modulation scheme known to be associated with only certain classes of RATs (e.g., FHSS used in Bluetooth PAN interfaces) can enable determination of the contention management actions necessary; in the case of PANs, nothing may need to be done, since their transmit power is generally very low relative to WLAN. Alternatively, for presumed spurious signals, a short term correction or modification may be implemented; e.g., temporary ED reduction, Tx power increase, migration to another band, etc.

Additionally, when the temporal aspects of the signal show only intermittent presence, such data may be used to divine the prospective source(s). For instance, in a crowded venue, many people are presumed to carry (and utilize) LTE-based phones, by which data communications can be conducted. Hence, if the scan of the venue indicates only a very intermittent single 2.4 GHz interferer (or small group of interferers), this is likely not due to a competing LTE-based RAT, and may in fact be due to a non-RAT source (or at least a RAT with insufficient RF transmit power to significantly impede WLAN negotiation and service, such as a Bluetooth link to a user's headset or a cordless phone).

It is further noted that the CM server 201 or proxy entity may make the determination of the existence/classification of the other RATs (as opposed to the CC or scanner), and merely inform the relevant AP(s) that a co-existence scenario does in fact exist.

It will also be recognized that in terms of detection of competing RATs, the exemplary embodiment of the CC 210 can utilize information regarding one or more APs that are part of its own "sphere of control" (whether directly or indirectly, such as via a co-associated CC 210 or parent/child relationship) to eliminate signals detected as otherwise being potentially interfering. For example, a nearby AP might be detected by a scanning client (or another AP acting as a scanner); data regarding operation of this nearby AP can be used to filter its contribution to the background/interference environment, and eliminate it as potentially being (mis) classified as an LTE-based interferer.

Returning again to the method 500 of FIG. 5, if a coexistence scenario is not detected, Wi-Fi access points in the venue may continue operating normally. If coexistence is detected at step 502, a multi-RAT "competition management" procedure begins at step 504.

At step 504, the CC may request and receive a configuration file (e.g., an "autoconfig" file) associated with one or more Wi-Fi access points from the provisioning server 201 or other entity (such as from the AP database 205 directly). The one or more Wi-Fi APs to be modified under the competition management plan may include all detected APs in a particular venue; for example, the background scanner may see SSIDs associated with APs that are detected in the venue over a given period of time. In other embodiments, the Wi-Fi APs to tune be identified based on which ones the background scanner has detected, or based on APs known to the CC 210.

At step 506, the CC modifies one or more connectivity parameters within the configuration file for each of the Wi-Fi APs identified in step 504 as discussed previously herein.

In one embodiment, the configuration data modification may dictate that transmit power of the Wi-Fi AP be increased. For example, the typical 20 dBm Wi-Fi transmit power may be increased to 30 dBm (or according to any applicable regulations), e.g., via "iwconfig" commands. Increased transmit power may increase the range of service of the AP and/or improve the signal strength received by a client device above that of LTE. An increased transmit power may enhance the battery life of client devices as well: by increasing Wi-Fi signal strength, the client device (or its user) may prefer to connect via Wi-Fi rather than a more power-intensive LTE connection. In another embodiment, the configuration data modification may instruct the transmit power of the AP to be reduced. A reduced transmit power may conserve power consumption of the AP, which may be useful for APs that are battery powered, used relatively infrequently, or typically used by client devices that are within close range (a café setting, lounge area, gift shop, small office, concession stand, airport gate, etc.), so as to inter alia, mitigate interference with other RATs (whether operated by the MSO or otherwise), reduce EMI exposure of patrons within the venue, or extend RF component lifetime (e.g., the longevity of the AP RF transmit chain may vary as a function of transmit power).

In one variant, the CC 210 may include data or instructions (e.g., in a configuration file sent to the AP(s) being modified) to dynamically adjust the transmit power based on distance to client devices. In one implementation thereof, to measure the distance, the AP may emit one or more beacons that may be received by a client device 211, and the client device may send back a response to the AP. The client may determine which AP to respond to based on, e.g., a bit-stuffed SSID within the beacons as described in co-owned and co-pending U.S. patent application Ser. No. 15/063,314 filed Mar. 7, 2016 and entitled "APPARATUS AND METHODS FOR DYNAMIC OPEN-ACCESS NETWORKS", incorporated by reference supra. In another embodiment, the configuration file data may cause the Wi-Fi AP (or the client device, as discussed below) to communicate on a different frequency range allowed for IEEE 802.11 protocols. For example, instead of enforcing a connection over the 5 GHz spectrum, others such as 2.4 GHz or 3.6 GHz may be allowed. In some variants, the modified configuration file may contain instructions for switching to an explicit frequency or frequencies, or instructions to switch automatically as needed (e.g., based on congestion level or other network conditions), cycled periodically or on a schedule, or based on some other algorithm. This modification allows Wi-Fi users to, at least temporarily, sidestep other RATs that may be operating in one congested frequency band.

In another embodiment, the configuration file may cause a Wi-Fi AP to enable or disable one or more of its antennas. For example, by enabling an additional antenna, the AP may reach additional users. Disabling an antenna may allow the Wi-Fi AP to qualify and serve only users who are near the AP and possibly out of service range of other RATs.

At step 508, the CC transmits the modified configuration data to the appropriate Wi-Fi AP(s). At step 510, the CC causes implementation, by the Wi-Fi AP, of the modified configuration data. Instructions to modify the parameters at the AP may be executed by a processor apparatus residing on the AP. At step 512, the method 500 then utilizes one or more performance assessment techniques to evaluate the performance of the AP(s) and/or prevailing RF environment in the venue after implementing the AP configuration change(s). In one variant, one or more of the enlisted client(s) 211 used as scanner(s) is/are used to collect additional parametric data relating to the frequency bands of interest within the venue, so as to permit e.g., relative comparison of the various RATs under the new AP transmit profiles (or other changes). Alternatively (or in conjunction with scanning), the performance of the APs may be assessed via parametric data relating to actual data sessions such as BER/PER, data throughput rate, frequency of dropped connections, etc.

Per step 514, the system 200 will determine that either (i) the modifications to the relevant AP(s) in the venue were sufficient to provide the desired level of performance, or (ii) the modifications were not sufficient. Note that within steps 510 through 514 of the method 500, multiple iterations or loops may occur, such as where individual parameters are modified successively in an incremental fashion, and the performance subsequently assessed, and/or where different parameters are modified on subsequent iterations (and performance subsequently assessed).

In the event that steps 510-514 do not produce a sufficient level of performance, the method 500 then continues to step 516, where modifications to the CME-equipped client device(s) 211, can be made to sustain the session (i.e., via presence of the aforementioned connection manager entity (CME) 221 or other capability within their indigenous OS or WLAN modem). In one embodiment, the provisioning server 201 (or even the Wi-Fi AP to which the client is connected) may instruct a given client device to lower the threshold for detecting and connecting to Wi-Fi. For example, the Wi-Fi threshold may be reduced from −72 dBm to −80 dBm in order to be competitive with one or more other RATs in the venue using the same frequency and/or channels (e.g., LTE-U or LTE-LAA). In one variant, pre-coded configuration files are resident on the client with CME 221, such that certain prescribed scenarios can be invoked by the client without having to download further configuration data; i.e., the provisioning server 201 or instructing AP 204 may simply communicate to the client that it should implement a particular scenario or configuration file, at which point the client indigenously alters its configuration based on the pre-coded data. In one variant, the (re)configuration data may instruct the client device to reduce the ED threshold yet further down (e.g., from −72 dBm to −85 dBm). One advantage of this type of modification such that the client device will even more aggressively prefer Wi-Fi over other RATs (e.g., LTE-U, LTE-LAA). However, it may also see degraded connection quality and other performance issues associated with a weak signal. In one implementation, a further-lower threshold may be useful with a Wi-Fi AP serving a lower coverage area (e.g., used in a small setting, such as a café) and/or using a lower transmit power (e.g., battery-powered AP).

In some embodiments of the exemplary method described above, the CC 210 may adjust the connectivity parameters (Wi-Fi ED threshold, AP transmit power, etc.) irrespective of a coexistence scenario. In other words, the CC may cause a node, e.g., the Wi-Fi AP(s), to maximize its connectivity performance, or cause a client device to connect to a particular node. In the case of Wi-Fi, providing a likely connection thereto without checking for coexistence may advantageously improve the performance of a client device (with respect to, e.g., battery consumption and connection speed) when the client device is persistently encouraged to connect to Wi-Fi, which may result in less consumption of limited battery power depending on respective signal strengths of available Wi-Fi and LTE connections (e.g., by virtue of eliminating the need to switch radio states in a coexistence scenario, requiring generally less power consumption on Wi-Fi relative to LTE, or obviating the need to search for either Wi-Fi access points or LTE cell towers). It may further result in less consumption of LTE "data" (subject to, e.g., a quota from the LTE service provider).

Figure 5A:
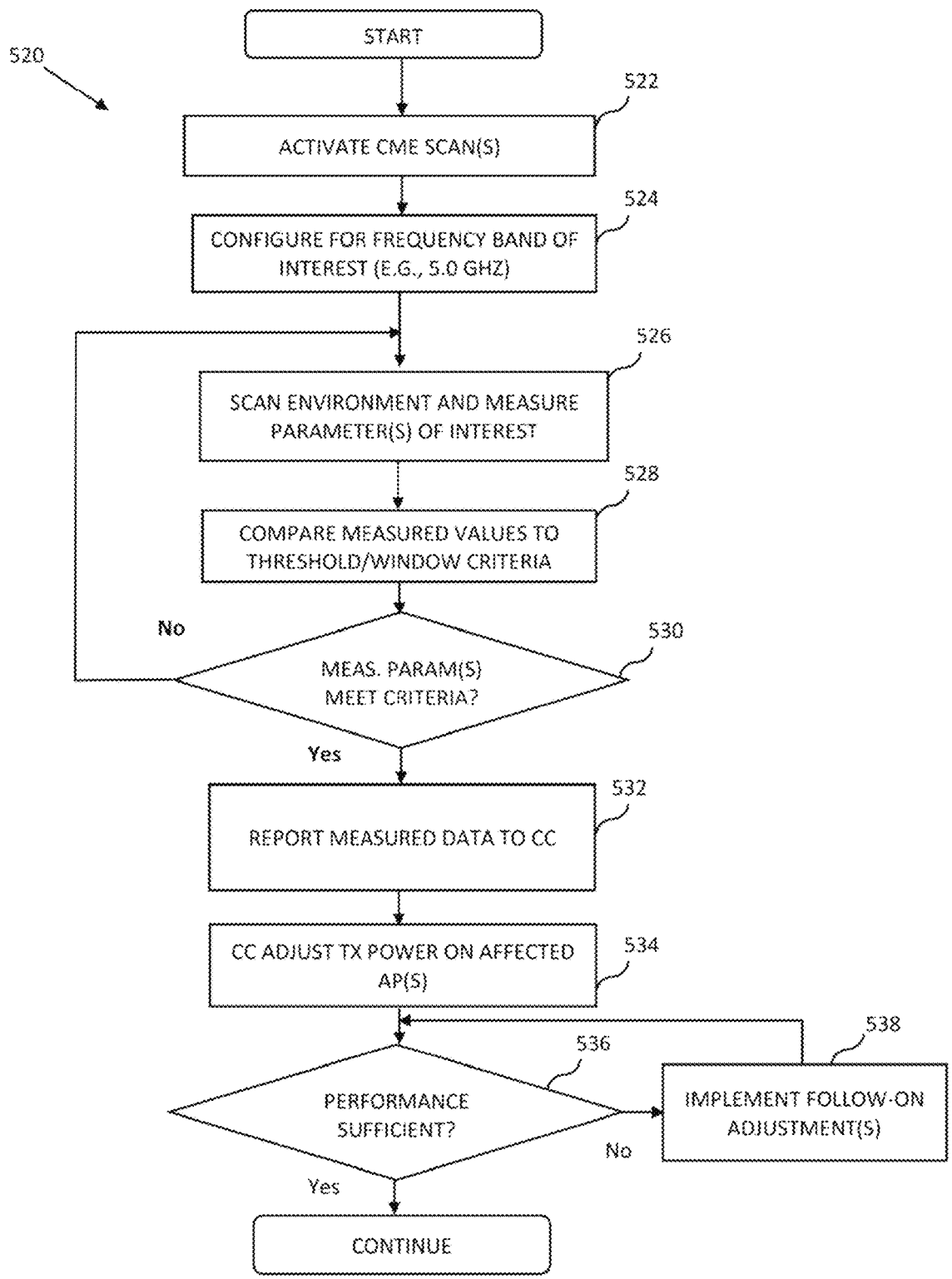
FIG. 5a is logical flow diagram of an exemplary implementation of the generalized method for enabling connectivity of FIG. 5.
Figure 5B:
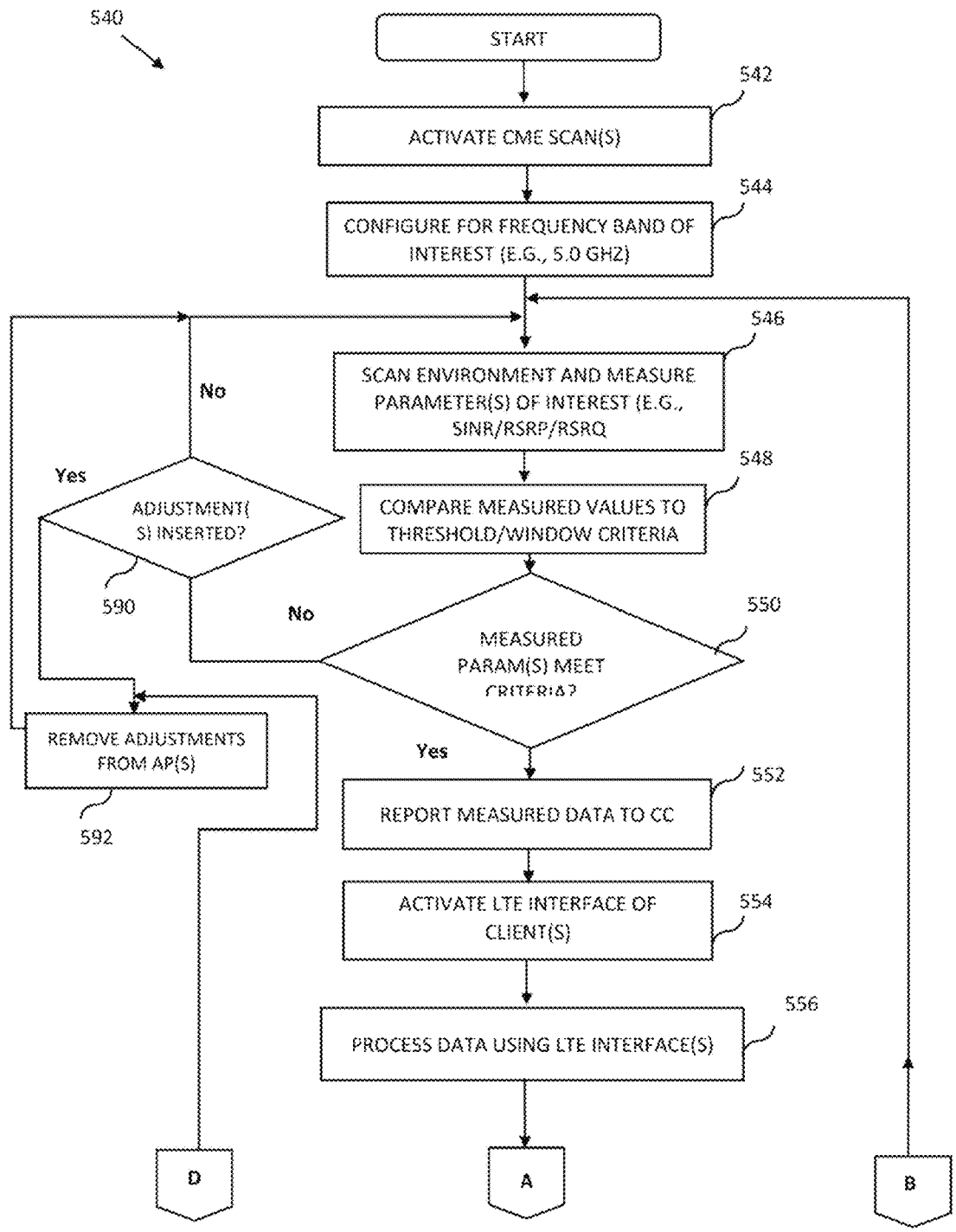
FIG. 5b is logical flow diagram of another exemplary implementation of the generalized method for enabling connectivity of FIG. 5.
Figure 5B:
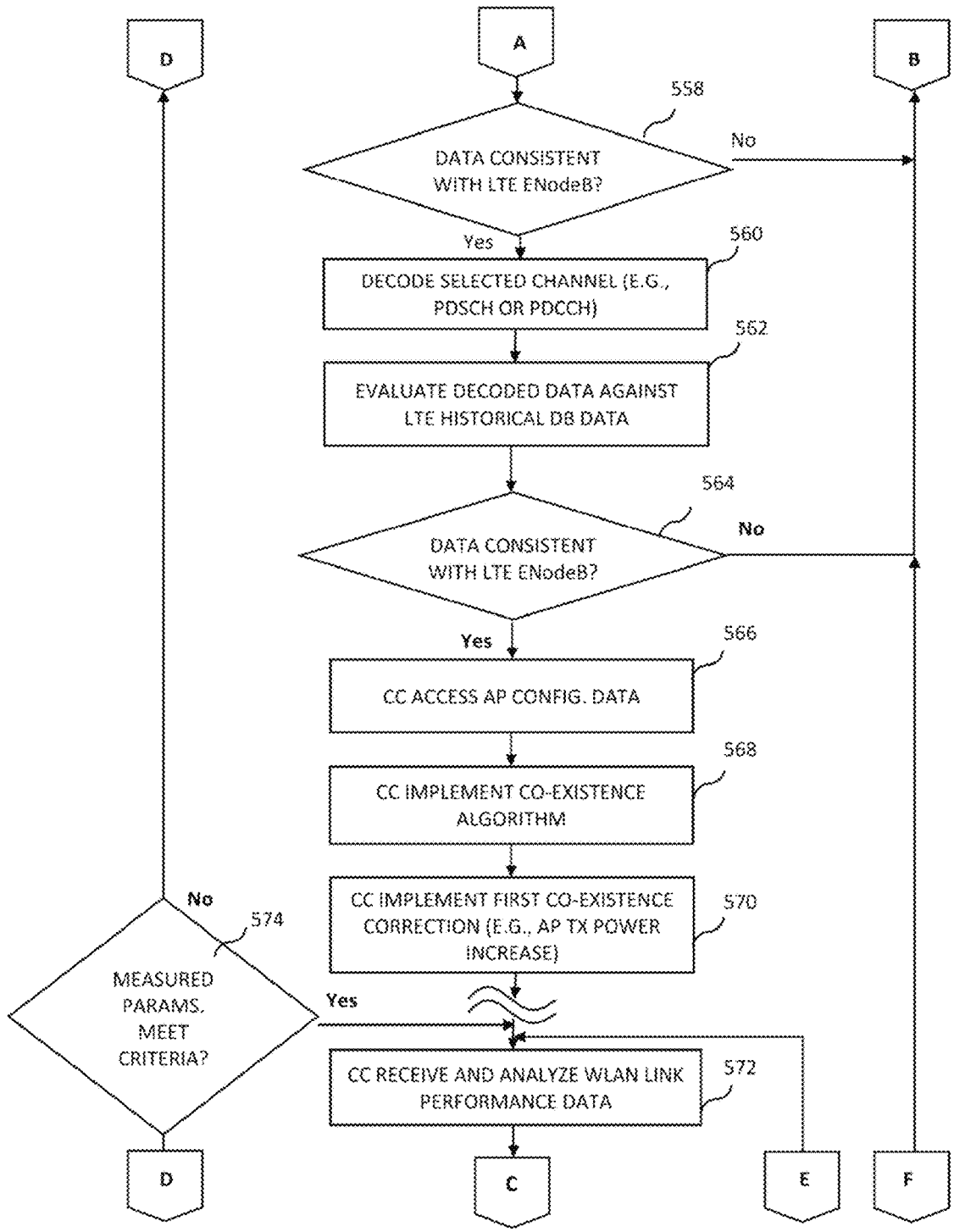
Figure 5B:
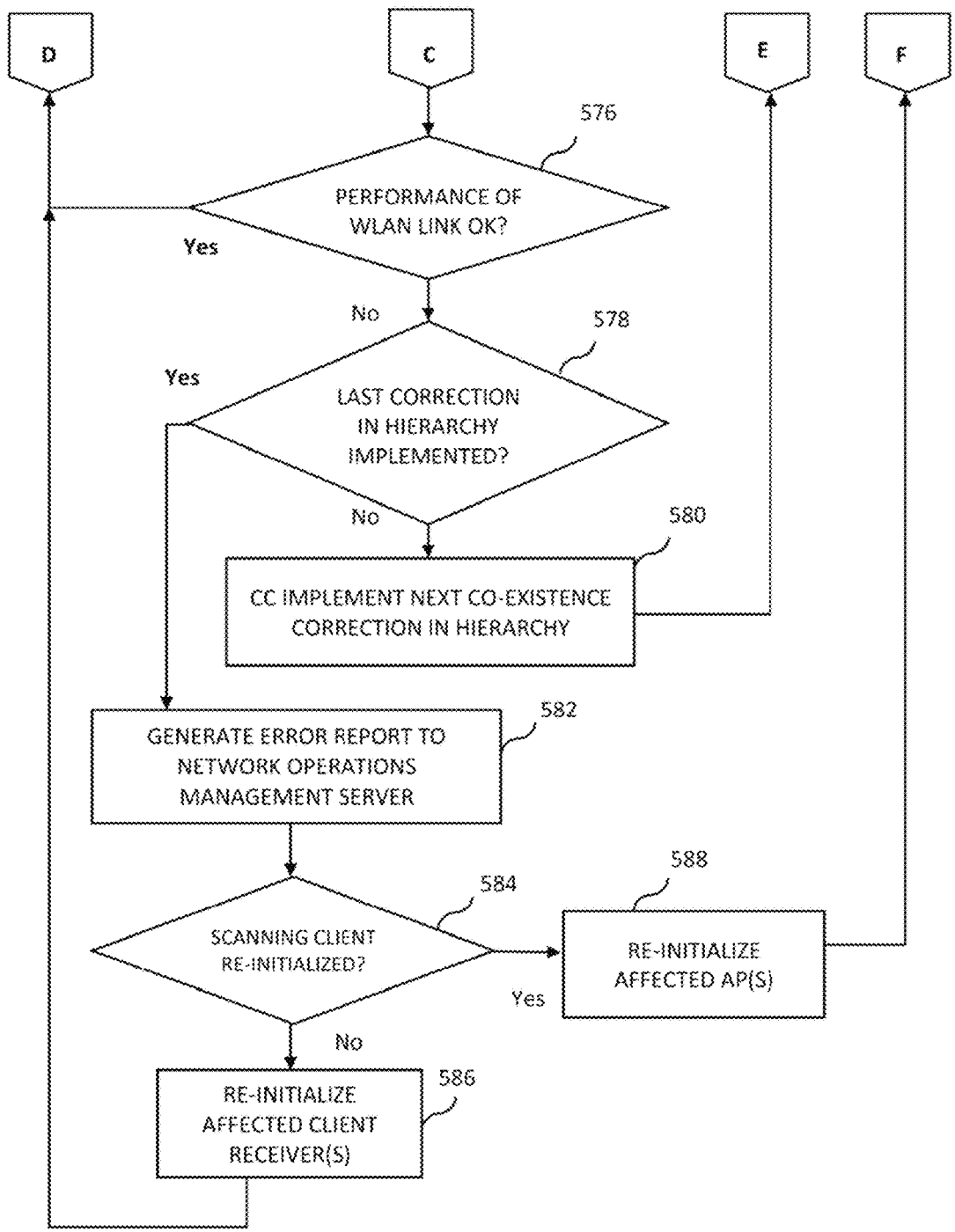

FIG. 5a illustrates an exemplary implementation of the method 500 of FIG. 5, in the context of a managed network architecture 200 such as that of FIG. 2.

As shown in FIG. 5a, the method 520 includes activating the CME-equipped client(s) 211 to scan per step 522, and configuring them as needed (e.g., for one or more bands of interest) per step 524. Per step 526, the environment in which the scanning client(s) 211 is/are located is scanned for the parameter(s) of interest (e.g., SINR/RSRP/RSRQ), and the measured values compared to one or more relevant threshold or window criteria, such as those retrieved from the DB 205. If the measured values meet the prescribed criteria per steps 528 and 530, then the measured data is then reported to the CC 210 per step 532 (because an LTE-based interferer presumptively exists). Based thereon, the CC 210 adjust the Tx power of the one or more affected APs per step 534, and subsequently monitors performance for the WLAN system per step 536 to determine its sufficiency. For instance, in one embodiment, the CC 210 obtains data rate and/or error rate data, or data relating to connection "drops" (ostensibly indicative of failed user attempts to connect to the WLAN) from the AP over a period of time, and algorithmically assesses whether the inserted configuration change was effective. If not, follow-on adjustments to the AP (which may include additional power increases, change in MCS, variation in spatial diversity profile, or other changes), and/or the client (e.g., ED threshold change via the CM 221) are implemented via step 538.

It will be appreciated that while the CME-equipped clients 211 is/are shown in the embodiment of FIG. 5a as performing the scanned data threshold/window analysis, such analysis may be performed in whole or part by the CC 210 or other network entity as well. For example, the scanning client(s) may simply report the scan results to the CC 210 for analysis thereby.

FIG. 5b shows yet another implementation of the methodology of the disclosure. As shown in FIG. 5b, the method 540 includes first activating the scanning CME-equipped client(s) 211 per step 542, and configuring them as needed (e.g., for one or more bands of interest) per step 544. Per step 546, the environment in which the scanning client(s) is/are located is scanned for the parameter(s) of interest (e.g., SINR/RSRP/RSRQ), and the measured values compared to one or more relevant threshold or window criteria, such as those retrieved from the DB 205. If the measured values meet the prescribed criteria per steps 548 and 550, then the measured data is then reported to the CC 210 per step 552.

At step 554, the CC 210 activates one or more LTE receiver modules which is acting as an LTE scanner/emulator within the client(s) 211 to evaluate the hypothesis that an LTE eNodeB (and/or interfering handset; discussed supra) is active within the service area 416. As described elsewhere herein, the LTE receiver of the client(s) may be an extant LTE transceiver, or another device (such as an LTE "emulator" added via e.g., plug-in module or other approach). In the exemplary embodiment, the CC 210 (via the clients) at steps 554 and 556 attempts to establish timing information for the network to establish that it is in fact an LTE network. For instance, in one implementation, the PSS (primary synchronization signal) is detected using measurements of RSSI and CAZAC (e.g., Zadoff-Chu sequence) autocorrelation properties, as a UE would normally do when attempting to register with the network. Specifically, wideband power is measured in a set of prescribed frequency bands, and the bands are ranked based on RSSI magnitude. The Zadoff-Chu sequences are then evaluated in the frequency domain for a given number of timing hypotheses to determine the eNodeB's group identity. At this point, the CC 210 can definitely say that the received signal data is in fact due to an LTE eNodeB pert step 558.

Next, per steps 560 and 562, the broadcast channel(s) of interest (e.g., PDSCH) is decoded and evaluated, such as against historical data for LTE eNodeB's maintained within the environmental database 205. While the evaluation of steps 556 and 558 can definitively determine the existence of an LTE-based emitter, they do not provide sufficient information for evaluation of the relative strength of the emitter(s) as measured at the scanner(s) 214, and hence steps 560 and 562 are used to enable use of MAPL data as described above to provide an estimate of adjusted Tx power for the WLAN AP such that it will at least achieve parity with the LTE eNodeB. For example, in one implementation of steps 560 and 562, the measured SINR from step 546 is used, as in Table 3 above, to calculate the estimated eNodeB Tx power given certain assumptions about the eNodeB obtained from the environmental DB 205, including maximum allowed MAPL, DL IM, etc. Consistency with historical data for an eNodeB is also again optionally evaluated per step 564 (e.g., does the calculated PDSCH Tx power fall within a "realistic" band), and assuming that the scanned data still qualifies as a valid eNodeB broadcast signal, the AP configuration data is accessed per step 566, and the coexistence algorithm of the CC 210 (and/or provisioning server 210, depending on configuration) is invoked per step 568.

It is also noted that the selective decode of UL and/or DL broadcast channels present within the scanned environment can be used as a basis of evaluating different hypotheses of the observed interferer(s). For instance, in one implementation, the CC 210 logic is configured to cause the LTE receiver module of a scanning client 211 to attempt to receive and decode both PDSCH and PUSCH channels; the ability to decode one but not the other may provide clues as to the identity of the interferer(s). For example, if the PDSCH decode is successful, but no PUSCH decode can be completed after repeated attempts, then it can be surmised that the interferer is an eNodeB, versus a very close UE.

As part of the coexistence algorithm implementation, the first "correction" within the algorithm hierarchy is implemented per step 570. For example, it may be determined that the most efficient convergence on a desired environment within a target venue is achieved by implementing a first hierarchy template, the latter which may include: (i) first incrementing the Tx power of the WLAN AP, in a series of prescribed steps; and (ii) thereafter adjusting one or more additional Tx parameters such as spatial diversity/beamforming settings, MCS, etc., and (iii) thereafter adjusting the ED threshold of the client(s), as required, based on the prescribed performance metric (e.g., received WLAN link performance data per step 572 such as may be obtained from the AP while transacting data with the client(s)).

Per step 576, the inserted adjustment or configuration change is then evaluated for a prescribed period of time (which may include a dynamically determined period based on lack of client device access of the WLAN, since the client may, when confronted with poor WLAN performance, has opted to utilize the LTE data connection for at least a period of time), and additional adjustments or changes inserted as needed based on the selected hierarchy template until the last available correction or change is utilized (step 578), at which point the CC 210 generates an error message to the cognizant NMS (network management server; not shown) to alert the service provider that the particular venue or installation is ostensibly being "over-ranged" by the proximate LTE eNodeB(s).

In the illustrated embodiment of FIG. 5b, the method 540 also optionally first: (i) re-initializes the participating/affected LTE receiver modules and the CME apps 221 of the participating client(s) (assuming no prior re-initialization per step 584), since this has no impact on any ongoing data transactions via the AP(s), per step 586. Once re-initialized, the client process 211 then scans the environment to determine whether the measured parameters meet the threshold/window criteria (i.e., is the interfering emitter still active) per step 574, and if so, steps 572 and thereafter are again performed to determine if the WLAN link performance is acceptable (for example, where the receiver module and/or CME 221 was operating improperly or merely required reboot).

If, on the other hand, the re-initialization does not produce acceptable WLAN link performance then, per step 588, one or more of the affected APs (versus clients) is/are re-initialized per step 588 in an attempt to solve the issue.

The illustrated methodology 540 of FIG. 5b also includes a logic "loop" to reduce or back out any inserted configuration changes or adjustments if desired. As noted above, more AP Tx power is not always desirable, and in fact can have negative consequences relating to, inter alia, inter-AP or AP/non-associated client interference. Hence, when the presence of a detected interferer ceases, the methodology 540 selectively removes any adjustments that have been entered (e.g., to the AP) via steps 590 and 592. It will be appreciated that the removal algorithm of step 592 may in fact comprise a sequence or hierarchy such as that used for insertion of the configuration changes as previously described, yet effectively in reverse, or can simply constitute a blanket return to the original configuration, depending on the desired attributes of the particular installation. Yet other schemes will be recognized by those of ordinary skill given the present disclosure, such as for example: (i) a "wait-and-remove" scheme, wherein the configuration changes are removed after certain periods of time have expired; (ii) dynamic determination of a removal hierarchy (e.g., where certain less-effective configuration changes, as determined by e.g., data collected during change insertion, can be preferentially removed first to as to maintain only necessary changes inserted), and (iii) dynamic sensitivity analysis, such as where the removal of inserted changes, and subsequent re-insertion thereof, is performed so as to determine the appropriate hierarchy for removal.

FIG. 6a is a ladder diagram illustrating an exemplary communications flow 600 for configuring and controlling Wi-Fi connectivity within a venue with coexisting Wi-Fi and LTE-U or LTE-LAA services, such as that previously described.

At step 602a of the exemplary embodiment, an enlisted CME-equipped client 211 acting as a scanner sends an RF detection report to a CC 210. The report may contain information related to, e.g., transmit power of nearby access points and nodes, number of users, channels used, data transmission rates, beamforming settings, modulation/coding scheme (MCS), or other statistics associated with signals propagating within the venue, e.g., signals related to ongoing or newly established data sessions 604, 606 over Wi-Fi and LTE (e.g., LTE-U and/or LTE-LAA). Wi-Fi signals may originate from a Wi-Fi access point 204; LTE signals may come from a small cell or node (e.g., cell tower 408). As previously discussed, the scanning client may be opportunistically selected (based on e.g., knowledge of its location) to detect signals within a particular venue or area, or scan for signals from known access points and nodes in the venue. In this exemplary embodiment, detected data session 606 corresponds to LTE-U, but other RATs may be detected. The ICC may require more than one report that confirms the presence of coexisting RATs (e.g., Wi-Fi and LTE-U). At step 602b, one such repeated detection report may be transmitted to the CC 210.

At step 608, the CC 210 analyzes the report to determine and identify the presence of RATs (e.g., LTE tower 408 and/or Wi-Fi AP 204) near the scanning client 211. In one embodiment, the analysis of the report may include a determination of parameters as previously described; e.g., the strength or quality of the radio signals detected (including, e.g., signal-to-noise ratio (SNR) and/or received signal strength indicator (RSSI)), frequency spectrum used (e.g., 5 GHz band), energy detection (ED) thresholds, channels used, and/or other connectivity parameters that indicate the likely choices that a client device may have for wirelessly connecting to a network.

At step 610, based on the analyzed report, the CC 210 determines whether LTE is present in the venue targeted by the scanning client(s) 211. For example, LTE-U or LTE-LAA operating in the same frequency band and/or channel(s) as Wi-Fi (e.g., 5 GHz band) may be detected, indicating two or more coexisting RATs. Note that in various other implementations, the CC 210 may be configured to detect RATs other than LTE (e.g., Bluetooth, LTE-A, 3G UMTS, CDMA, EDGE (Enhanced Data Rates for GSM Evolution), or 2G USM).

If the CC does not determine that LTE is present at step 610, no action is taken to adjust network settings, i.e., no collision avoidance or contention management mechanism is utilized.

If the CC 210 determines the presence of LTE at step 610, data is exchanged between the CC and provisioning server 201, the data being associated with the Wi-Fi AP(s) providing Wi-Fi service that coexists with the detected LTE service, at step 612. More specifically, the CC 210 may indicate the coexistence scenario, or which Wi-Fi AP(s) will be modified, to the CM provisioning server 201, which in turns transmits a configuration file for, e.g., Wi-Fi AP 203 to the CC (e.g., via a data "push"). In one variant, the CC may obtain the configuration files for all Wi-Fi APs in the venue that are operated by the CC (or others in which it is in communication, such as via sub-net). In one implementation, these APs include all APs that the scanning client(s) has/have detected signals from (e.g., the scanning client 211 may record SSIDs that it has seen over a period of time). In another variant, the CC may selectively determine which AP(s) to tune based on coverage areas of each AP and LTE nodes that are known to be installed within the venue.

At step 614, the CC identifies the Wi-Fi AP(s) to tune as discussed above, and modifies one or more connectivity parameters contained therein, resulting in a modified configuration file (e.g., an "autoconfig" file). The modified parameters may include an increased transmit power of one or more antennas or transceivers on an AP, a lower ED threshold for Wi-Fi connectivity, and/or frequency ranges used (e.g., if LTE-U or LTE-LAA is using the 5 GHz band, then Wi-Fi may move to a less-crowded one of other legal frequencies for IEEE 802.11 protocols, i.e., one or more of 2.4 GHz, 3.6 GHz, 4.9 GHz and 5.9 GHz). Other considerations for a modified Wi-Fi connection may be considered, such as beamform parameters (e.g., modification of phase and/or amplitude of transmitter signal), physical configuration of one or more antennas at the AP (e.g., angle of antennas, relative distance from each other), and/or others.

It will be appreciated that one or a combination of these parameters may be tuned at a time, and may be modified in the opposite direction as those noted above such as e.g., for a sensitivity analysis or the like, or yet other reasons. For example, transmit power may be decreased, or ED threshold may be raised, so as to determine (via the scan functionality of the client(s) 211) the effect on actual sensed RF parameters. Moreover, such counter-corrections may assure a high-speed Wi-Fi-only "hotspot", i.e., an AP in which the service area is of a shorter range, but also may be out of range for LTE service, essentially qualifying users who prefer a stronger Wi-Fi signal even if they must be closer to the source (i.e., the AP). In one variant thereof, transmit power may be lowered based on distance, i.e., the closer a client device, the lower the transmit power. An AP may detect the distance from a client device and itself by, e.g., measuring a response time of a beacon sent to the client device, or by other means such as GPS. CME-equipped clients 211 can for example access a GPS API and send the data to the CC 210 or AP directly. For an AP that typically serves relatively few client devices at a time, there is no need to maintain a large-range signal.

In another variant, power considerations may affect the transmit power when there is a limited availability of power, e.g., for a battery-powered AP or a client device low on battery. That is, if the AP is running low on battery, the AP may reduce its transmit power. Conversely, if the AP receives a low-battery indication from the client device, the AP may increase its transmit power so as to increase the likelihood that the client devices connects to a Wi-Fi signal showing higher signal strength and avoid use of a comparatively "energy-heavy" LTE interface.

Further with respect to step 614, the AP(s) may detect one or more potential client devices within the service range of the AP(s), which may be assumed to be capable of receiving both Wi-Fi and LTE services. In one embodiment, APs may detect client devices by determining which devices are already connected (i.e., by association of a given client with a given AP, its location is resolved to at least the effective range of the AP). In another embodiment, APs may find client devices by detecting responses to beacons, probe requests, or other data structures that are transmitted therefrom (e.g., broadcast), as described in, e.g., co-owned and co-pending U.S. patent application Ser. No. 15/063,314 filed Mar. 7, 2016 and entitled "APPARATUS AND METHODS FOR DYNAMIC OPEN-ACCESS NETWORKS", incorporated by reference supra.

At step 616, the CC 210 pushes (i.e., transmits) the modified configuration file to the identified AP(s), by wired or wireless means (e.g., via AP backhaul; see FIG. 2a). Each AP receiving a modified configuration file updates its transmit/receive or other settings accordingly. The AP may also retain its previous and/or original configuration files within a local or remote storage unit (including the AP database 205), which may be used to revert back to a previous setting (e.g., if Wi-Fi no longer coexists with LTE, based on a determination by the CC, and/or based on other conditions). By virtue of the updated settings, the AP 204 may operate with a higher transmit power or signal strength. One end result is that the client devices may detect and/or display additional SSIDs from Wi-Fi APs for automatic or manual connection.

With regard to causing client devices to update (e.g., lower) its ED threshold, in one embodiment, the provisioning server 201 may optionally send instructions to client devices 211 within its service range at step 618. The instructions may be configured to update client-side software settings, such as ED thresholds for Wi-Fi. For example, the threshold may be reduced to match that of LTE (or be lower), e.g., to −80 to −85 dBm. In one embodiment, these instructions may be received via the CME 221, e.g., a downloadable software application offered by a service provider to its customers or subscribers, or installed middleware. The app may include an application programming interface (API) available from the service provider operating the AP, and offer various resources that enhance the customer experience, e.g., convenient access to billing information and/or payment options reviewable by customers, exclusive content or media from the service provider, online or remote "cloud" storage, email access, interface for shopping for additional hardware or features, or access to support and troubleshooting help. For client devices without the software or those who are not current subscribers to the service provider, instructions may be received via bit-stuffed beacons (as described in, e.g., co-owned and co-pending U.S. patent application Ser. No. 15/063,314 filed Mar. 7, 2016 and entitled "APPARATUS AND METHODS FOR DYNAMIC OPEN-ACCESS NETWORKS", incorporated by reference supra). In one variant, the network services from the Wi-Fi AP 204 are accessible only by MSO-authorized client devices or client devices running the downloadable app.

The foregoing exemplary flow process may be repeated for each instance of identifying a multi-RAT environment.

FIG. 6b is a ladder diagram illustrating another exemplary communications flow 630 for configuring and controlling Wi-Fi connectivity within a venue with coexisting Wi-Fi and LTE-U or LTE-LAA services. In this implementation, (i) no provisioning server 201 is utilized, and (ii) the CME-enabled client(s) 211 is/are configured to be self-configuring/optimizing.

Per steps 632 and 634, the client 211 conducts Wi-Fi data transactions with an associated AP, and the AP communicates with its backhaul to transact data with a network such as the Internet, respectively.

Concurrently, other devices (e.g., non-CME equipped UEs 212, 213) transact data with a local eNB, such as via LTE-U/LTE-LAA protocols previously described), and its backhaul, per steps 636 and 638. These LTE-based communicates act as interferers for the WLAN interface of the CME client 211.

At step 640 of the exemplary embodiment of FIG. 6b, a CME-equipped client 211 detects degradation or interference (via acting as a scanner), and sends an RF detection report to a CC 210 per step 642. As noted above, the report may contain information related to, e.g., transmit power of nearby access points and nodes, number of users, channels used, data transmission rates, beamforming settings, modulation/coding scheme (MCS), or other statistics associated with signals propagating within the venue, e.g., signals related to ongoing or newly established data sessions over Wi-Fi and LTE (e.g., LTE-U and/or LTE-LAA). As previously discussed, the scanning client may be opportunistically selected (based on e.g., knowledge of its location) to detect signals within a particular venue or area, or scan for signals from known access points and nodes in the venue. In this exemplary embodiment, the detected interfering data session 636, 638 corresponds to LTE-U, but other RATs may be detected. The CC 210 may require more than one report that confirms the presence of coexisting RATs (e.g., Wi-Fi and LTE-U).

At step 644, the CC 210 analyzes the report to determine and identify the presence of RATs (e.g., LTE tower 408 and/or Wi-Fi AP 204) near the scanning client 211. In one embodiment, the analysis of the report may include a determination of parameters as previously described; e.g., the strength or quality of the radio signals detected (including, e.g., signal-to-noise ratio (SNR) and/or received signal strength indicator (RSSI)), frequency spectrum used (e.g., 5 GHz band), energy detection (ED) thresholds, channels used, and/or other connectivity parameters that indicate the likely choices that a client device may have for wirelessly connecting to a network.

At step 646, based on the analyzed report, the CC 210 determines whether LTE is present in the venue targeted by the scanning client(s) 211. For example, LTE-U or LTE-LAA operating in the same frequency band and/or channel(s) as Wi-Fi (e.g., 5 GHz band) may be detected, indicating two or more coexisting RATs. If the CC does not determine that LTE is present at step 646, no action is taken to adjust network settings, i.e., no collision avoidance or contention management mechanism is utilized.

If the CC 210 determines the presence of LTE at step 646, the CC determines the location of the relevant AP 204 at step 648 (e.g., via its SSID or other data, and stored location data for AP placements within the venue), and generates a configuration file for that AP 204, which is then transmitted to the AP 204 via e.g., via a data "push" at step 650.

At step 652, the CME 221 of the client 211 invokes a self-configuration/optimization protocol. In one implementation, this protocol comprises: (i) first waiting a period of time after the scan report of step 642 has been sent to the CC 210 (such as via a countdown timer process within the CME 221), so as to give the CC 210 and AP 204 a chance to alter its configuration and correct or compensate for the detected interference condition; and (ii) if expiry of the countdown timer occurs with no intervening improvement in WLAN performance (as determined either indigenously by the CME 221 polling the WLAN interface for one or more performance-related parameters such as RSSI, BER/PER, reconnect attempts, etc., or as determined by a communication received from the CC 210 on the WLAN DL), invoking its own indigenous protocol to adjust its WLAN interface settings (such as ED threshold value reduction, use of additional spatial diversity, increasing UL transmit power, etc. as previously described). It will be appreciated that one or a combination of these parameters may be tuned at a time, and may be modified in the opposite direction as those noted above such as e.g., for a sensitivity analysis or the like, or yet other reasons. For example, transmit power may be decreased, or ED threshold may be raised, so as to determine the effect on actual WLAN link parameters.

At step 654, if subsequent WLAN performance evaluations and/or scan reports (whether interpreted by the client CME 221, CC 210, or both) indicate that the interference has been mitigated or subsided, the CME 221 instructs its WLAN interface to reset to its "nominal" profile (e.g., normal ED threshold, UL Tx power, etc.) so as to resume normal operation.

The foregoing exemplary flow process may be repeated for each instance of identifying a multi-RAT environment.

It will also be appreciated that the CME-based methods and apparatus of the present application may also be used in a complementary fashion with dedicated scan infrastructure such as that described in co-owned and co-pending U.S. patent application Ser. No. 15/615,686 filed Jun. 6, 2017 and entitled "METHODS AND APPARATUS FOR DYNAMIC CONTROL OF CONNECTIONS TO CO-EXISTING RADIO ACCESS NETWORKS," incorporated herein by reference in its entirety. For example, certain venues or other use cases may benefit from both installed scanning apparatus and client-based (CME) scan capability in order to more completely or accurately characterize the RF environment, or provide other desired attributes.

Coexistence Controller (CC) Apparatus—

Figure 7:
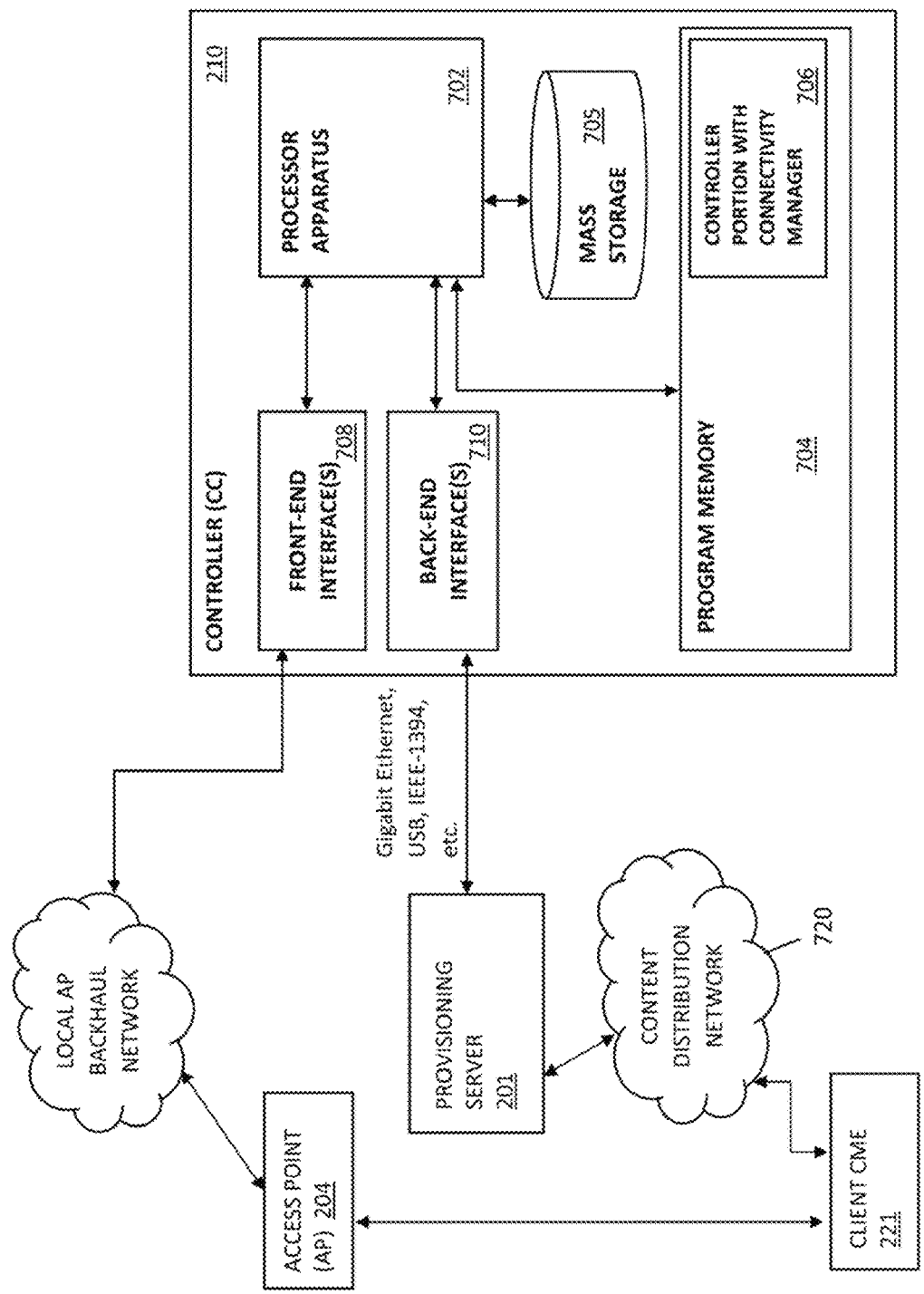
FIG. 7 is a functional block diagram illustrating an exemplary coexistence controller (CC) apparatus useful with various embodiments of the present disclosure.

FIG. 7 illustrates a block diagram of exemplary hardware and architecture of a controller apparatus, e.g., the Coexistence Controller (CC) 210 of FIG. 2, useful for operation in accordance with the present disclosure.

In one exemplary embodiment as shown, the CC 210 includes, inter alia, a processor apparatus or subsystem 702, a program memory module 704, a connectivity manager module 706 (here implemented as software or firmware operative to execute on the processor 702), a back-end (e.g., headend backhaul) network interface 710, and a front-end network interface 708 (i.e., AP/scanner local backhaul). Although the exemplary controller 210 may be used as described within the present disclosure, those of ordinary skill in the related arts will readily appreciate, given the present disclosure, that the controller apparatus may be virtualized and/or distributed within other core network entities (thus having ready access to power for continued operation), and hence the foregoing apparatus 210 is purely illustrative.

More particularly, the exemplary CC apparatus 210 can be physically located near or within the centralized manager network (e.g., MSO network); an intermediate entity, e.g., within a data center, such as an AP controller (see FIG. 2a); and/or within "cloud" entities or other portions of the infrastructure of which the rest of the wireless network (as discussed supra) is a part, whether owned/operated by the MSO or otherwise. In some embodiments, the CC 210 may be one of several controllers, each having equivalent effectiveness or different levels of use, e.g., within a hierarchy (e.g., the CC 210 may be under a "parent" controller that manages multiple slave or subordinate controllers).

In one embodiment, the processor apparatus 702 may include one or more of a digital signal processor, microprocessor, field-programmable gate array, or plurality of processing components mounted on one or more substrates. The processor 702 may also comprise an internal cache memory. The processing subsystem is in communication with a program memory module or subsystem 704, where the latter may include memory which may comprise, e.g., SRAM, flash and/or SDRAM components. The memory module 804 may implement one or more of direct memory access (DMA) type hardware, so as to facilitate data accesses as is well known in the art. The memory module of the exemplary embodiment contains one or more computer-executable instructions that are executable by the processor apparatus 702. A mass storage device (e.g., HDD or SSD, or even NAND flash or the like) is also provided as shown.

The processing apparatus 702 is configured to execute at least one computer program stored in memory 704 (e.g., the logic of the CC connectivity manager 706 which, in conjunction with the CME's 221 of the respective clients as applicable, implements the various CC functions described herein with respect to contention management of the WLAN devices relative to other RATs). Other embodiments may implement such functionality within dedicated hardware, logic, and/or specialized co-processors (not shown). For instance, the connectivity manager functionality (or portions of the functionality thereof) can be located in one or more MSO data centers, and/or in other "cloud" entities, whether within or outside of the MSO network, and distributed across multiple domains (logical and hardware) as previously described.

In one embodiment, the connectivity manager 706 is further configured to register known downstream devices (e.g., access points and nodes), other backend devices, and wireless client devices (remotely located or otherwise), and centrally control the broader wireless network (and any constituent peer-to-peer sub-networks). Such configuration include, e.g., providing network identification (e.g., to APs, client devices, background scanner, and other downstream devices, or to upstream devices), identifying network congestion, and managing capabilities supported by the wireless network.

In some embodiments, the connectivity manager 706 may also be capable of obtaining data, and even use M2M learning or other logic to identify and learn patterns among detected RF signals (e.g., RAT interference occurs at certain times of day or locations, or how often a particular Wi-Fi AP needs to implement contention management with another RAT). Patterns may be derived from, for example, analysis of historical data collected from the reports from the background scanner over time. In one variant, the connectivity manager 706 may, without waiting for or analyzing a report from the CME-equipped client(s) 211, automatically send a templated configuration file to one or more APs that serve client devices that are likely affected by contention with another RAT (e.g., LTE-U or LTE-LAA), where the templated configuration file contains typical or recurring modifications that are made to the APs that frequently require such modifications.

In one embodiment, the connectivity manager 706 accesses the mass storage 705 (or the AP DB 205) to retrieve stored data. The data or information may relate to reports or configuration files as noted above. Such reports or files may be accessible by the connectivity manager 706 and/or processor 702, as well as other network entities, e.g., a CM provisioning server 201 or wireless APs 202, 204, 206, 208. The connectivity manager 706 may retrieve a configuration file from the mass storage 705, AP DB 205, or provisioning server 201, and then modify connectivity parameters stored in the configuration file based at least in part on reports received from the background scanner and other identified network conditions (e.g., congestion level, status of APs, number of client devices), the reports containing information with respect to, inter alia, downstream network entities and network conditions. In one alternate variant, the CM provisioning server 201 is part of the CC architecture (e.g., virtualized and/or incorporated as a discrete module within the CC 210).

In other embodiments, application program interfaces (APIs) such as those included in an MSO-provided applications, installed with other proprietary software, or natively available on the controller apparatus (e.g., as part of the computer program noted supra or exclusively internal to the connectivity manager 706) may also reside in the internal cache or other memory 704. Such APIs may include common network protocols or programming languages configured to enable communication with other network entities as well as receipt and transmit signals that a receiving device (e.g., Wi-Fi AP, client device) may interpret.

In another embodiment, the connectivity manager 706 is further configured to communicate with one or more authentication, authorization, and accounting (AAA) servers of the network. The AAA servers are configured to provide services for, e.g., authorization and/or control of network subscribers for controlling access and enforcing policies related thereto with respect to computer resources, enforcing policies, auditing usage, and providing the information necessary to bill for services. AAA servers may further be useful for providing subscriber-exclusive features or content via, e.g., downloadable MSO-provided applications.

In some variants, authentication processes are configured to identify an AP, a client device, or an end user, such as by having the client device identify or end user enter valid credentials (e.g., user name and password, or Globally Unique Identifier (GUID)) before network access or other services provided by the operator may be granted to the client device and its user. Following authentication, the AAA servers may grant authorization to a subscriber user for certain features, functions, and/or tasks, including access to MSO-provided email account, cloud storage account, streaming content, billing information, exclusive media content, etc. Authentication processes may be configured to identify or estimate which of the known APs serviced by the CC 210 tend to serve users or client devices that subscribe to the MSO's services, thereby providing additional insights with respect to how a particular AP may be treated. For example, if a first AP serves many clients relative to another AP, the CC may favor the first AP by, e.g., configuring the connectivity parameters to be more aggressive, resulting in a better or additional end-user experiences for subscribers.

Returning to the exemplary embodiment as shown in FIG. 7, one or more network "front-end" interfaces 708 are utilized in the illustrated embodiment for communication with downstream network entities, e.g., APs (and hence indirectly with clients 211), and/or other WLAN-to-controller backhaul entities and intermediate data centers, via, e.g., Ethernet or other wired and/or wireless data network protocols. Reports transmitted from the CME 221 of the CME-equipped clients 211 are routed via the network interface to the connectivity manager 706 within the CC protocol stack. Modified configuration files are routed via the network interface from the connectivity manager 706 to one or more APs via inter-process communications (e.g., the manager 706 to a corresponding software or firmware process running on the relevant AP).

In the exemplary embodiment, one or more backend interfaces 710 are configured to transact one or more network address packets with other networked devices, particularly backend apparatus such as the CM provisioning server 201, CMTS, Layer 3 switch, network monitoring center, AAA server, etc. according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay). In one embodiment, the backend network interface(s) 710 operate(s) in signal communication with the backbone of the content delivery network (CDN) 720, such as that of FIGS. 1-2*a*. These interfaces might comprise, for instance, GbE (Gigabit Ethernet) or other interfaces of suitable bandwidth capability. As previously described, the PS 201 is in data communication with the relevant clients 211 (or clients 212, 213 before their CME provisioning) in order to download, update, configure, remove, etc. the CME 221 on the client as needed. It will be recognized that the PS 210 may communicate with the client(s) via the same or different bearer than the WLAN interface to the AP 204; e.g., using a wired or wireless connection of sufficient bandwidth to transact the necessary CME-related functions, such as an LTE-based data connection, Bluetooth, Ethernet, or even Wireless USB (OTG) or the like. For low bandwidth transactions, NFC may be utilized, such as where the MSO offers an NFC "hotspot" within the venue that the MSO subscriber can merely place their smartphone in proximity with to obtain configuration updates or other types of data, or perform other data transactions. Bluetooth or another protocol may be used to negotiate the NFC transaction if desired in one implementation, or conversely, NFC can be used to negotiate the transaction, with Bluetooth (e.g., EDR) or another PAN technology used to effect the higher-bandwidth transaction.

The CDN 720 (or WLAN interface) may also enable the client CME to access online assets such as "app stores" where downloads/installs, updates, etc. can be obtained from a third party vendor (e.g., the Google Play store for an Android-based client 211).

It will also be appreciated that the two interfaces 708, 710 may be aggregated together and/or shared with other extant data interfaces, such as in cases where a controller function is virtualized within another component, such as an MSO network server performing that function.

CME-equipped Client Device—

Figure 8A:
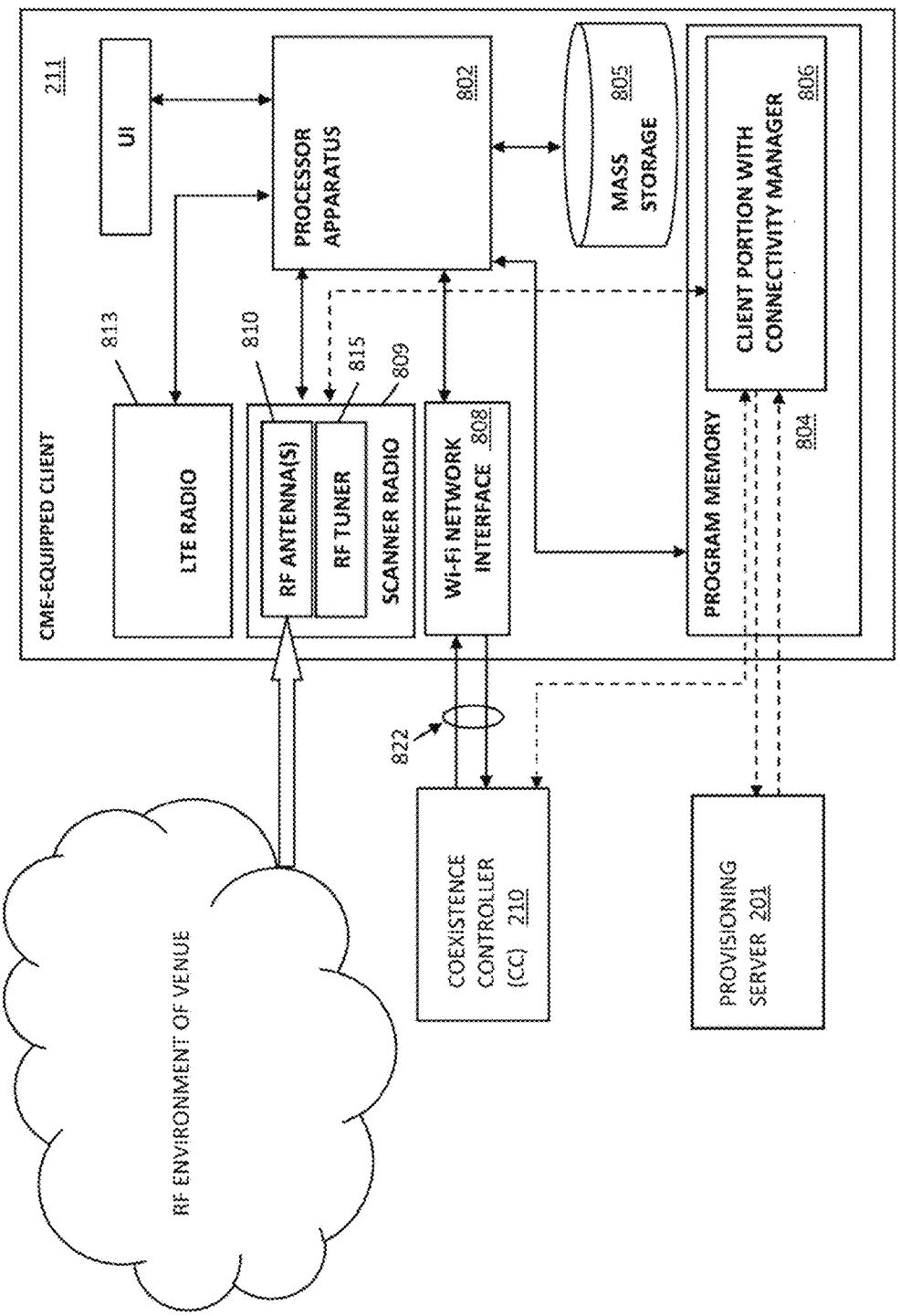
FIG. 8a is a functional block diagram illustrating one embodiment of a CME-equipped client or user device according to the present disclosure, including dedicated scanner/emulator apparatus.

FIG. 8a illustrates an exemplary embodiment of a CME-equipped client device 211 according to the present disclosure. As shown, the client device 211 includes, inter alia, a processor apparatus or subsystem 802, a program memory module 804, mass storage 805, a connectivity manager portion 806, one or more network (e.g., LAN, or backhaul) interfaces 808, as well as one or more radio frequency (RF) devices 809 having, inter alia, antenna(e) 810 and one or more RF tuners 815.

Although the embodiment of FIG. 8a uses a dedicated discrete scanner radio apparatus 809, artisans of ordinary skill in the related arts will readily appreciate, given the present disclosure, that the scanner radio may be virtualized and/or distributed within other client components, the foregoing apparatus being purely illustrative. For instance, the client device 211 may utilize a USB/micro-USB connected scanner radio "dongle" or other similar module as an add-on to the client device architecture as manufactured, thereby enabling the CME and scanner radio functionality to be added to any compatible client with sufficient data bus or card/module/wireline interface capability. For instance, a PCIe/mini-PCIe-enabled laptop of the like might utilize a plug-in card form factor with scanner radio 209 (as provided by e.g., the MSO or a third-party aftermarket supplier).

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The RF antenna(s) 810 are configured to detect signals from radio access technologies (RATs) in the venue. For example, Wi-Fi signals and LTE (including, e.g., LTE-U, LTE-LAA) signals may be detected, along with networking information such as number and type of RATs (e.g., Wi-Fi, LTE-U, LTE-LAA), frequency bands used (e.g., 2.4 or 5.8 GHz among others), channels the signals are occupying, number of connections, etc. As referenced elsewhere herein, the antenna(s) 810 of the scanner radio 809 may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

As noted above, the scanner radio 809 also optionally includes an LTE emulator function, which in the illustrated embodiment acts as receiver and decoder of LTE-based signals. For example, in one implementation, the emulator function includes the ability to (via the scanner radio 809) to measure RSSI and implement Zadoff-Chu autocorrelation sequence analysis for extraction of PSS timing data, as well as logic enabling decode of one or more broadcast channels such as PDSCH or PDCCH.

The tuner 815 in one embodiment comprises a digitally controlled RF tuner capable of reception of signals via the RF front end (receive chain) of the scanner radio 809 in the aforementioned bands, including simultaneous reception (e.g., both 2.4 and 5.0 GHz band at the same time), and has sufficient reception bandwidth to identify emitters that are significantly below or above the above-listed nominal frequencies, yet still within the relevant operating band restrictions (e.g., within the relevant ISM band).

The processing apparatus 802 is configured to execute at least one computer program stored in memory 804 (e.g., a non-transitory computer readable storage medium); in the illustrated embodiment, such programs include a scanner portion of the CME application or middleware 221. Other embodiments may implement such functionality within dedicated hardware, logic, and/or specialized co-processors (not shown). The CME 221, inter alia, collects information regarding the radio signals via the radio 809 into a report or other data structure that is parse-able and capable of analysis by the CC 210 and/or other upstream or backend entities.

In some embodiments, the CME 221 utilizes memory 804 or other storage 805 configured to temporarily hold a number of data reports or files before transmission via the WLAN or other interface(s) to the CC 210. In other embodiments, application program interfaces (APIs) such as those included in an MSO-provided application or those natively available on the AP (e.g., as part of the computer program noted supra or associated with the CME 221) may also reside in the internal cache or other memory 804. Such APIs may include common network protocols or programming languages configured to enable communication with the CC 210 and other network entities as well as use procedures for collecting, compressing and/or parsing information obtained via the antenna(s) 808 and radio 809 such that a receiving device (e.g., CC, Wi-Fi AP, etc.) may interpret the reports in order to extract and analyze the relevant information.

In a basic implementation, the scanner radio 809 and CME 221 operate primarily as a one-way "detector" that obtains RF signals, performs whatever processing in the digital domain it is equipped for on the signals (after conversion via the RF front end ADC), if any, and then forwards the raw or processed data to the relevant upstream entity such as the CC 210. However, in more sophisticated implementations, the scanner radio 809 and CME 221 may include logic to receive data and/or commands from an upstream entity, such as e.g., configuration data for its own radio 809 (i.e., such that the CC 210 or other upstream entity can configure the scanner radio 809 with respect to detection of the appropriate bands, MCS, energy threshold, etc.), and/or implement various functions such "wake/sleep", power on/off, reset, test mode, etc. The scanner radio/CME may, in certain embodiments, also be configured to communicate with other networked entities, including neighboring devices (e.g., other distributed CMEs on other clients via a wireless data network protocol, such as via the network WLAN interface (e.g., Wi-Fi Direct). For instance, in one implementation, the CME 221 may communicate in a peer-to-peer fashion with another CME-enabled client in the venue that is not directly controlled by the CC 210 or other controller entity, such as to configure that other client 211, obtain signal data obtained thereby, or act as test beacons for each other.

Figure 8B:
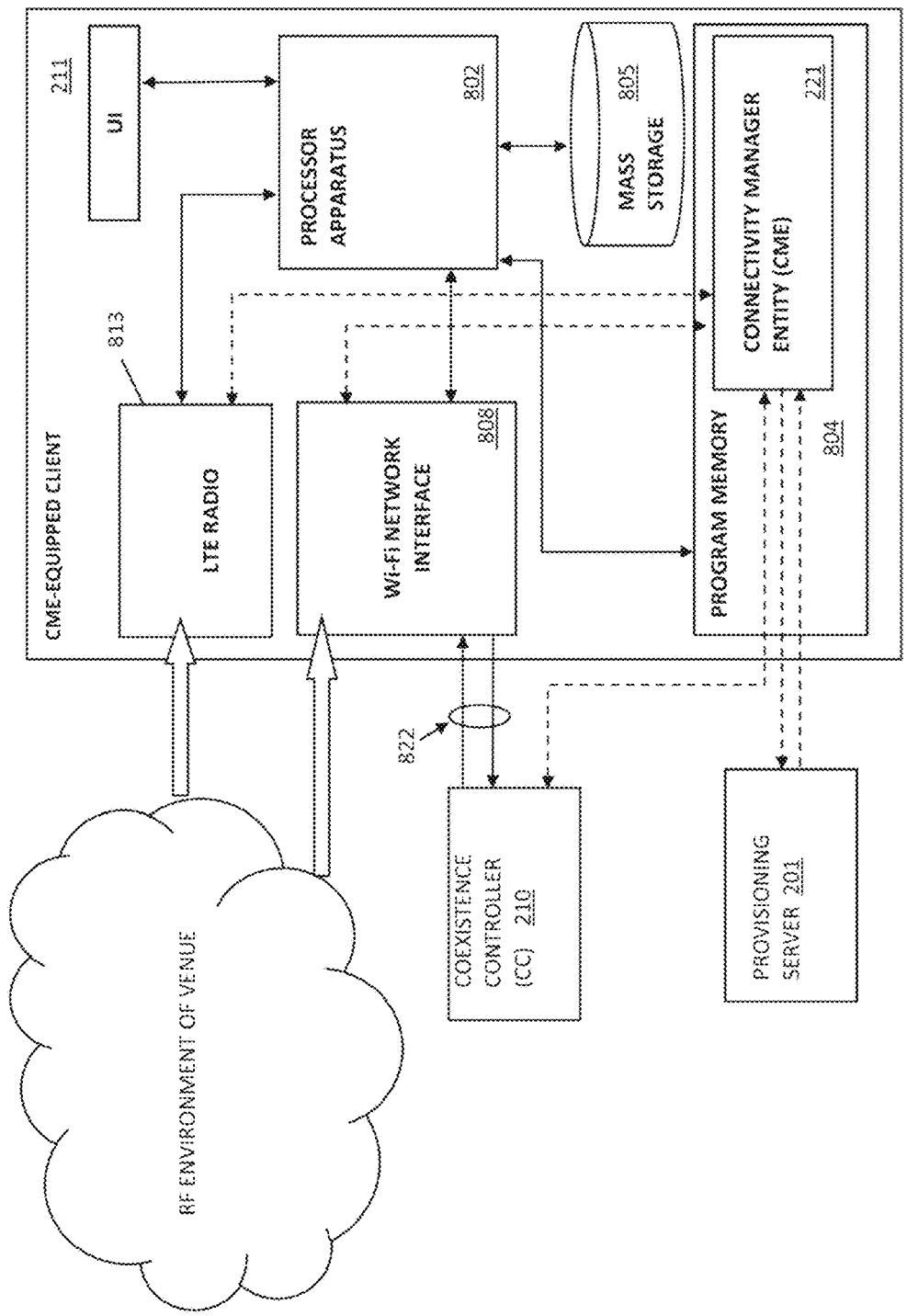
FIG. 8b is a functional block diagram illustrating a second embodiment of a CME-equipped client or user device according to the present disclosure.

Referring now to FIG. 8*b*, another embodiment of the CME-equipped client device 211 is shown and described. As illustrated, this second embodiment utilizes indigenous LTE and WLAN interfaces (such as are commonly found on current mobile user devices such as smartphones and tablets/phablets) for RF scanning functions, thereby obviating any customized or ancillary scanner radio apparatus 809 as in the embodiment of FIG. 8*a*. Specifically, in one implementation, APIs associated with the protocol stacks of the LTE and WLAN interfaces are accessed by the CME 221 to, for example, obtain RF scan data in the prescribed frequency band(s) of interest. In that the LTE interface 813 is presumed to be operative as delivered by the manufacturer, it can at very least, even without registration by the user of the client device 211 with a cellular service provider, provide detection and decode of public channels such as PDCCH and PDSCH as previously described herein, thereby enabling the affirmative identification of an LTE-based interferer. Conversely, the more coarse detection capabilities of the WLAN radio 808 of the client device 211 may be used by the CME 221 to detect the presence of RF energy (and determine other parameters relating thereto) within the prescribed bands of interest, thereby also enabling detection of an in-band interferer (although this may not be dispositively identified as LTE-based interference).

In one exemplary implementation, the client device 211 with CME 221 is iOS—based, and supports both "standard" iOS applications that comply with published APIs, as well as iOS applications that requires a manufacturer certificate (thereby providing access to private APIs). Alternatively, the client may utilize an Android-based OS, supporting both standard Android applications that comply with published APIs, and applications that require System Folder access and cooperation with OEM device or the manufacturer, and an embedded function that replaces or enhances the basic Android OS.

In operation, one embodiment of the CME 211 communicates (logically) with a repository of data maintained on e.g., the Provisioning Server (PS) 201 or the CC 210 within the MSO network, for maintaining connection policies. The CME 221 checks the available policies, such as connection priorities, AP quality, geo-fencing and power control (as published to the repository by the PS 201/CC 210) to determine the optimal WLAN connection parameters and protocols to use. In one implementation, the CME 221 runs in background mode on the client device 221, and is configured for constant availability, such as via a keep-alive mechanism of the type known in the software arts. The CME is also configured to be WLAN-agnostic (i.e., works with a variety of Wi-Fi technologies such 802.11n, 802.11ac, 802.11 r, 802.11k, and 802.11v).

In another implementation, the CME 221 is configured to runs one or more Connection Quality Tests (CQTs), and supports a simple "ping" test protocol to an MSO-based server to validate connectivity. For example the CQT may provide data and performance criteria such as: (i) one-way latency (e.g., 100 ms RTT latency); (ii) jitter (e.g., 30 ms jitter); (iii) packet loss (e.g., <1% packet loss); (iv) data throughput (e.g., 10-50 mbps throughput, based on the link budget); and (v) band steering RSSI levels between 5 GHz and 2.4 GHz bands with a common SSIDs, with RSSI levels configurable for different network types (such as MSO-managed Wi-Fi vs. unmanaged APs). Moreover, the exemplary CME 221 is configurable to indigenously determine both RSSI and SNR (if the client device radio chip sets support such functionality). In one variant, the CME band steering function is configured to causes the device to evaluate the 5.0 GHz spectrum band from a connected 2.4 GHz spectrum band for the same SSID in 2.4 and 5.0 GHz or for different SSIDS across 2.4 and 5.0 GHz based on connection policy.

Figure 8C:
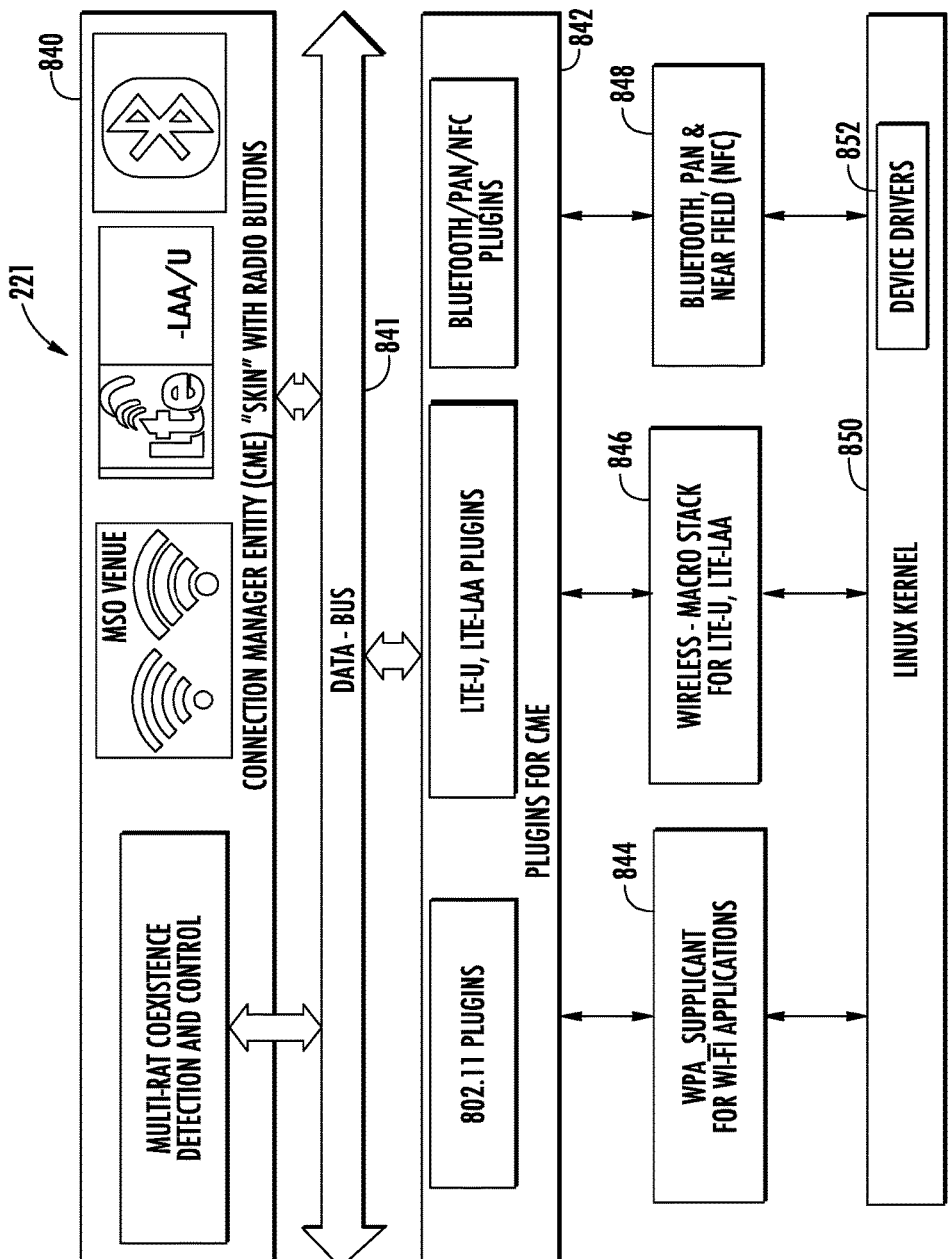
FIG. 8c is a graphical representation of a connection management entity (CME) software architecture useful with the client devices of FIGS. 8a and 8b.

FIG. 8*c* illustrates one embodiment of a CME (client) software architecture useful with the client devices of FIGS. 8*a* and 8*b*. As shown, the CME architecture includes a UI application or presentation layer 840 including generated "skin" showing user interface elements (e.g., "buttons" or SFKs generated on the device UI for the user to interact with to invoke various functions relating to wireless connection management). As shown, the exemplary UI skin includes functions for LTE, the MSO venue WLAN, PAN (e.g., Bluetooth, etc.). The UI (e.g., capacitive touchscreen input and display device of the type commonly found on most user mobile devices) is coupled via e.g., a data bus architecture 841 to the lower portions of the CME stack, including a series of plug-ins 842 (software modules configured to perform particular functions, or otherwise extend the functionality of the stack), including for e.g., WLAN (802.11), LTE (LTE-U/LTE-LAA), and PAN/NFC. The plugin layer 842 interface with the individual stacks 844, 846, 848 supporting WPA (WLAN), LTE, and PAN air interfaces respectively. A Linux kernel 850 is also used within the CME stack to provide necessary OS functionality for e.g., Android-based OS client devices, and supports a variety of necessary device drivers 852, although it will be appreciated that the use of such kernel is merely exemplary, and other configurations may be substituted, such as a hybrid micro-kernel and monolithic kernel such as XNU.

Business Methods—

The foregoing examples and embodiments may be utilized for methods directed to furthering business operations of service providers (e.g., cable operators).

As one example, data services provided by an MSO (e.g., cable operator) via its Wi-Fi infrastructure may be delivered to subscribers (and potential customers) near an access point within a prescribed venue as described above. By increasing the availability of Wi-Fi services using modified transmit parameters (e.g., lower ED threshold, increased transmit power and signal strength), subscribers are given more options for connecting to the network (e.g., the Internet). Subscribers may feel that the services they have subscribed to (or have utilized on a trial or incidental without being a subscriber) are highly accessible (i.e., good network coverage), thus improving customer experience and satisfaction, for example as compared to competing service providers. This is especially true where the service is branded by the MSO; i.e., associated directly with the MSO as opposed to the venue. For instance, a Charter Communications-sponsored event at a venue may, as part of its available services, have Wi-Fi "stuffed beacons" as previously described herein advertising the availability of Charter Wi-Fi at the event. Non-subscriber users who have their Wi-Fi enabled can receive the information via the stuffed beacons (e.g., as a small pop-up or textual/ticker notification), and enabling the notified user to merely click on a link to access the appropriate URL for use of the services, rather than utilize say their LTE interface. Assuming the provided WLAN services (e.g., connectivity/persistence, data rate, etc.) to be comparatively good due to better "competitiveness" with other competing RATs by virtue of e.g., reducing the ED threshold of the APs/client or other means, then user will be favorably impressed with the performance level and ease of connection.

Moreover, non-subscriber ad hoc users may be captured more efficiently when the cable operator's services (e.g., Wi-Fi connections via hotspots) are readily available. For example, in a public venue such as a waiting area or a gate at an airport, end users of mobile devices (e.g., smartphones, laptops, tablets) may seek diversion or productivity by connecting to the Internet or other wireless networks. By offering a free means of accessing such networks via Wi-Fi while conserving battery power and data limitations (e.g., by LTE providers), users may attribute an enhanced sense of satisfaction or competitive reputation with respect to the cable operator, potentially leading to a paid service subscription with the cable operator in the future.

Furthermore, establishments relevant at certain venues may be open to collaboration in which network services provided, e.g., via Wi-Fi. For instance, a travel equipment company may seek to place advertisements in front of travelers. In this case, the cable operator may receive consideration for placing advertisements for the travel equipment company, where end users may watch an advertisement to gain access to the network via Wi-Fi. In one variant, existing subscribers may access the network without viewing an advertisement. In another variant, non-subscribers may access the network in exchange for a fee to offset costs of operation and/or generate revenue. Notably, the user's desire to use the WLAN service (and hence view the ads) may be directly related to their perceived quality of the service; i.e., data rate, ease of connection, persistence, etc. Most people will watch one or two short ads to obtain high-performance and reliable WLAN service, especially when use of LTE (and its prospective costs) can be obviated, especially when the connection to the WLAN services in a multi-RAT environment are made easy and efficient.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method for enhancing wireless connectivity for a mobile client device, the method comprising:
   receiving data from a first radio frequency (RF) receiver apparatus of the mobile client device;
   evaluating, using a computerized process operative to run on the mobile client device, at least a portion of the received data to determine the presence of a first type of wireless signal; and
   modifying, based on the determination of the presence of the first type of wireless signal, an energy detection (ED) threshold associated with a wireless interface of the mobile device, the wireless interface utilizing a second type of wireless signal, the modifying based at least in part on the data from the first RF receiver apparatus and configured to cause the mobile client device to preferentially utilize the wireless interface and the second type of wireless signal for data communications over the first type of wireless signal.

2. The method of claim 1, wherein:
   the first radio frequency receiver apparatus comprises a Long-Term Evolution (LTE) based interface, and the wireless interface comprises a Wi-Fi based interface; and
   the evaluating at least a portion of the received data to determine the presence of a first type of wireless signal comprises decoding of one or more LTE public channels without establishing a connection to an LTE eNodeB.

3. The method of claim 2, wherein the decoding of one or more LTE public channels without establishing a connection to an LTE eNodeB comprises decode of at least one of a physical downlink control channel (PDCCH) or physical downlink shared channel (PDSCH);
   the evaluating comprises using one or more of an Reference Signal Received Power (RSRP) or Reference Signal Received Quality (RSRQ) value to calculate a signal strength associated with the eNodeB, and
   the modifying of the ED threshold associated with the wireless interface comprises reducing an ED threshold associated with the Wi-Fi based interface.

4. The method of claim 2,
   further comprising increasing a transmit power associated with the Wi-Fi based interface based on the determination of the presence of the first type of wireless signal.

5. Computer readable apparatus comprising a storage medium, the storage medium comprising at least one computer program having a plurality of instructions, the plurality of instructions configured to, when executed on a processing apparatus of a mobile user device:
   utilize a first radio frequency apparatus of the mobile user device to obtain data relating to first wireless signals present at a location of the mobile user device, the presence of the first wireless signals being competitive with concurrent deployment of second wireless signals; and
   in response to detection of the competition of the presence of the first wireless signals with the concurrent deployment of second wireless signals, cause transmission of at least a portion of the obtained data to a network entity, the transmitted at least portion of the obtained data configured to enable the network entity to adjust operation of at least one connectivity parameter relating to a second radio frequency apparatus of the mobile user device, the second radio frequency apparatus being associated with the second wireless signals, the first and the second radio frequency apparatus operating at least in part within a same frequency band.

6. The computer readable apparatus of claim 5, wherein the at least one computer program comprises an application computer program operative to run on the processing apparatus of the mobile user device, the application computer program comprising at least one connection management function, the connection management function configured to perform the utilization of the first radio frequency apparatus of the mobile user device to obtain the data relating to first wireless signals present at a location of the mobile user device at least: (i) in response to detection of a degradation in performance of the second radio frequency apparatus during use; and (ii) based on a data communication received from the network entity configured to cause the utilization.

7. The computer readable apparatus of claim 5, wherein the at least one computer program comprises at least one connection management function, the connection management function configured to perform the utilization of the first radio frequency apparatus of the mobile user device to obtain the data relating to first wireless signals present at a location of the mobile user device at least: (i) in response to detection of a degradation in performance of the second radio frequency apparatus during use; and (ii) based on a data communication received from the network entity configured to cause the utilization.

8. The computer readable apparatus of claim 5, wherein the transmission of at least a portion of the obtained data to a network entity comprises the at least one computer program accessing an application programming interface (API) associated with a network server, the API configured to cause the network server to return a prescribed message format to the at least one computer program, the prescribed message format comprising configuration data for at least the second radio frequency apparatus.

9. The computer readable apparatus of claim 5, wherein the at least one computer program comprises at least one connection management function, the connection management function configured to access one or more application programming interfaces (APIs) associated with respective ones of at least the first and second radio frequency apparatus in order to invoke respective one or more functions associated therewith.

10. The computer readable apparatus of claim 9, wherein the first radio frequency apparatus comprises an LTE-based interface, and the respective one or more functions associated therewith comprises decode of a downlink control channel.

11. A method of preferentially causing wireless LAN (WLAN) access for a multi-mode mobile client device having both a WLAN interface and an Long Term Evolution (LTE) cellular data interface, and a connection management process configured to select one of the WLAN interface and the LTE cellular data interface, the method comprising:
obtaining, via a radio frequency apparatus of the mobile client device, data enabling the mobile client device to adjust one or more parameters associated with the WLAN interface, the adjustment to compensate for detection of operation of LTE radio access technology within an area within which the mobile client device is currently located;
determining, using at least the connection management process, that the LTE cellular data interface is operating at a level of performance greater than that of the WLAN interface;
based at least on the determining, adjusting the one or more parameters associated with the WLAN interface based at least on the obtained data;
thereafter evaluating, using at least the connection management process, at least one aspect of the performance of the WLAN interface: and
based at least on the evaluating, selecting the WLAN interface for data communications.

12. The method of claim 11, wherein the adjusting of the one or more parameters associated with the WLAN interface comprises adjusting one or more of (i) a frequency band used by signals associated with the WLAN interface, (ii) a transmit power of the signals associated with the WLAN interface, and (iii) a beamforming scheme utilized used by the WLAN interface.

13. A method for enhancing wireless connectivity for at least one mobile client device, the method comprising:
detecting a first type of wireless signal, the detecting comprising receiving data from a first radio frequency (RF) receiver apparatus of the at least one mobile client device;
receiving a data structure from a computerized network entity, the data structure comprising at least data relating to one or more parameters associated with a second type of wireless signal according to a nominal or baseline configuration associated particularly with an interface apparatus utilizing the second type of wireless signal;
modifying the one or more parameters associated with the second type of wireless signal based at least in part on the data from the first RF receiver apparatus; and
transmitting data relating to the modified one or more parameters to the interface apparatus, the transmitted data enabling the interface apparatus to adjust one or more operational characteristics thereof with respect to the second type of wireless signal.

14. The method of claim 13, wherein:
the interface apparatus comprises a wireless LAN (WLAN) access point;
the first type of wireless signal comprises a cellular data standard-compliant signal; and
the modifying of the one or more parameters associated with the second type of radio signal comprises modifying one or more of: (i) a frequency band used by the second type of wireless signal, and (ii) a transmit power of second type of wireless signal used by the interface apparatus.

15. The method of claim 13, wherein:
the interface apparatus comprises a wireless LAN (WLAN) access point operating in an unlicensed frequency band;
the first type of wireless signal comprises a cellular data standard-compliant signal operating in the unlicensed frequency band; and
the modifying of the one or more parameters associated with the second type of radio signal comprises modifying a beamforming scheme utilized used by the interface apparatus, the modifying of the beamforming scheme comprising adjustment of one or more spatial parameters associated with a multiple input multiple output (MIMO) spatial diversity capability of the interface apparatus.

16. The method of claim 13, wherein:
the second type of wireless signal comprises signals compliant with a Wi-Fi (IEEE 802.11) standard; and
the first type of wireless signal comprises signals compliant with a Long Term Evolution (LTE)-based standard, the LTE standard comprising at least one of (i) LTE-U (Long Term Evolution in unlicensed spectrum), and/or (ii) LTE-LAA (Long Term Evolution, Licensed Assisted Access).

17. The method of claim 16, wherein:
the detecting of the first type of wireless signal comprises detecting one or more of an Reference Signal Received Power (RSRP) or Reference Signal Received Quality (RSRQ) value, and
the modifying of the one or more parameters associated with the interface apparatus utilizing the second type of wireless signal comprises:
calculating a Signal to Interference Noise Ratio (SINR) value, and determining a transmit power associated with the second type of wireless signal based at least on the SINR.

18. The method of claim 13, wherein the receiving of the data from the first RF receiver apparatus comprises receiving data relating to: (i) a received signal strength (RSS) of the first type of wireless signal, and (ii) a type of modulation scheme utilized by the first type of wireless signal.

19. The method of claim 13, further comprising:
causing a computerized network entity to transmit one or more data structures to the at least one mobile client device, the transmitted one or more data structures being configured to change an energy detection (ED) threshold utilized by a wireless interface of the at least one mobile client device to be reduced so as to facilitate detection of the second type of wireless signals transmitted by the interface apparatus.

20. The method of claim 19, wherein the causing of the transmission of the one or more data structures to the at least one mobile client device comprises causing the computerized network entity to transmit from a software process of the computerized network entity to a corresponding software process of an application computer program operative on the at least one mobile device via a PHY other than said interface apparatus.

* * * * *

UNITED STATES PATENT AND TRADEMARK OFFICE
CERTIFICATE OF CORRECTION

PATENT NO. : 10,368,255 B2  
APPLICATION NO. : 15/659021  
DATED : July 30, 2019  
INVENTOR(S) : Don Gunasekara et al.

Page 1 of 1

It is certified that error appears in the above-identified patent and that said Letters Patent is hereby corrected as shown below:

On the Title Page

Currently Reads:
"(73) Assignee: Time Warner Cable Enterprises LLC (US)"

Should Read:
--(73) Assignee: CHARTER COMMUNICATIONS OPERATING, LLC (US)--

Signed and Sealed this  
Fifth Day of May, 2020

Andrei Iancu  
*Director of the United States Patent and Trademark Office*